(12) United States Patent
Satoh et al.

(10) Patent No.: US 7,843,315 B2
(45) Date of Patent: *Nov. 30, 2010

(54) IC TAG WHOSE FUNCTION CAN BE CHANGED UPON SEPARATION

(75) Inventors: Ken Satoh, Saitama (JP); Hisao Kumai, Chiba (JP); Touru Sugayama, Tokyo (JP); Junji Hiraide, Chiba (JP); Haruo Hinode, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 505 days.

This patent is subject to a terminal disclaimer.

(21) Appl. No.: 11/665,564

(22) PCT Filed: Oct. 11, 2005

(86) PCT No.: PCT/JP2005/018673

§ 371 (c)(1),
(2), (4) Date: Apr. 17, 2007

(87) PCT Pub. No.: WO2006/043441

PCT Pub. Date: Apr. 27, 2006

(65) Prior Publication Data

US 2009/0121876 A1  May 14, 2009

(30) Foreign Application Priority Data

Oct. 18, 2004  (JP) .............................. 2004-303430
Oct. 19, 2004  (JP) .............................. 2004-304706
Oct. 20, 2004  (JP) .............................. 2004-305108
Oct. 21, 2004  (JP) .............................. 2004-306509
Oct. 21, 2004  (JP) .............................. 2004-306999

(51) Int. Cl.
*H04Q 5/22* (2006.01)

(52) U.S. Cl. ................... 340/10.1; 340/10.2; 340/10.51; 340/572.3; 340/572.1; 340/825.71; 343/776; 235/383

(58) Field of Classification Search ... 340/572.3–572.7, 340/372.5, 10.1, 10.2, 10.51, 825.71; 343/776; 235/383
See application file for complete search history.

(56) References Cited

U.S. PATENT DOCUMENTS 5,884,425 A * 3/1999 Baldwin .................... 40/638

(Continued)

FOREIGN PATENT DOCUMENTS

EP         1 622 066 A1    2/2006

(Continued)

*Primary Examiner*—Daniel Wu
*Assistant Examiner*—Son M Tang
(74) *Attorney, Agent, or Firm*—Birch, Stewart, Kolasch & Birch, LLP

(57) ABSTRACT

Data falsification or the like is prevented and security is enhanced in an IC tag. The IC tag consists of three portions: separable portions A1 and A2, and a non-separable portion B (tag main body). The portions A1, A2, and B include IC1, IC2, and IC3, and antenna 1, antenna 2, and antenna 3, respectively, the antennas being an interface between the tag and the outside (a reader/writer device for the exchange of data with the tag). IC1 (10) and IC2 (20) are connected by a signal line L1 for signal transmission between IC1 (10) and IC2 (20). IC2 (20) and IC3 (30) are connected by a signal line L2 for signal transmission between IC2 (20) and IC3 (30). Upon separation of A1 from the tag main body, the signal line L1 is also severed. Similarly, upon separation of A2 from the tag main body, the signal line L2 is severed. Each time the separable portions are separated in the order of A1 to A2, the separation of A1 or A2 is detected, and the function of the tag is changed from the first function to the third function sequentially.

39 Claims, 47 Drawing Sheets

U.S. PATENT DOCUMENTS

| | | | | |
|---|---|---|---|---|
| 6,050,622 | A * | 4/2000 | Gustafson | 292/307 R |
| 6,693,544 | B1 | 2/2004 | Hebbecker | |
| 6,888,509 | B2 * | 5/2005 | Atherton | 343/718 |
| 6,995,674 | B2 * | 2/2006 | Turner et al. | 340/572.8 |
| 7,034,689 | B2 * | 4/2006 | Teplitxky et al. | 340/572.7 |
| 7,102,522 | B2 * | 9/2006 | Kuhns | 340/572.7 |
| 7,477,151 | B2 * | 1/2009 | Forster et al. | 340/572.3 |
| 2004/0236899 | A1 * | 11/2004 | Teicher | 711/103 |
| 2004/0263319 | A1 * | 12/2004 | Huomo | 340/10.2 |
| 2007/0096914 | A1 * | 5/2007 | Baba et al. | 340/572.3 |
| 2007/0152829 | A1 * | 7/2007 | Lindsay et al. | 340/572.3 |

FOREIGN PATENT DOCUMENTS

| | | |
|---|---|---|
| JP | 9-62934 A | 3/1997 |
| JP | 2001-38302 A | 2/2001 |
| JP | 2001-315920 A | 11/2001 |
| JP | 2002-60012 A | 2/2002 |
| JP | 2002-202722 A | 7/2002 |
| JP | 2002-230499 A | 8/2002 |
| JP | 2002-230509 A | 8/2002 |
| JP | 2002-236893 A | 8/2002 |
| JP | 2002-366916 A | 12/2002 |
| JP | 2006-31110 A | 2/2006 |
| WO | WO-2004/097728 A1 | 11/2004 |

* cited by examiner

FIG. 15
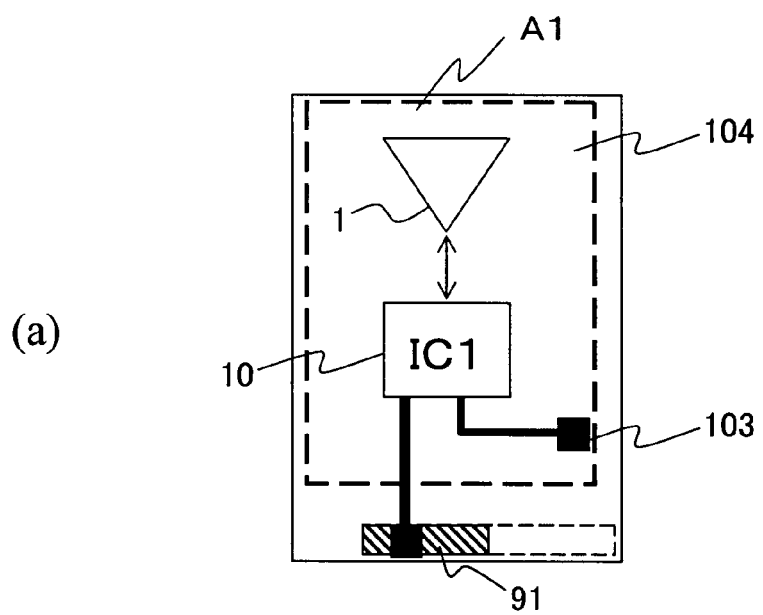
(a)
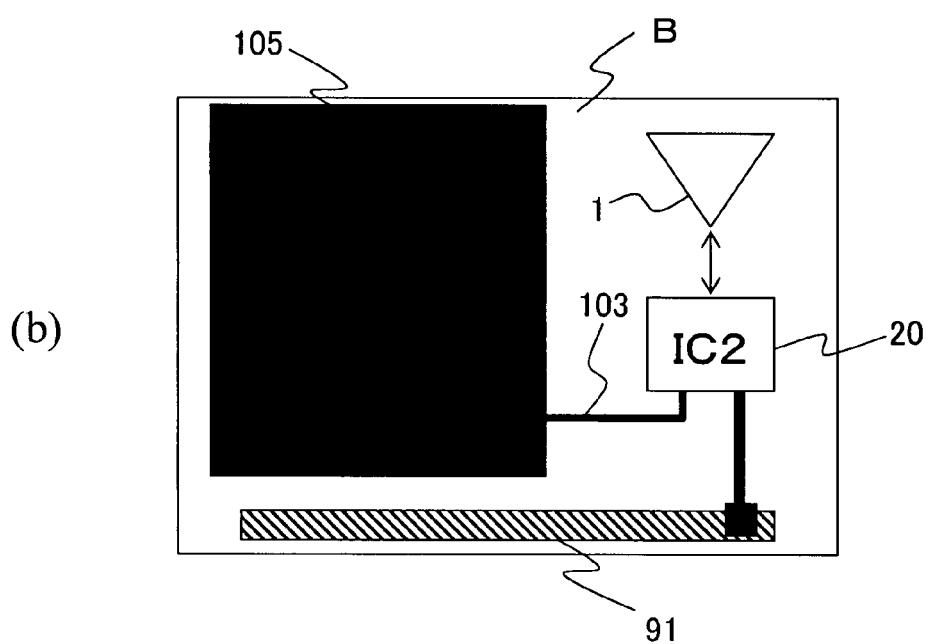
(b)

A1

B

FIG. 21
(a) 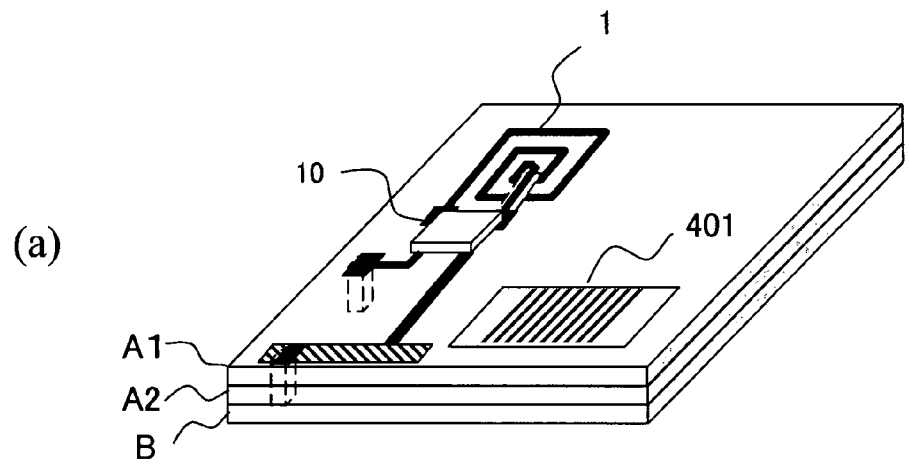
(b) 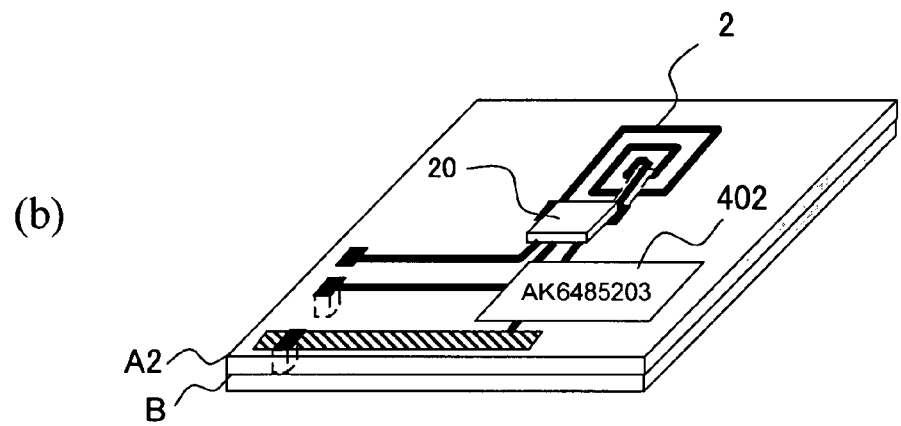
(c) 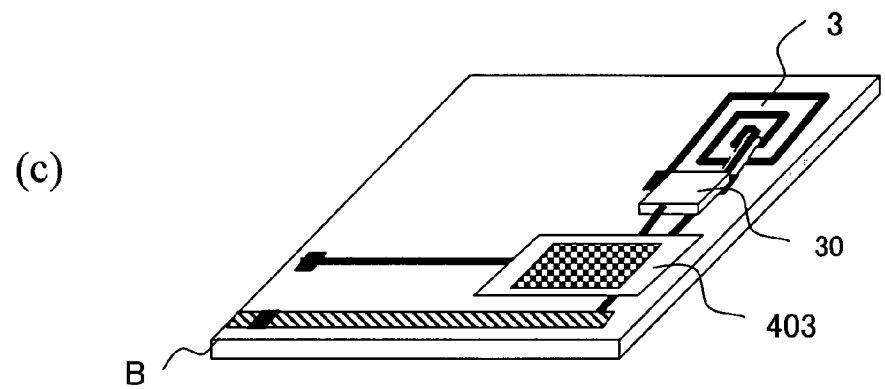

FIG. 26
(a)
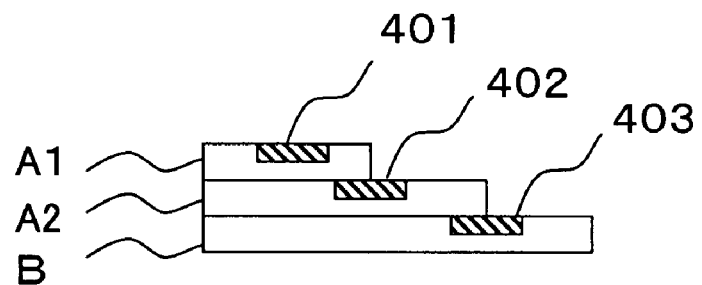
(b)
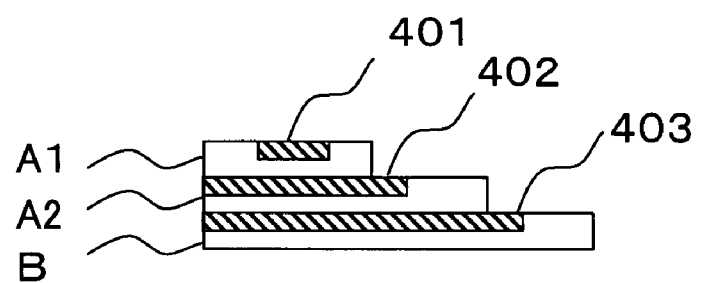

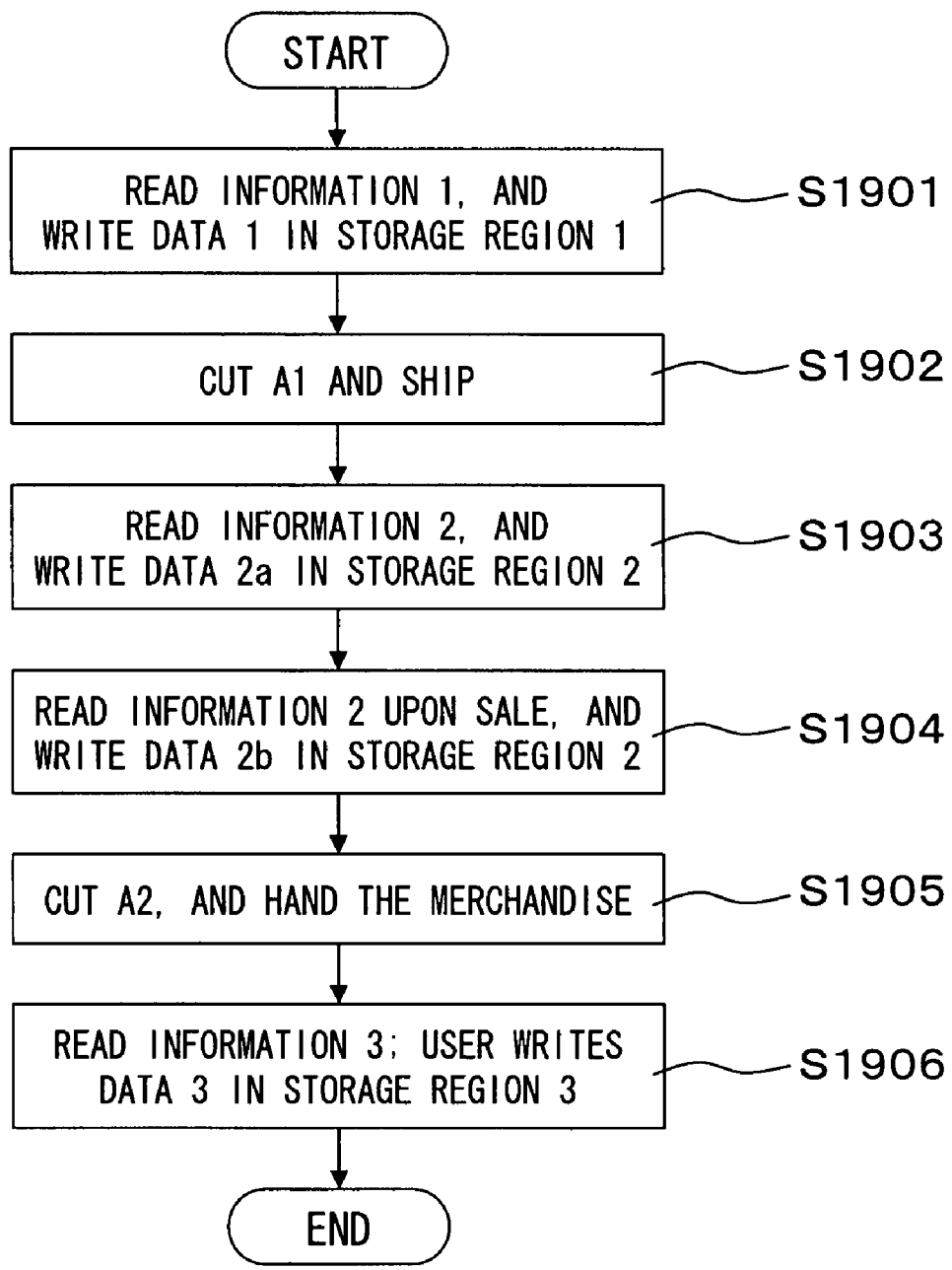

IC TAG WHOSE FUNCTION CAN BE CHANGED UPON SEPARATION

TECHNICAL FIELD

The present invention relates to an IC tag and more particularly to an IC tag including a separable function change means.

BACKGROUND ART

Attention is being focused on systems consisting of an IC tag and a reader/writer unit for communication with the IC tag for merchandise distribution, inventory management, or for settlement or theft-preventing purposes in stores. The IC tag comprises an insulator, such as paper or plastic, on which an antenna and an IC chip are disposed. One example of such system is shown in FIG. 8.

In such systems, the IC tag typically includes a reader/writer unit 250 and an IC tag 200, as in the example of FIG. 8. In the system of FIG. 8, a contactless IC tag (RFIC tag) is proposed that comprises an IC 20 (210) and an antenna 201, the IC 20 (210) including an RF unit, a modulator/demodulation unit, and a data storage unit, which are not shown (see Patent Document 1, for example), where the reader/writer unit 250 and the IC tag 200 communicate with each other using radio wave.

FIG. 9 shows a perspective view of a conventional IC tag. As shown, the IC tag, which is an RFIC tag, comprises an insulating substrate 90 of paper or plastic, for example, on which the coil antenna 201 and the IC chip 210 are layered. Since the structure is so simple, such IC tag can be used for various applications as mentioned above.

Patent Document 1: JP Patent Publication (Kokai) No. 9-62934 A (1997)

SUMMARY OF THE INVENTION

Problems to be Solved by the Invention

Since such tag is affixed to merchandise items and the like, IC tags such as the RFIC tag described in the Background Art section are required to be small and lightweight. Thus, the circuit configuration of the IC mounted on the IC tag is desired to be simple; it has therefore been difficult to equip the IC tag with hardware or software for the prevention of data tampering, which would result in complicating the data circuit or require an increase in its size. Consequently, the data in conventional IC tags can be easily tampered with.

It is therefore an object of the invention to provide an IC tag in which tampering of data is prevented and security is enhanced by simple structure and method.

Means for Solving the Problems

In accordance with the invention, the IC tag has separable portions. By separating the separable portions from the tag main body, the function of the IC tag is changed, the function relating to limitations concerning the input of data to and the output of data from the IC tag, for example. Such limitations in data input and data output of the IC tag and the change in the function of the tag caused by the separation of the separable portions prevent the falsification of data in the IC tag.

Further, by making the separable portions of the IC tag separable from the tag main body manually, for example, the limitations of data input and data output of the IC tag and the tag function can be easily changed manually without the use of a reader/writer unit, unlike conventional IC tags.

By having the change in the appearance of the IC tag following the separation of the separable portions IC tag linked with the change in the function of the tag, it becomes possible to visually monitor the current state of the function of the IC tag easily without the use of a reader/writer unit, unlike conventional IC tags.

In addition, the IC tag of the invention is provided with the following means:

1) To enhance security, the function of the tag is shared by a plurality of ICs; an appropriate change in the function is caused only when the separable portions are separated in a prescribed order.
2) To improve the convenience of the separable portions separated from the tag main body as information stubs, the separable portions are enabled to function as independent IC tags after separation from the tag.
3) To enhance information security, some of the information (verification code) necessary for the exchange of information between an external input/output device (reader/writer) and the tag (tag main body after separation of the separating portions) is indicated at a location of the tag that becomes visible only after the separable portions are separated (such as where the separating portions used to be on the tag, or on the back of the tag after separation).
4) Convenience is enhanced by ingeniously designing the size, shape, and layout of signal lines, bias lines, and the like that are severed upon separation of the separating portions, in view of the purpose and characteristics of the item to which the IC tag is affixed. For example, if the item is likely to break when subjected to an external shock, a size, shape, and layout of the signal lines, bias lines, and the like are adopted such that the lines can easily break upon external shock. Conversely, for items that are likely to be handled roughly, a shape, size, and layout are adopted such that no breakage develops in the signal lines, bias lines, and the like, unless the separating portions are completely separated.
5) The IC tag includes a function setting means for carrying out an initial setting of the function of the IC tag so as to adapt the single IC tag to various purposes. The initial setting means includes a means provided in the separating portions of the tag, for carrying out an initial setting depending on the manner of separation.
6) How the function of the tag is changed is determined by the tag main body depending on which separating portion is separated.

These means make it possible to adapt the IC tag to various purposes.

EFFECTS OF THE INVENTION

The IC tag of the invention provides the following effects:
1) The function of the IC tag can be easily changed by separating the separable portions manually without the use of a machine, unlike conventional, single-function IC tags. Particularly, security of the tag against data falsification can be enhanced by changing the limitations concerning the input and output of data to and from the tag by separating the separable portions.
2) Since the change in the appearance of the IC tag following the separation of the separable portions is linked with the change in the function of the IC tag, the current state of the IC tag can be easily visually monitored from the shape of the IC tag without the use of a reader/writer unit, in contrast to conventional IC tags.

3) By having the function of the tag shared by a plurality of ICs such that an appropriate change in function can be caused only when the separable portions are separated in a prescribed order, security can be enhanced.
4) By enabling the separable portions separated from the IC tag main body to function as independent IC tags, the convenience of the separable portions separated from the tag main body as independent information stubs can be enhanced.
5) The signal lines, bias lines, and the like used for separation detection are not severed unless the separable portions are completely separated. Or, conversely, the signal lines, bias lines, and the like used for separation detection are easily severed upon external shock. Thus, the shape, size, material, and the layout of the lines used for the detection of separation of the separable portions of the IC tag are ingeniously designed depending on the purpose and characteristics of the item to which the IC tag is affixed. In this way, the convenience of the IC tag and its merchandise management function are enhanced.
6) By having an access code for activating a new function of the IC tag, or the information for the approval or limitation of access to the data storage region of the IC tag indicated at a position that becomes accessible by the user of the tag only after the separable portions are separated, the information security of the tag is further enhanced.
7) By carrying out an initial setting using an initial setting means depending on the manner in which the initial setting means is separated, the versatility of the IC tag can be enhanced and it becomes possible to set a function depending on the purpose.
8) By making it possible to select the function of the IC tag based on which separable portion is separated, the convenience of the IC tag can be improved.

BRIEF DESCRIPTION OF THE DRAWINGS

FIG. 10(a) shows an IC tag in which cutouts are provided in the insulating substrate at a separating line portion thereof. FIG. 10(b) shows an IC tag in which the separating portions are made of an easily tearable material. FIG. 10(c) shows a layered IC tag.

FIGS. 15(a) and (b) show a layered IC tag.

FIGS. 21(a) to (c) schematically show an IC tag of the invention in which information is disclosed upon separation of a separable portion.

FIGS. 26(a) and (b) show an example of a tag in which some of information is recognizable.

FIG. 31b shows flowchart of a process during the course of merchandise distribution, in the IC tag according to the present embodiment.

BEST MODE OF CARRYING OUT THE INVENTION

The IC tag of the invention is based on the basic premise that a k-th function is realized by the IC tag as a whole. In order to realize the k-th function by the IC tag as a whole, there are the following two representative methods.

1) Each ICk has the capability to realize the k-th function independently. When an Ak operates as an independent IC tag having some function even after separation, it is a prerequisite that at least the ICk of the Ak have the capability to realize its function independently.

2) An ICk and another ICj (j:k<j≦n+1) realize the k-th function together. ICk controls part of the k-th function; it does not have the capability to realize the k-th function by itself.

A case where the features 1) and 2) are both incorporated in one IC tag is also included in the present invention.

Figure 1:
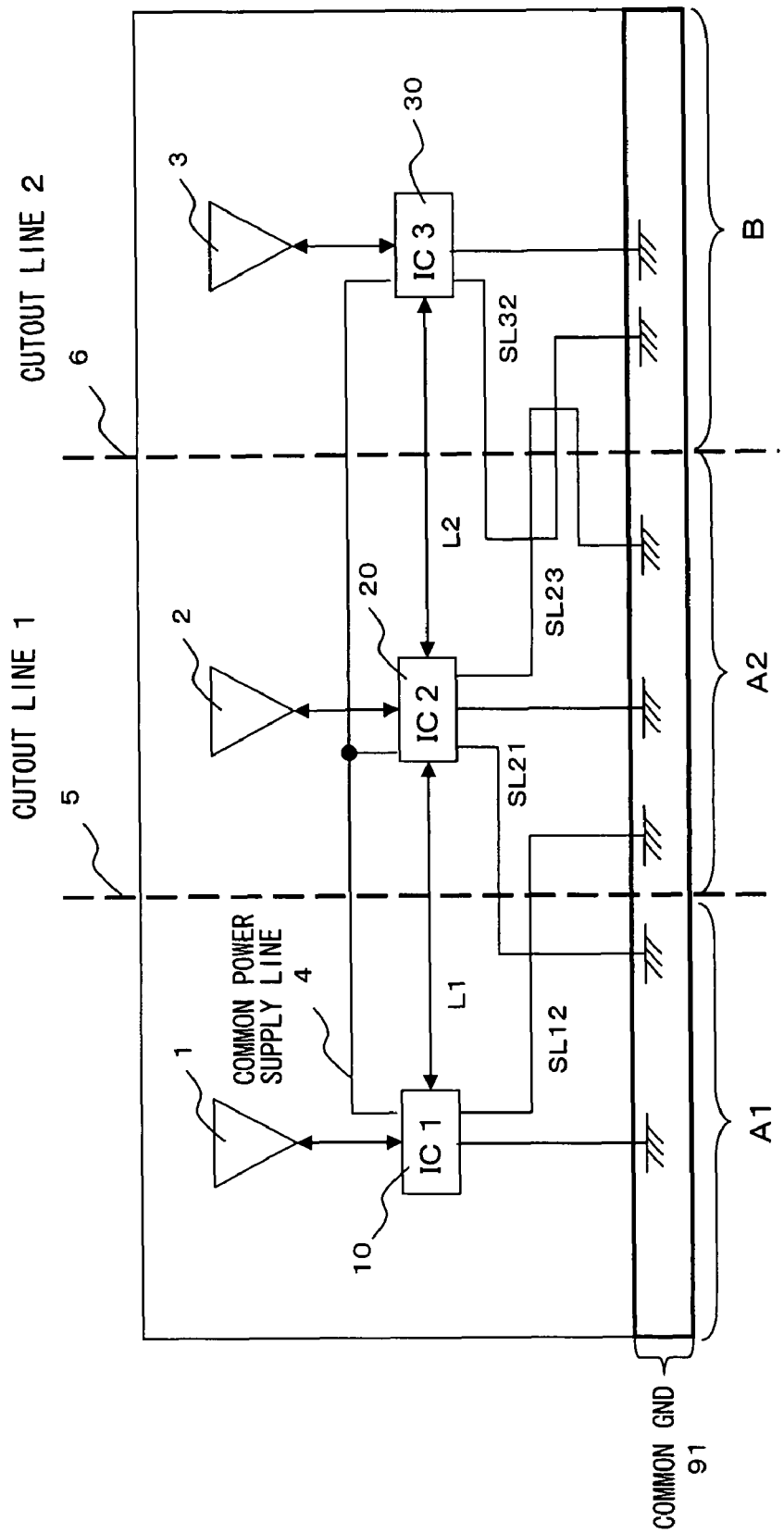
FIG. 1 shows an IC tag according to the present embodiment where n=2, n being the number of portions separable from the tag main body.

In the following, the IC tag according to embodiments of the invention and its relevant technologies are described with reference to the drawings. FIG. 1 shows an example of an IC tag whose function can be changed by separating separable portions from the main body of the tag in a case where n=2, n being the number of the separable portions.

The IC tag of FIG. 1 is composed of three portions; namely, separable portions A1 and A2, and a non-separable portion B (tag main body). The portions A1, A2, and B are equipped with IC1, IC2, and IC3, respectively; and, as an interface between the tag and the outside (a reader/writer unit with which the tag exchanges data), antenna 1, antenna 2, and antenna 3, respectively.

IC1 (10) and IC2 (20) are linked via a signal line L1 for signal transmission between IC1 (10) and IC2 (20); IC2 (20) and IC3 (30) are linked via a signal line L2 for signal transmission between IC2 (20) and IC3 (30). The IC tag is wired in such a layout that when A1 is separated from the tag main body along a separating line 1 (5), the signal line L1 is also severed; similarly, when A2 is separated from the tag main body along a separating line 2 (6), the signal line L2 is also severed.

Lines SL12, SL21, SL23, and SL32 connecting IC1, IC2, and IC3 to common GND are wired in such a layout as to straddle the separating boundary lines between A1 and A2 or between A2 and B so that SL12 and SL21 are severed upon separation of A1 from the tag main body, while SL23 and SL32 are severed upon separation of A2 from the tag main body. The lines SL12, SL21, SL23, and SL32 are used for the determination of separation of A1 or A2 portion based on the detection of a change in the impedance of any of the lines caused by severing.

Figure 2:
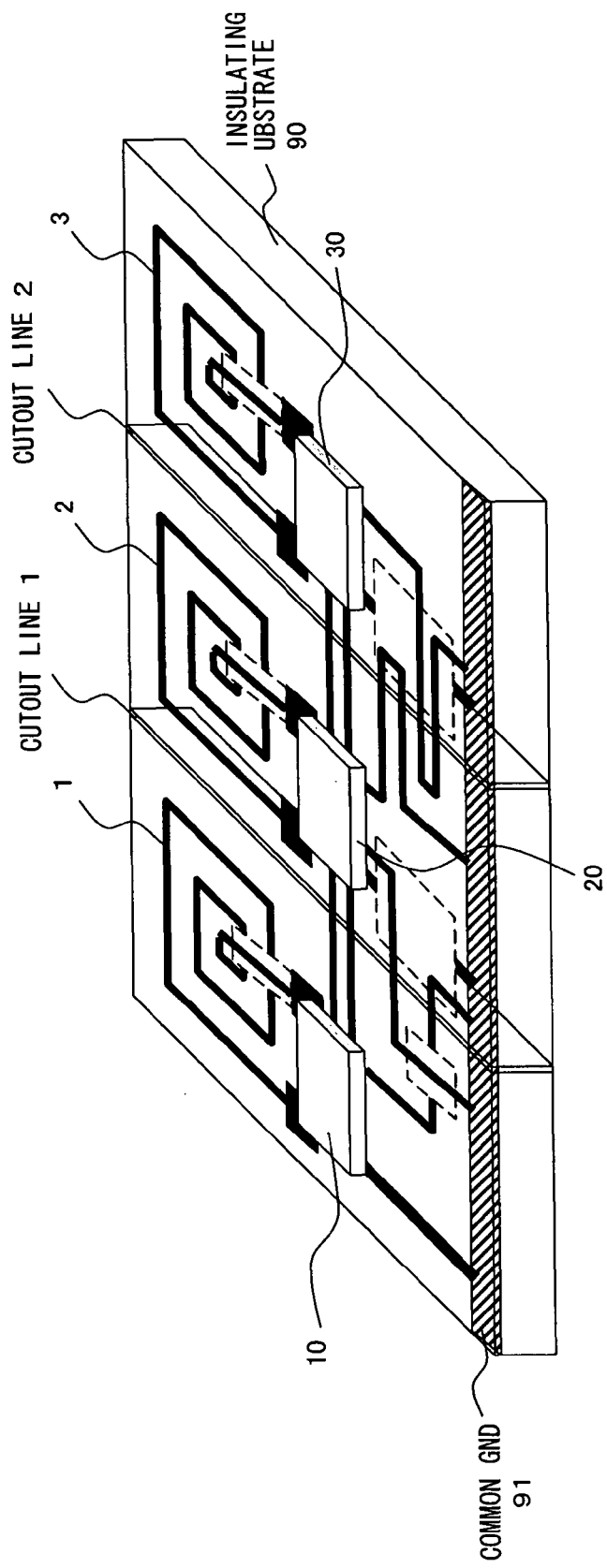
FIG. 2 shows a perspective view showing the structure of the IC tag of FIG. 1.

FIG. 2 is a perspective view illustrating the three-dimensional structure of the IC tag of FIG. 1. As shown in FIG. 2, the IC tag according to the present embodiment is disposed on an insulator substrate 90 of paper or plastic, for example. Along one side of the insulator substrate 90, common GND 91 is provided, which grounds lines SL12, SL21, SL23, and SL32 as well as ICs 1, 2, and 3.

Figure 3:
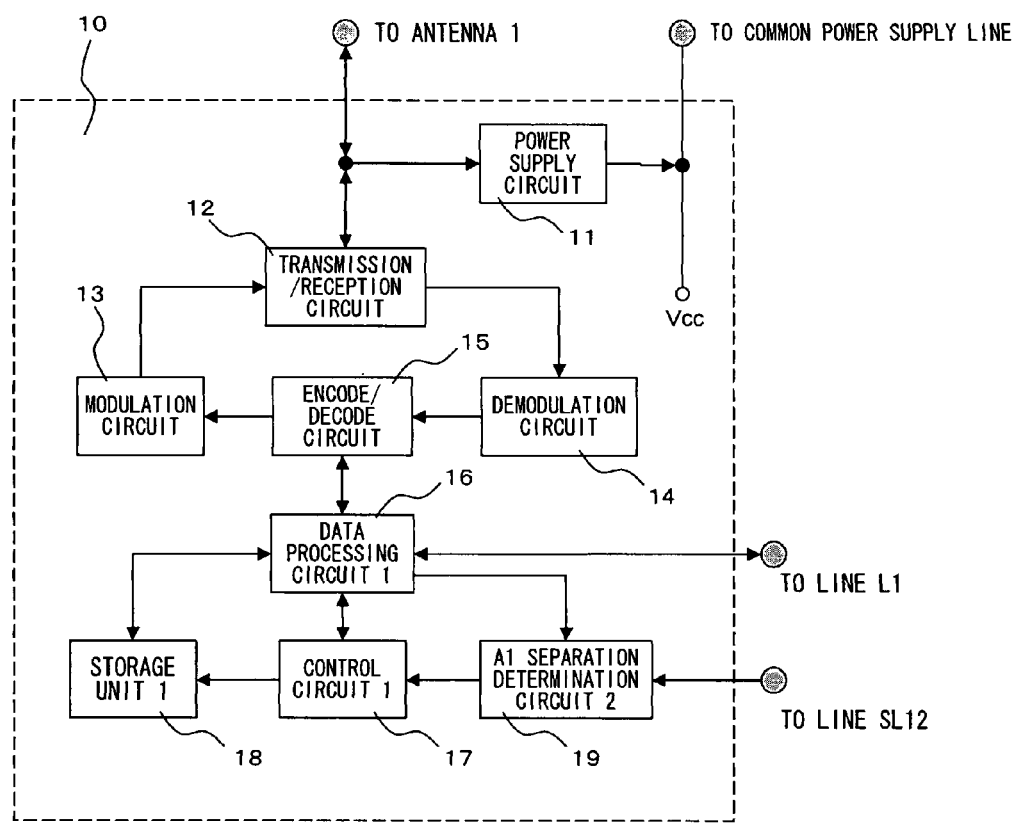
FIG. 3 shows a functional block diagram of an example of IC1.

FIG. 3 is a block diagram of an example of IC1 (10). As shown, IC1 (10) includes the following: a power supply circuit 11 for converting part of a received signal from the antenna 1 into electric power; a transmission/receiving circuit 12 for the reception and transmission of signals to and from the antenna 1, which is an external interface of the tag; a modulating circuit 13 for modulating encoded data; a demodulating circuit 14 for demodulating a received signal; an encoding/decoding circuit 15 for the encoding of transmission data and the decoding of reception data; a data processing circuit 1 (16) and a storage unit 1 (18) for processing data sent from the encoding/decoding circuit 15 or via signal line L1; a control circuit 1 (17) for controlling the operation of the data processing circuit 1 (16) and the storage unit 1 (18) depending on the state of the tag; and an A1 separation decision circuit 2 (19) for the portion A1 itself to determine whether or not it is separated from the portion A2. The power supply circuit 11 is connected to a common power supply line. The data processing circuit 1 (16) is connected to the line L1 connecting IC1 (10) and IC2 (20). The A1 separation decision circuit 2 (19) is connected to the line SL12.

Figure 4:
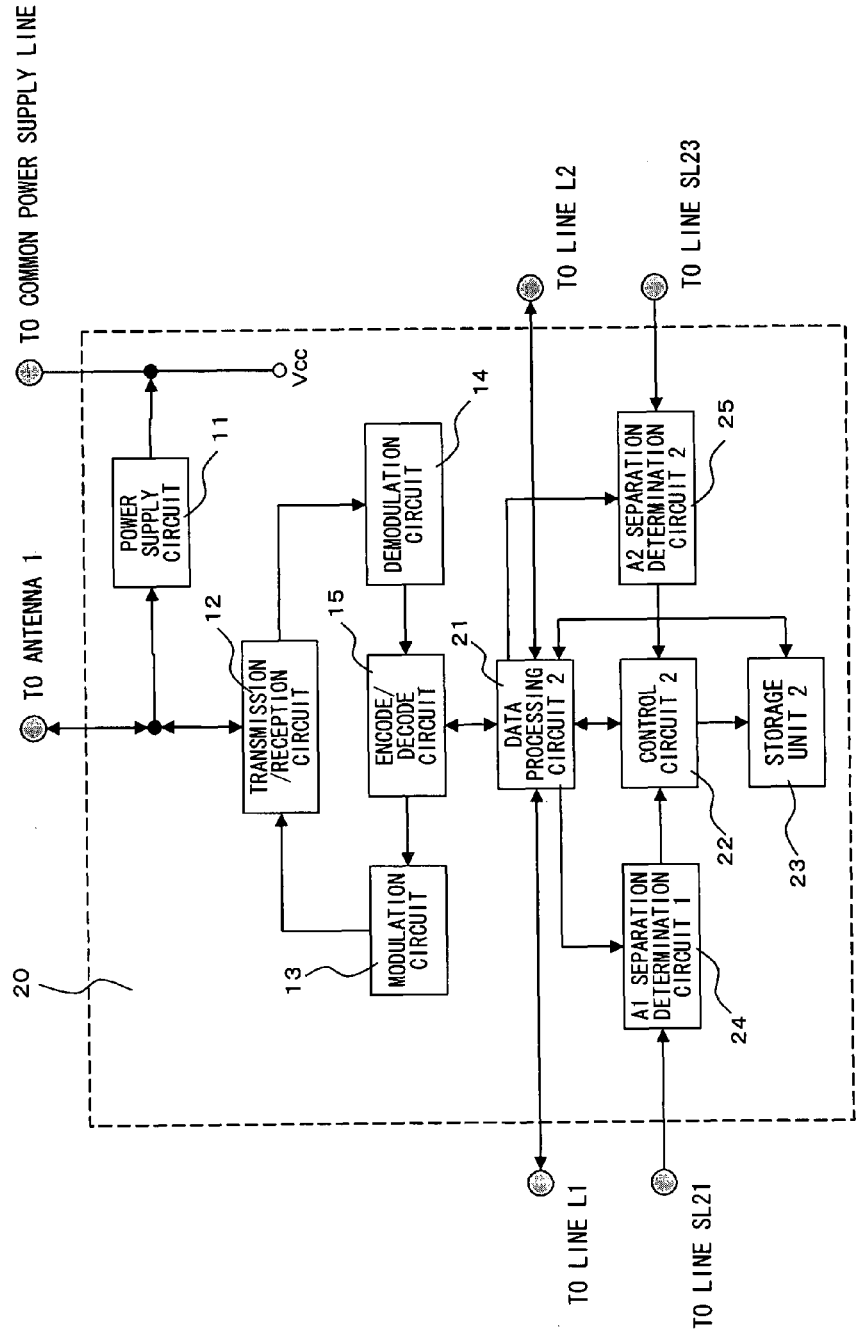
FIG. 4 shows a functional block diagram of an example of IC2.

FIG. 4 shows an example of IC2 (20). As shown in FIG. 4, IC2 (20) includes the following: a power supply circuit 11 for converting part of a received signal into an electric power; a transmission/receiving circuit 12 for the transmission and reception of a signal to and from the antenna 2, which is an external interface of the tag; a modulating circuit 13 for modulating encoded data; a demodulating circuit 14 for demodulating a received signal; an encoding/decoding circuit 15 for encoding and decoding of data; a data processing circuit 2 (21) for processing data; a storage unit 2 (23); a control circuit 2 (22) for controlling the operation of the data processing circuit 2 (21) and the storage unit 2 (23) depending on the state of the tag; an A1 separation decision circuit 1 (24) for the portion A2 to determine whether or not the portion A1 is separated from the portion A2; and an A2 separation decision circuit 2 (25) for the portion A2 to determine whether or not the portion A2 is separated from the portion B.

Figure 5:
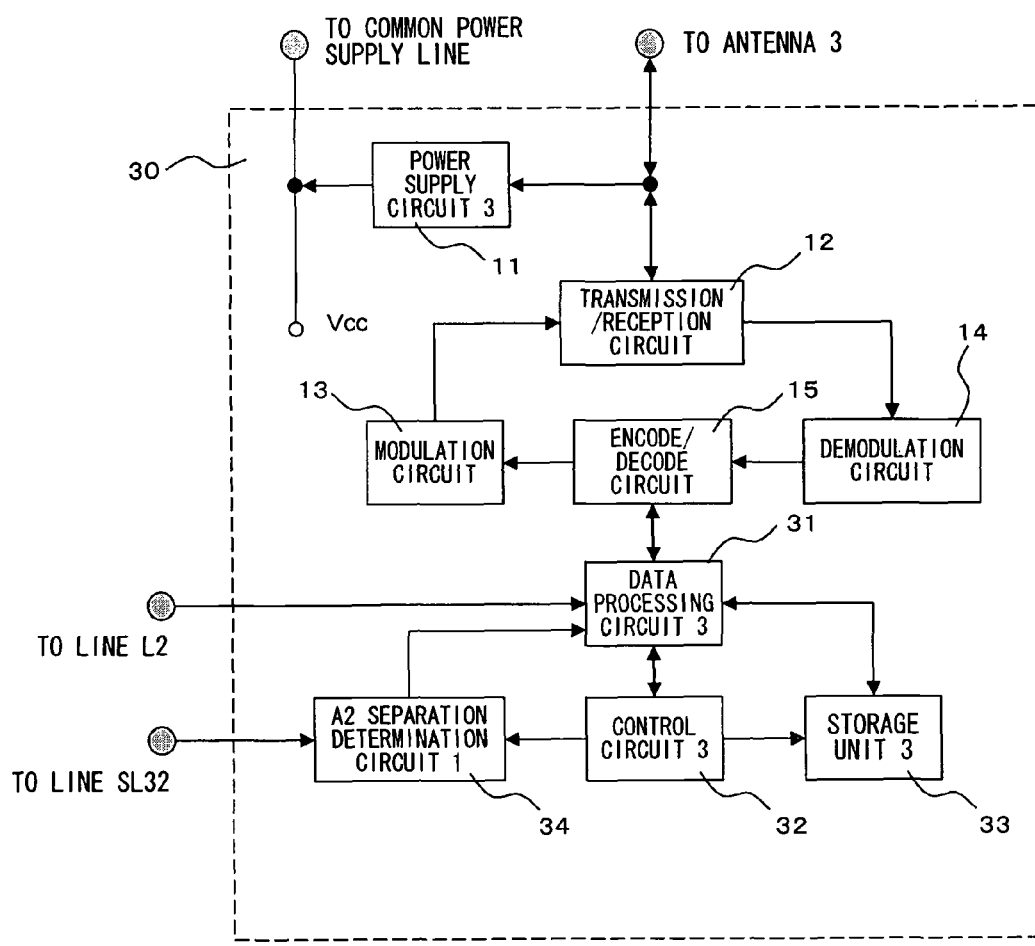
FIG. 5 shows a functional block diagram of an example of IC3.

FIG. 5 shows a functional block diagram of an example of IC3 (30). As shown in FIG. 5, IC3 (30) includes the following: a power supply circuit 3 (11) for converting part of a received signal into electric power; a transmission/receiving circuit 12 for the transmission and reception of a signal to and from the antenna 3, which is an external interface of the tag; a modulating encoded data modulating circuit 13; a demodulating circuit 14 for demodulating a received signal; a encoding/decoding circuit 15 for encoding and decoding of data; a data processing circuit 3 (31) for processing data; a storage unit 3 (33); a control circuit 3 (32) for controlling the operation of the data processing circuit 3 (31) and the storage unit 3 (33) depending on the state of the tag; and an A2 separation decision circuit 134 for the portion B to determine whether or not the portion A2 has been separated from the portion B.

Figure 6A:
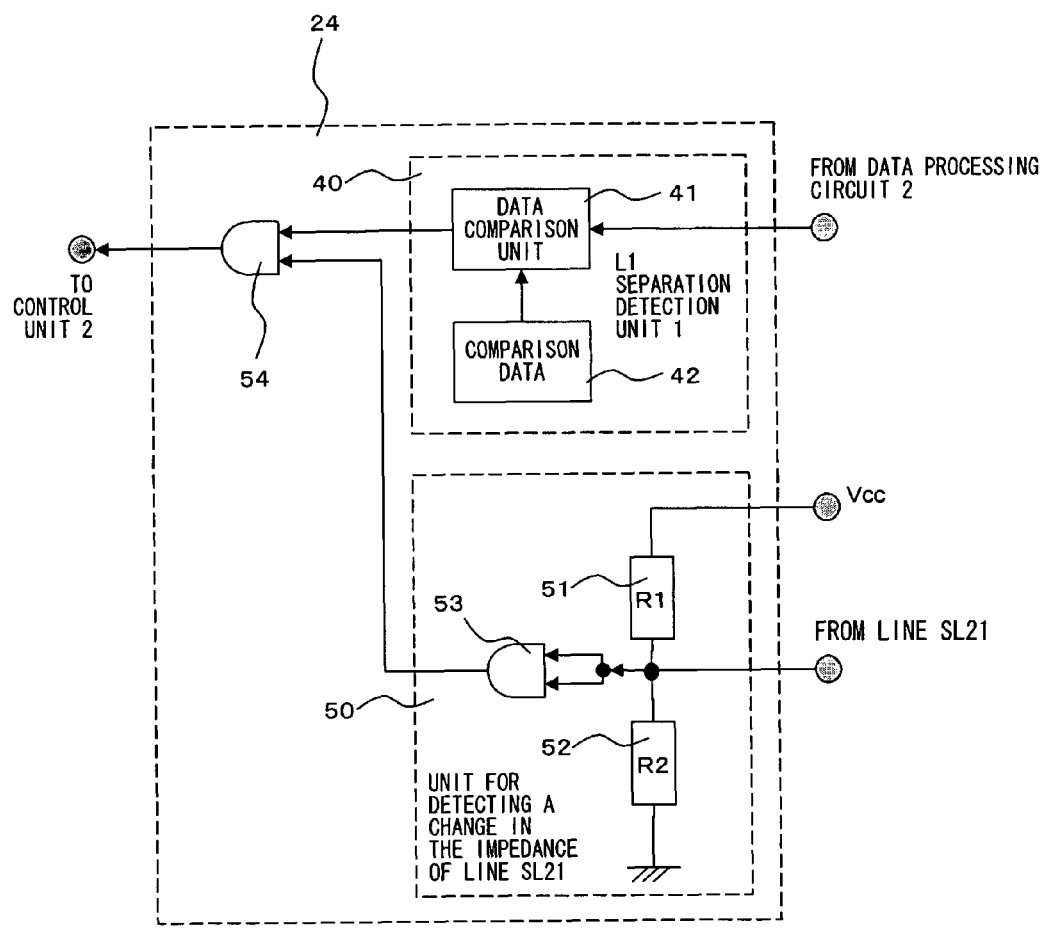
FIG. 6a shows a functional block diagram of an example of an A1 separation decision circuit 1.

FIG. 6a shows a functional block diagram of an example of the A1 separation decision circuit 1 (24) in the IC2 (40). As shown in FIG. 6a, the A1 separation decision circuit 1 (24) is composed of a separation decision circuit 1 (40) for the signal line L1 and an impedance change detection circuit 1 (50) for detecting a change in the impedance of the line SL21. Tables 1a to 1d are separation decision tables.

TABLE 1a

Decision table for A1-separation decision circuit 1

| Data comparison result from IC1 (output of L1-separation detection unit 1) | Impedance of SL21 (output of SL21-impedance detection circuit) | A1 separation decision (output of A1-separation decision circuit 1) |
|---|---|---|
| Agree (0) | Hi (1) | Connection (0) |
| Agree (0) | Low (0) | Connection (0) |
| Disagree (1) | Hi (1) | Separation (1) |
| Disagree (1) | Low (0) | Connection (0) |

TABLE 1b

Decision table in A1-separation decision circuit 2

| Data comparison result from IC2 (output of L1-separation detection unit 1) | Impedance of SL12 (output of SL12-impedance detection circuit) | A1 separation decision (output of A1-separation decision circuit 2) |
|---|---|---|
| Agree (0) | Hi (1) | Connection (0) |
| Agree (0) | Low (0) | Connection (0) |
| Disagree (1) | Hi (1) | Separation (1) |
| Disagree (1) | Low (0) | Connection (0) |

TABLE 1c

Decision table in A2-separation decision circuit 1

| Data comparison result from IC2 (output of L2-separation detection unit 1) | Impedance of SL32 (output of SL32-impedance detection circuit) | A2 separation decision (output of A2-separation decision circuit 1) |
|---|---|---|
| Agree (0) | Hi (1) | Connection (0) |
| Agree (0) | Low (0) | Connection (0) |
| Disagree (1) | Hi (1) | Separation (1) |
| Disagree (1) | Low (0) | Connection (0) |

TABLE 1d

Decision table for A2-separation decision circuit 2

| Data comparison result from IC3 (output of L2-separation detection unit 2) | Impedance of SL23 (output of SL23-impedance detection circuit) | A2 separation decision (output of A2-separation decision circuit 2) |
|---|---|---|
| Agree (0) | Hi (1) | Connection (0) |
| Agree (0) | Low (0) | Connection (0) |
| Disagree (1) | Hi (1) | Separation (1) |
| Disagree (1) | Low (0) | Connection (0) |

The separation decision circuit 1 (40) for signal line L1 compares identification data sent from IC1 (10) via the signal line L1 against comparison data 42. If the identification data sent from IC1 via the signal line L1 agrees with the comparison data 42, as shown in Table 1a, the separation decision circuit outputs "0"; if the identification data does not agree with the comparison data 42, it outputs "1".

Similarly, the impedance change detection circuit 1 (50) for detecting a change in the impedance of line SL21 determines whether or not the line SL21 is connected to the common GND. It outputs "0" if, as shown in Table 1a, the line SL21 is connected to common GND; it outputs "1" if the line SL21 is severed and in an open state. The A1 separation decision circuit 1 (24), as shown in Table 1a, calculates a logical AND between the output of the separation decision circuit 1 for signal line L1 and the output of the impedance change detection circuit 1. If the logical AND is "1," it is determined that A1 is separated from the tag.

For the determination of separation with regard to the signal line L1, a method may be employed whereby data stored in IC1 (10) and IC2 (20) in advance are compared, the former as identification data and the latter as comparison data. Alternatively, a method may be employed whereby arbitrary comparison data is transmitted to IC1 (10) from IC2 (20) via the signal line L1; the arbitrary comparison data received by IC1 (10) is returned as identification data which is compared in the separation decision circuit 1 (40) for signal line L1.

With regard to the above description of the operation of the L1 separation decision circuit 1 (40), it has been stated that the output of the separation decision circuit 1 (40) signal line L1 and the output of the impedance change detection circuit 1 (50) are fed to the AND circuit 54 which calculates their logical AND, and that when logical AND is "1," it is determined that A1 is separated from the tag. The method of such decision, however, is not limited to this. For example, a method may be adopted whereby it is determined that the portion A1 is separated from the tag main body when the logical OR of the output of the separation decision circuit 1 (40) for signal line L1 and the output of the impedance change detection circuit 1 (50) is "1"; namely, when either signal line L1 or line SL21 is severed. In such case, an OR circuit is used instead of the AND circuit 54. With regard to the operation of the impedance change detection unit, the following is a description of such operation with reference to the impedance change detection unit 50 for line SL21 shown in FIG. 6a as an example. In the AND circuit 53, two inputs are made common. Until A1 is separated along the separating line 1, the line SL21 is not severed and so the two inputs to the AND circuit 53 are at GND potential. Therefore, the two inputs to the AND circuit 53 are at "Low" and its output is "0." On the other hand, when A1 is separated along the separating line 1, the line SL21 is also severed, so that the potential of the two inputs to the AND circuit 53 is at "Hi" or R2×Vcc/(R1+R2), and its output is "1." Thus, the impedance change detection unit 50 can detect a change in the impedance of SL21 caused by the separation of A1 along the separating line 1.

Figure 6B:
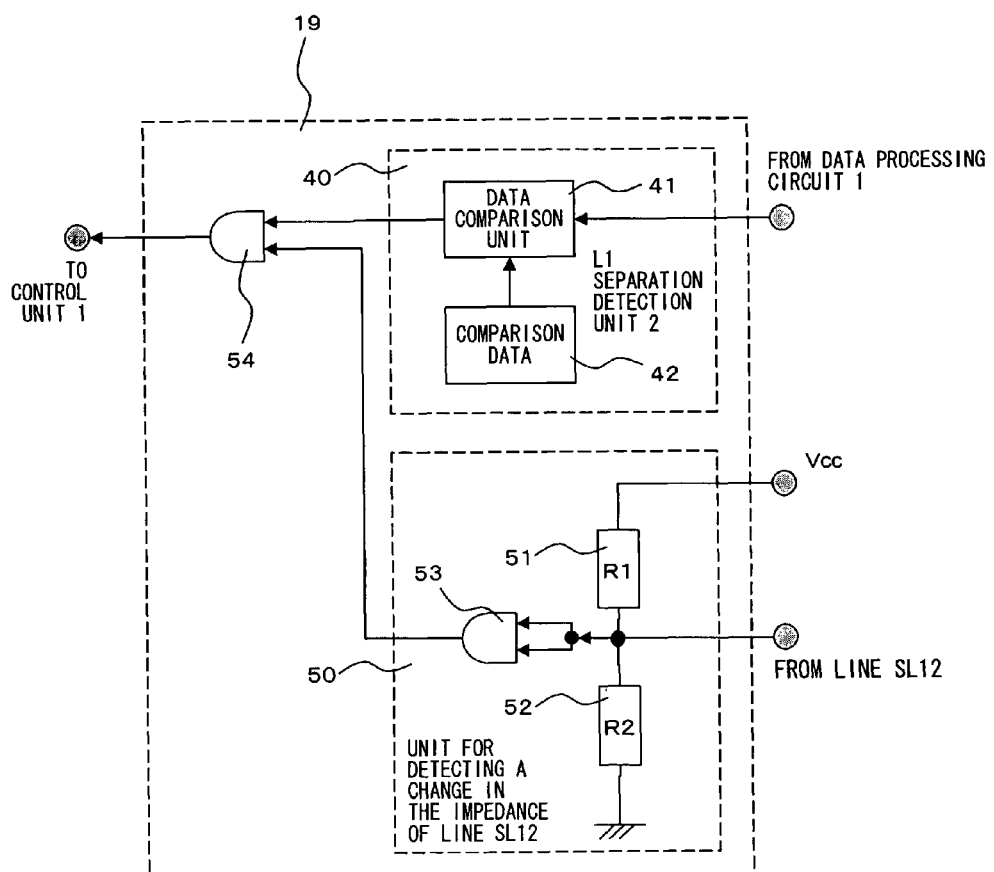
FIG. 6b shows a functional block diagram of an example of an A1 separation decision circuit 2.
Figure 6C:
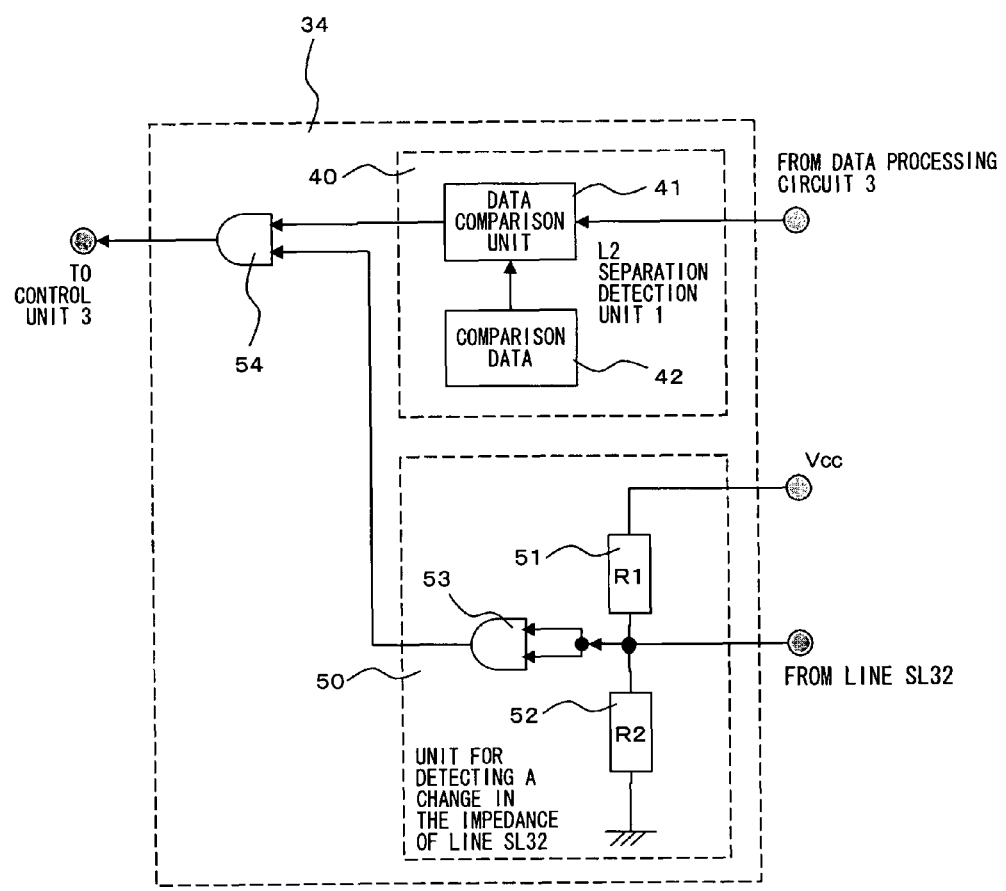
FIG. 6c shows a functional block diagram of an example of an A2 separation decision circuit 1.
Figure 6D:
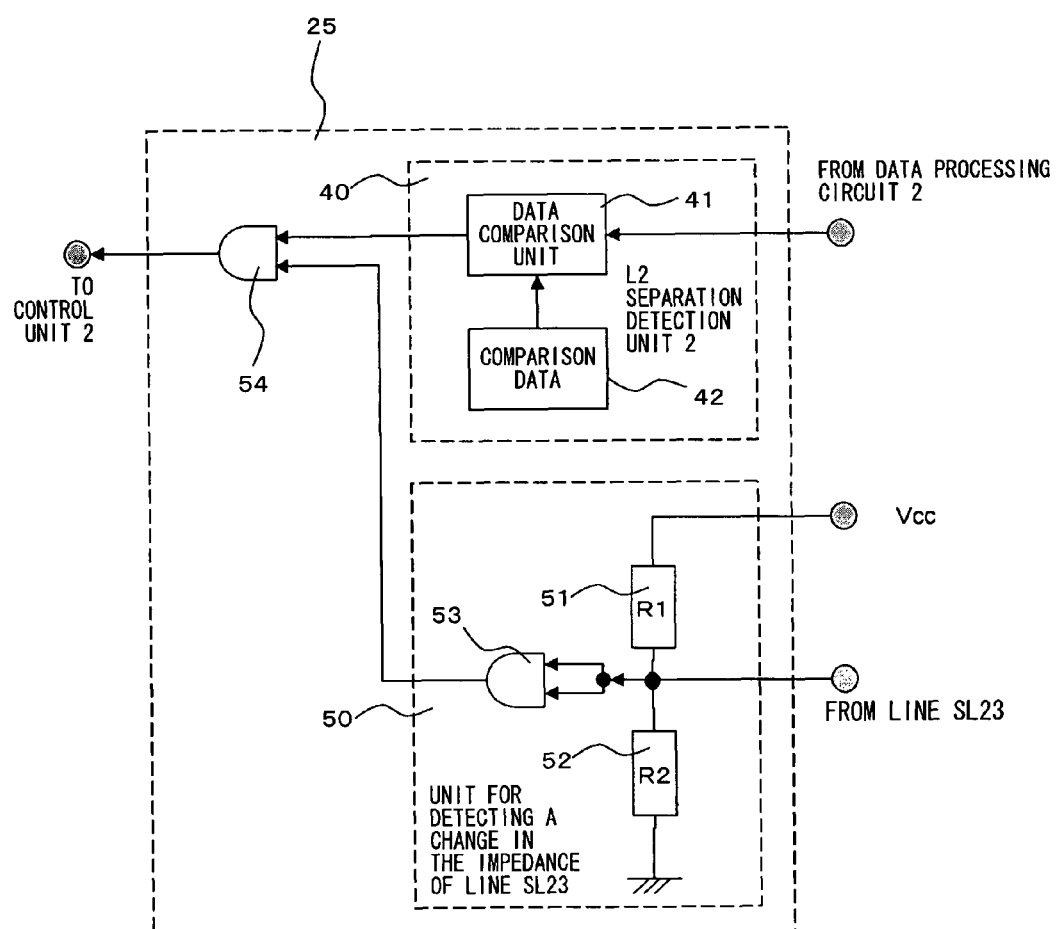
FIG. 6d shows a functional block diagram of an example of an A2 separation decision circuit 2.

The configuration of the remaining three separation decision circuits other than the A1 separation decision circuit 1 (24) are shown in FIGS. 6b, 6c, and 6d, and their separation decision tables are shown in Tables 1b, 1c, and 1d. The configuration and operating principle of the above three separation decision circuits are basically the same as those of the above-described A1 separation decision circuit 1; therefore, their individual descriptions are omitted.

Figure 7A:
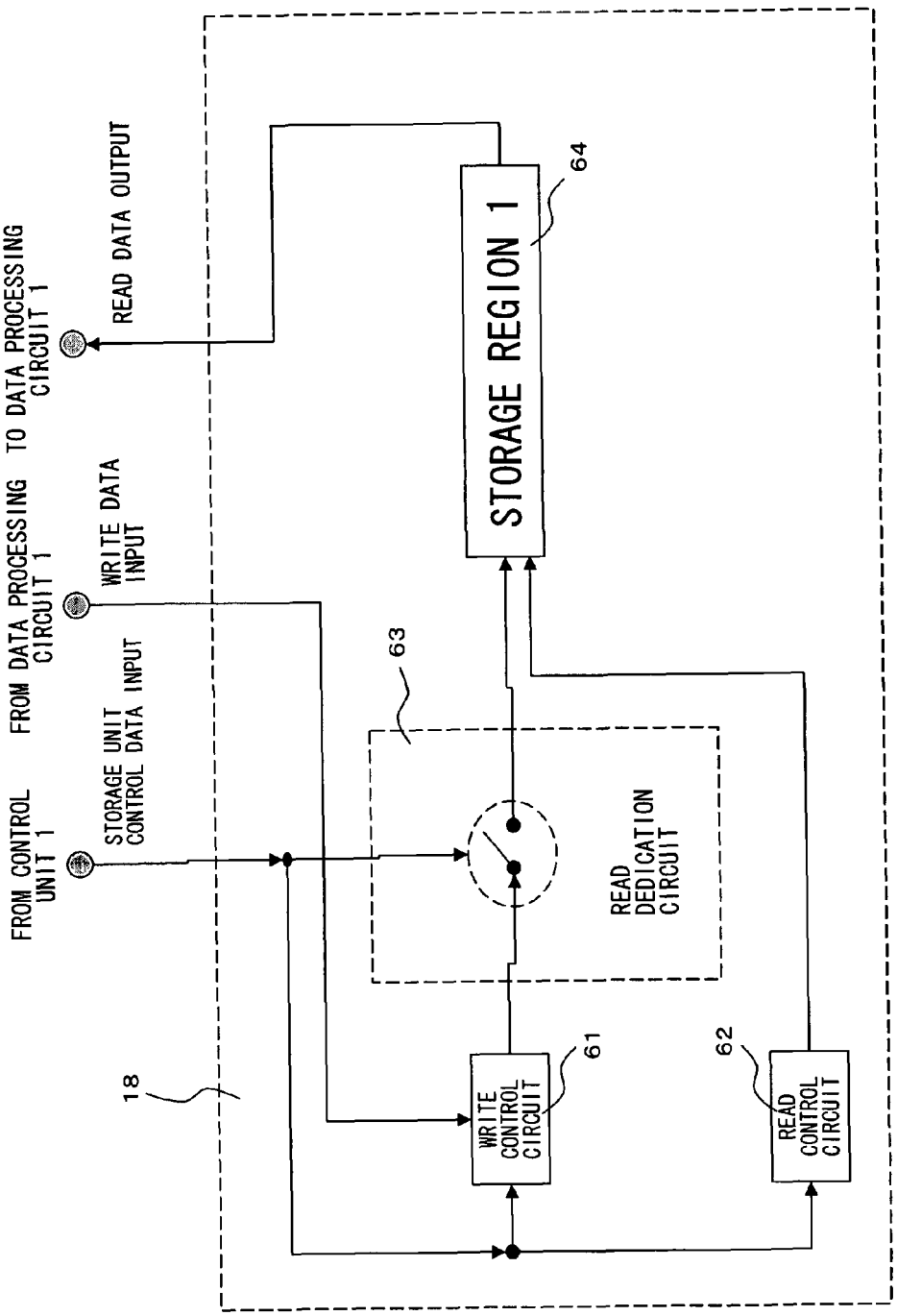
FIG. 7a shows a functional block diagram of an example of a storage unit 1.
Figure 7B:
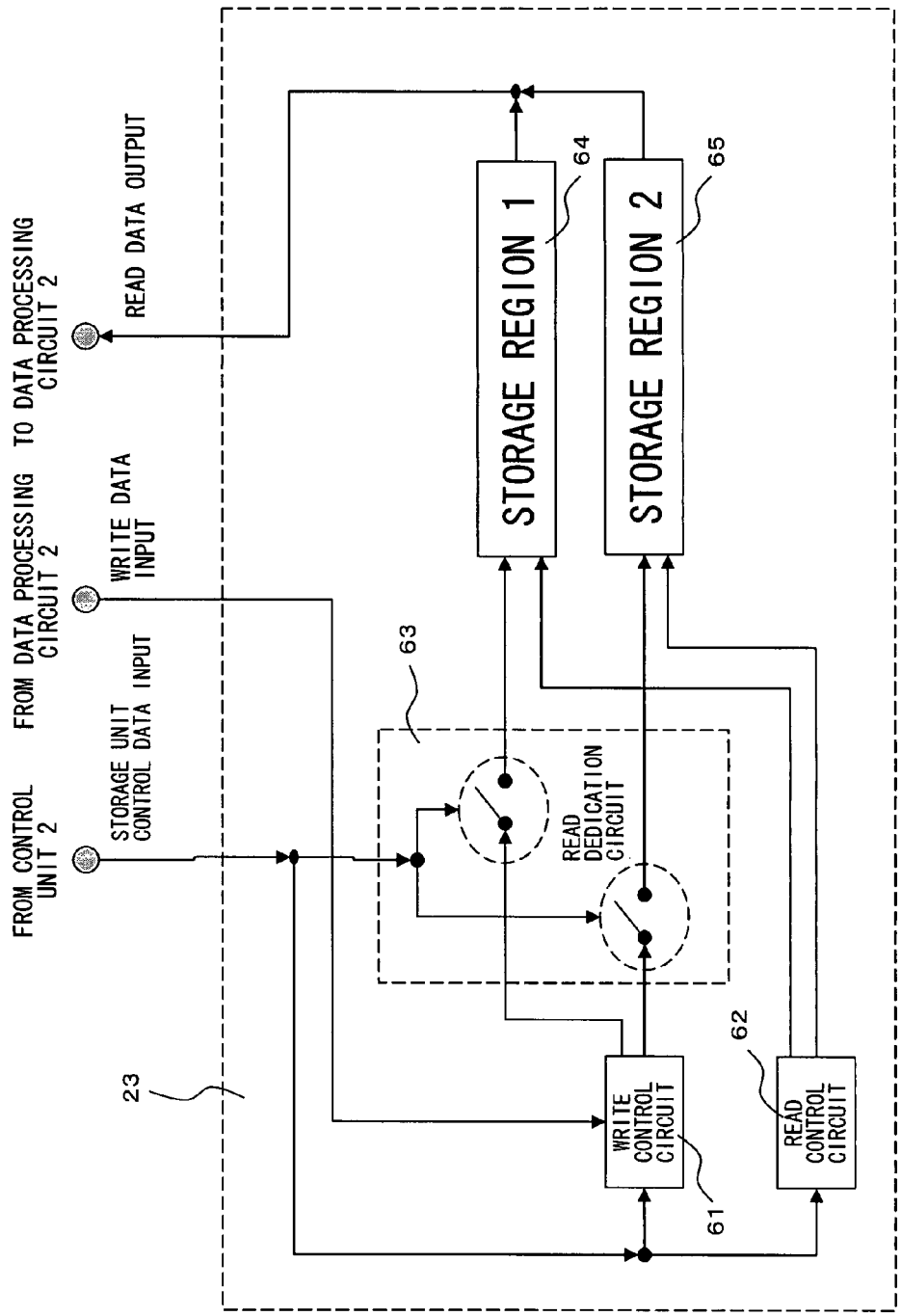
FIG. 7b shows a functional block diagram of an example of a storage unit 2.
Figure 7C:
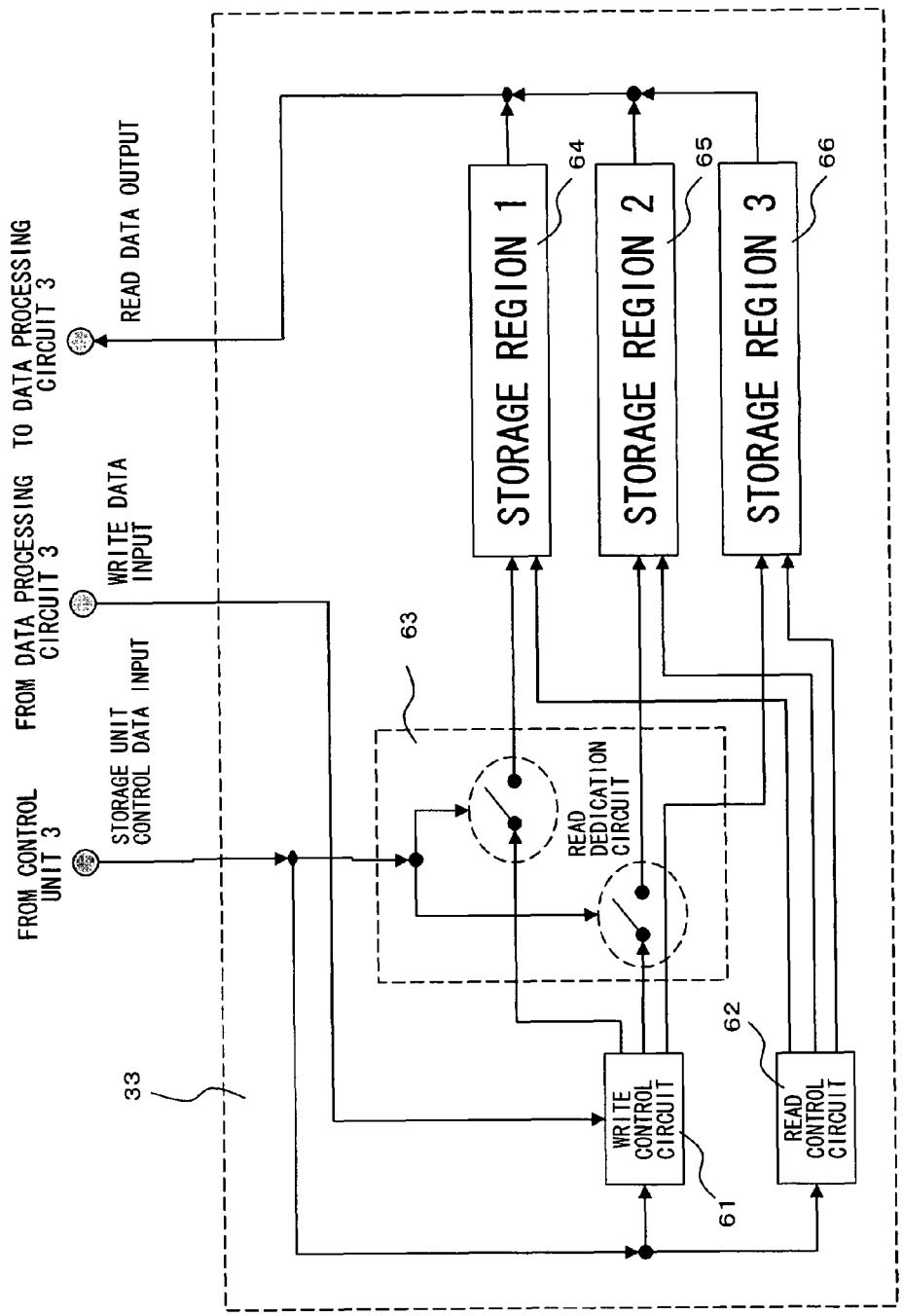
FIG. 7c shows a functional block diagram of an example of a storage unit 3.
Figure 8:
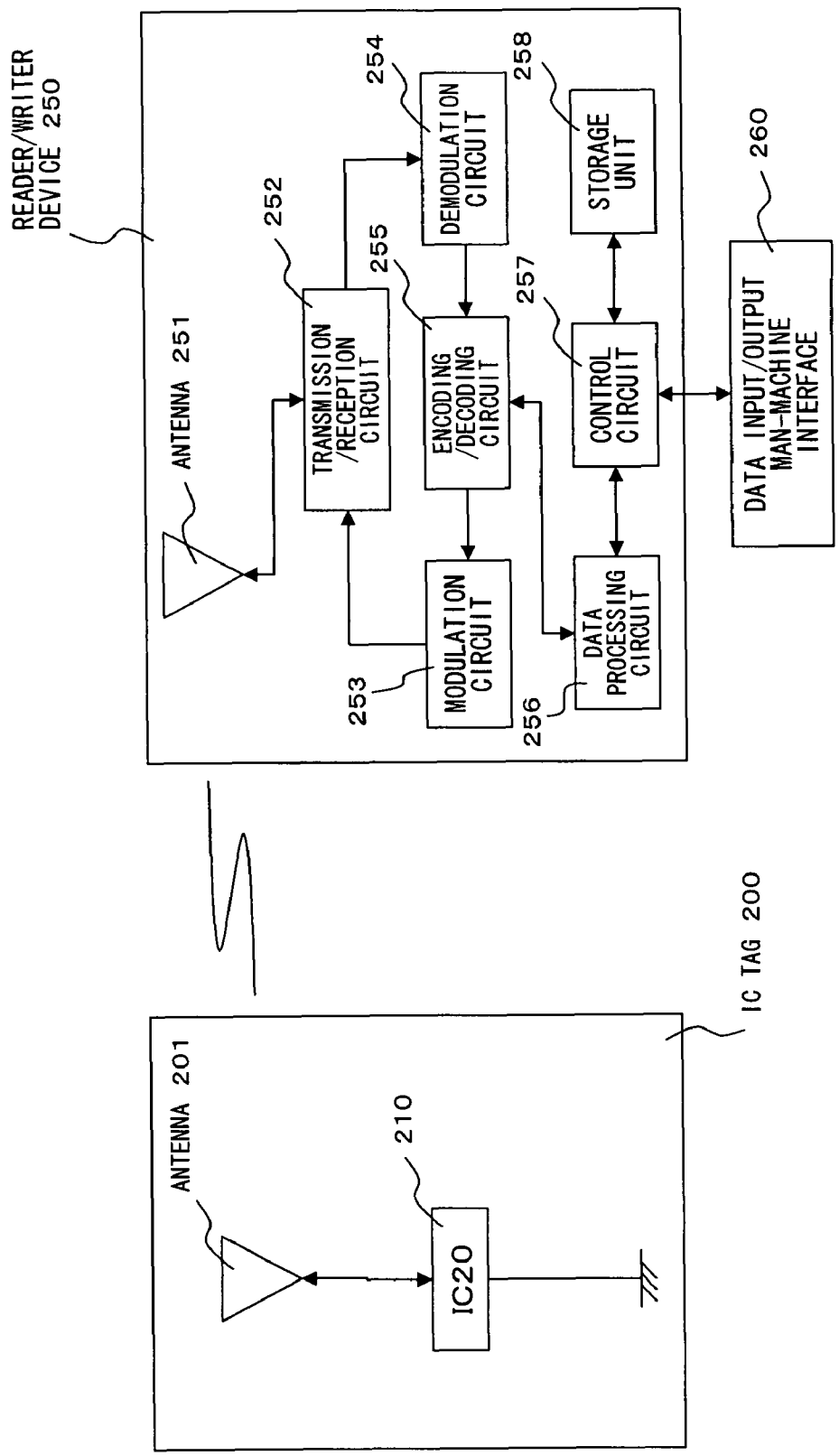
FIG. 8 shows an example of a management system using a conventional IC tag.

FIGS. 7a, 7b, and 7c show functional block diagrams of examples of the storage unit 1 (18), storage unit 2 (23), and storage unit 3 (33).

As shown in FIG. 7a, the storage unit 1 (18) includes a write control circuit 61, a read control circuit 62, and a read-dedicating circuit 63 for a storage region 1 (64) from and to the data processing circuit 1 (16). The write control circuit 61, based on write request control data from control unit 1, records write data from the data processing circuit 1 (16), which is based on the first function of the IC tag, in the storage region 1 (64). The read-dedicating circuit 62, based on control data from the control circuit 1 (17) demanding read dedication, can prevent the writing of data in the storage region 1 (64). In this way, writing of data can be prevented and the storage region 1 (64) can be rendered dedicated to read-only purposes. The read control circuit 62, based on control data from the control unit 1 (17) demanding a readout, delivers the data stored in the recording region 1 (64) to a data processing unit 3 (31).

FIG. 7b shows the configuration of the storage unit 2 in IC2. As shown in FIG. 7b, the storage unit 2 (23) is configured similarly to the storage unit 1 (18), and it carries out the writing process, reading process, and read-dedicating process with regard to the storage region 2 (65) on the basis of the second function.

FIG. 7c shows an example of the storage unit 3 (33) of IC3. As shown in FIG. 7c, the storage unit 3 (33) carries out the write process, read process, and read-dedicating process similarly to the storage unit 1 (18). The storage unit 3 (33), however, is composed of a storage region 1 (64) and a storage region 2 (65) for recording the operation of the first function and the second function controlled by IC 1 and IC2, in addition to the storage region 3 (66) 3 for recording the data based on the operation of the third function.

With regard to the IC tag shown in FIG. 1, processes are performed along the distribution process, as follows: 1) With the portion A1, portion A2, and portion B all ready, the tag is fed with data (which is stored in the storage unit), such as the product identification code, manufacturing number, date of manufacture, shipping date, and the like, and the tag is then affixed to a product; 2) Upon shipping from the factory, the portion A1 is separated from the tag, and the product is shipped to a distribution outlet. The thus separated portion A1 is left as a shipping source stub; 3) At the distribution outlet, data such as date of selling, name of distribution outlet, and the like is entered. This is followed by separating of the portion A2, and the product with the tag having only the portion B is handed to the purchaser. The thus separated portion A2 is kept as a distribution outlet stub; 4) The tag with the sole portion B which is handed to the purchaser together with the product becomes a purchaser stub. Table 2 shows an example of the corresponding relationship between changes in the state of the tag and the resultant function changes in the tag in a case where the tag of the present embodiment is utilized for merchandise distribution management.

TABLE 2

Table 1 of the correspondence between function changes in tag and functions of individual ICs

| Distribution step | Factory (before shipping) | Distribution outlet (shipping to sale) | Purchaser (after purchase) |
|---|---|---|---|
| State of tag | No separation (A1, A2, and B are all there) | A1 is separated (A2 and B remain) | A2 is separated following A1 (only B remains) |
| Function of tag | Input/output of data (data 1) including product ID code, manufacturing No., date of manufacture, and shipping date/time (first function) | Output of data 1, and input/output of data (data 2) including date/time of sale, name of distribution store (second function) | Output of data 1 and data 2, and input/output of arbitrary data (data 3) including memo by purchaser (third function) |
| Function of IC1 | Controls communication with the outside of tag; Communication with IC2 and IC3; Designation of address of storage region 1 in storage units 1 to 3; Output of instruction to write data 1 in storage region 1 in storage units 1 to 3; Write/read of data 1 in storage region 1 of storage unit 1 | A1 separated | A1 separated |
| Function of IC2 | Communication with IC1 and IC3; Output of instruction to prohibit writing in regions other than storage region 1, to storage unit 3 of IC3; Write of data 1 in storage region 1 of storage unit 2 | Control communication with the outside of the tag; Communication with IC3; Designation of address in storage region 2 of storage units 2 and 3; Write/read of data 2 in storage region 2 of storage unit 3; | A2 separated |

TABLE 2-continued

Table 1 of the correspondence between function changes
in tag and functions of individual ICs

| Distribution step | Factory (before shipping) | Distribution outlet (shipping to sale) | Purchaser (after purchase) |
|---|---|---|---|
| Function of IC3 | Communicate with IC1 and IC2; Write of data 1 in storage region 1 of storage unit 3 | Dedicate storage region 1 of storage unit 2 for readout Communicate with IC2; Dedicate storage region 1 of storage unit 3 for readout; Write of data 2 in storage region 2 in storage unit 3 | Control communication with the outside of the tag; Dedicate storage regions 1 and 2 of storage unit 3 for readout; Write/read of data 3 in storage region 3 of storage unit 3 |

In Table 2, all of the controls for realizing the first function are under IC1 (10), and all of the controls for realizing the second function are under IC2 (20).

Thus, upon shipping from the factory, IC1 (10) has the functions including: control of communication with the outside of the tag; communication with IC2 (20) and IC3 (30); designation of an address in the storage region 1 of the storage units 1 to 3; output of an instruction to write data 1 in the storage region 1 of the storage units 1 to 3; and write and read of data 1 in and out of the storage region 1 of the storage unit 1. Through these functions, IC1 carries out the first function for the input/output of data (data 1), including product identification code, manufacturing number, date of manufacture, and shipping date and the like. IC2 (20) has the functions for communication with IC1 and IC3; output of an instruction to prohibit writing in regions other than the storage region 1, to the storage unit 3 in IC3 (30); and writing of data 1 in the storage region 1 of the storage unit 2. IC3 (30) has the functions for communication with IC1 (10) and IC2 (20), and writing of data 1 in the storage region 1 of the storage unit 3.

At the distribution outlet, where the portion A1 is already separated, IC2 (20) has the functions for: communication with the outside of the tag; communication with IC3 (30); designation of an address in the storage region 2 of the storage units 2 and 3; writing and reading of data 2 in and out of the storage region 2 of the storage unit 2; and dedicating of the storage region 1 of the storage unit 2 for readout (read-only) purposes. In this way, IC2 (20) carries out the second function including the output of data 1 and the input/output of data (data 2) including date of selling and name of distribution outlet and the like.

IC3 (30) carries out the functions for communication with IC2 (20); dedicating of the storage region 1 of the storage unit 3 for readout purpose; and writing of data 2 in the storage region 2 of the storage unit 3.

At the purchaser (after purchase), where the portions A1 and A2 are separated, IC(30), with A2 already separated, has the functions for: controlling communication with the outside of the tag; dedicating of the storage regions 1 and 2 of the storage unit 3 for readout (read-only) purposes; and writing/ reading of data 3 in and out of the storage region 3 of the storage unit 3. Thus, IC3 (30) carries out the third function including the output of data 1 and data 2, and the input/output of arbitrary data (data 3), such as a memo by the purchaser.

The read dedication process is carried out because it is preferable to disable some of the functions of the individual IC tags (such as the function of writing of information in a storage region dedicated for the particular tag) after a particular region has been separated.

TABLE 3

Table 2 of the correspondence between changes in the function of the tag and the
function of individual ICs

| | Factory (before shipping) | Distribution outlet (shipping to sale) | Purchaser (after purchase) |
|---|---|---|---|
| Distribution step | | | |
| State of tag | No separation (A1, A2, and B are all there) | A1 is separated (A2 and B remain) | A2 is separated following A1 (only B remains) |
| Function of tag | Input/output of data (data 1) including product ID code, manufacturing No., date of manufacture, and shipping date/time (first function) | Output of data 1, and input/output of data (data 2) including date/time of sale, name of distribution store (second function) | Output of data 1 and data 2, and input/output of arbitrary data (data 3) including memo by purchaser (third function) |
| Function of IC1 | Controls communication with the outside of tag; | A1 separated | A1 separated |

TABLE 3-continued

Table 2 of the correspondence between changes in the function of the tag and the function of individual ICs

| Distribution step | Factory (before shipping) | Distribution outlet (shipping to sale) | Purchaser (after purchase) |
|---|---|---|---|
| Function of IC2 | Communication with IC2 and IC3; Output of instruction to write data 1 in storage region 1 of storage units 1 to 3; Write/read of data 1 in storage region 1 of storage unit 1 Communication with IC1 and IC3; Designation of address of storage region 1 in storage units 1 to 3; Output of instruction prohibiting writing in regions other than storage region 1, to storage unit 3 of IC3; Write/read of data 1 in storage region 1 of storage unit 2 | Control communication with the outside of the tag; Communication with IC3; Read/write of data 2 in storage region 2 of storage unit 2; Dedicate storage region 1 of storage unit 2 for readout; Output of an instruction to storage unit 3 of IC3 prohibiting writing in regions other than storage region 2 | A2 separated |
| Function of IC3 | Communicate with IC1 and IC2; Write data 1 in storage region 1 of storage unit 3 | Communicate with IC2; Designation of address in storage region 2 of storage units 2 and 3; Dedicate storage region 1 of storage unit 3 for readout; Write data 2 in storage region 2 in storage unit 3 | Control communication with the outside of the tag; Dedicate storage regions 1 and 2 of storage unit 3 for readout; Write/read data 3 in storage region 3 of storage unit 3 |

Alternatively, some of the control functions for realizing the first function may be shared by IC1 (10) and IC2 (20) and some of the control functions for realizing the second function may be shared by IC2 (20) and IC3 (30), as shown in Table 3. Further, the writing of data in the storage region 3 of the storage unit 3, which is the third function, may be blocked by IC2.

Specifically, upon shipping from factory, IC1 (10): controls communication with the outside of the tag; communicates with IC2 and IC3; outputs an instruction to write data 1 in the storage region 1 of the storage unit 1 to 3; and writes and reads data 1 in and out of the storage region 1 of the storage unit 1, while IC2 (20): communicates with IC1 and IC3; designates an address in the storage region 1 of the storage units 1 to 3; outputs to the storage unit 3 of IC3 an instruction prohibiting the writing of data in regions other than the storage region 1; and writes data 1 in the storage region 1 of the storage unit 2. As will be seen by comparing with Table 2, some of the functions (first function) of IC1 (10) are carried out by IC2 (20).

When the functions for realizing any one of the functions are distributed among a plurality of ICs, as shown in Table 3, the tag would not operate normally if the order in which the tag including the ICs should be separated is disregarded, thus disabling the proper use of the tag and preventing unauthorized use.

While in Table 3 some of the functions of IC1 (10) in A1 (first function) are shared with IC2 (20) in A2, they may be also shared with IC3 (30) in B as well as IC2 (20).

TABLE 4

Table of correspondence between the state of tag and data stored in a storage region

| Distribution step | Factory (before shipping) | Distribution outlet (shipping to sale) | Purchaser (after purchase) |
|---|---|---|---|
| State of tag | No separation (A1, A2, and B are all there) | A1 is separated (A2 and B remain) | A2 is separated following A1 (only B remains) |

TABLE 4-continued

Table of correspondence between the state of tag and
data stored in a storage region

| Distribution step | Factory (before shipping) | Distribution outlet (shipping to sale) | Purchaser (after purchase) |
|---|---|---|---|
| Function of tag | Input/output of data including product ID code, manufacturing No., date of manufacture, and date/time of shipping | Output of data including product ID code, manufacturing No., date of manufacture, and date/time of shipping; Input/output of data including date/time of sale and name of outlet | Output of data including product ID code, manufacturing number, date of manufacture, date/time of shipping, date/time of sale, and name of outlet; Input/output of arbitrary data including a memo by the purchaser |
| Data stored in storage region 1 | product ID code; manufacturing number, date of manufacture, and date/time of shipping (write/read of data allowed) | product ID code, manufacturing number, date of manufacture, and date/time of shipping (only read of data allowed) | product ID code, manufacturing number, date of manufacture, and date/time of shipping (only read of data allowed) |
| Data stored in storage region 2 | No stored data | Input/output of data including date/time of sale and name of outlet (write/read of data allowed) | Input/output of data including date/time of sale and name of outlet (only read of data allowed) |
| Data stored in storage region 3 | No stored data | No stored data | Arbitrary data including a memo entered by the purchaser (write/read of data allowed) |

Table 4 shows the correspondence between changes in the state of the tag of the invention and resultant changes in the function of the tag when the IC tag of FIG. 1 is applied to the aforementioned distribution management, and the relationship between the information stored in each storage region of the storage units 1 to 3 and the state of each storage region. As shown in Table 4, with regard to the stored data in the storage region 1, for example, at the factory (before shipping), it is allowed to write and read data such as product identification code, manufacturing number, date of manufacture, and shipping date/time. In contrast, at the distribution outlet (after shipping and prior to sale), it is only allowed to read data such as product identification code, manufacturing number, date of manufacture, and shipping date. Thus, the writing of data in each of the storage regions of the storage units 1 to 3 is limited depending on a change in the state of the tag in the distribution process, thereby making it more difficult to tamper with the stored information.

TABLE 5

Table of correspondence between functions of A1, A2, and B after
being separated from tag main body, and those of individual ICs

| Stored location | Factory (shipping source) | Distribution outlet (seller) | Purchaser |
|---|---|---|---|
| Type of tag (name of IC) | A1 (IC1) | A2 (IC2) | B (IC3) |
| Function of tag | Output of data (data 1) such as product ID code, manufacturing number, date of manufacture, and date/time of shipping | Output of data 1 and data (data 2) such as date/time of sale and name of outlet | Output of data 1 and data 2; Input/output of arbitrary data (data 3) such as a memo by the purchaser |
| Function of IC | Control of communication with the outside of the tag (A1); Dedication of storage region 1 of storage unit 1 for readout; Reading of | Control of communication with the outside of the tag (A2); Dedication of storage regions 1 and 2 of storage unit 2 for readout; | Control of communication with the outside of the tag (B); Dedication of storage regions 1 and 2 of storage unit 3 for readout; |

TABLE 5-continued

Table of correspondence between functions of A1, A2, and B after being separated from tag main body, and those of individual ICs

| Stored location | Factory (shipping source) | Distribution outlet (seller) | Purchaser |
|---|---|---|---|
| | data 1 from storage region 1 of storage unit 1 | Reading of data 1 and 2 from storage regions 1 and 2 of storage unit 2 | Write and read of data 3 in storage region 3 of storage unit 3 |

Table 5 shows the function of A1 and A2 as an IC tag after they are separated from the tag main body when the IC tag of FIG. 1 is applied to distribution management. The portions A1 and A2 are each independently equipped with an external interface and a power supply circuit, so that the portions A1 and A2 each include the function as an IC tag, as shown in Table 5, thus facilitating data management. Specifically, the tag (A1) after separation is capable of controlling communication with the outside, dedicating the storage region 1 of the storage unit 1 for readout purpose, and reading the data 1 from the storage region 1 of the storage unit 1. The tag (A2) after separation is capable of controlling communication with the outside of the tag (A2), dedicating the storage regions 1 and 2 of the storage unit 2 for readout purpose, and reading the data 1 and 2 from the storage regions 1 and 2 of the storage unit 2. The tag (B) after separation is capable of controlling communication with the outside of the tag (B), dedicating the storage region 1 and 2 of the storage unit 3 for readout purpose, and writing/reading of the data 3 in and out of the storage region 3 of the storage unit 3.

The foregoing embodiment has been described with reference to a contactless tag which exchanges information with the outside wirelessly, such as by using radio wave. The medium for such exchange of information is not limited to radio wave, however; for example, magnetism may be used. The type of the tag is not limited to the contactless type; for example, the tag may be of contact type.

Furthermore, in the foregoing embodiment, it has been described that when Ak is separated, the signal line Lk is physically severed. However, this is merely an example; what is essential is not that the signal line is severed but that the electric signal connection between ICk and ICk+1 are severed upon separation of Ak. Thus, the configuration of the signal line Lk is not limited to such that the signal line straddles the separating line of the tag. For example, a configuration may be adopted such that an electric signal connection is established between ICk and ICk+1 via inductive or capacitive coupling between line patterns disposed opposite each other with the separating line between them, where the coupling becomes weaker or is eliminated upon separation of the tag.

Further alternatively, a configuration may be adopted such that, instead of the severing of the line by the separation of the tag, the portion A and portion B of the tag are partially overlapped upon each other, where the electric connection is eliminated by separating such overlap. In this case, the overlapping portions may be affixed with adhesive taping or the like which can be peeled as needed.

In the following, the structure of the separating line (separating portion) for separating the separable portion Ak from the tag main body of the IC tag of the present embodiment is described with reference to an example where n=2, n being the number of the separable portions separable from the tag main body.

Figure 10:
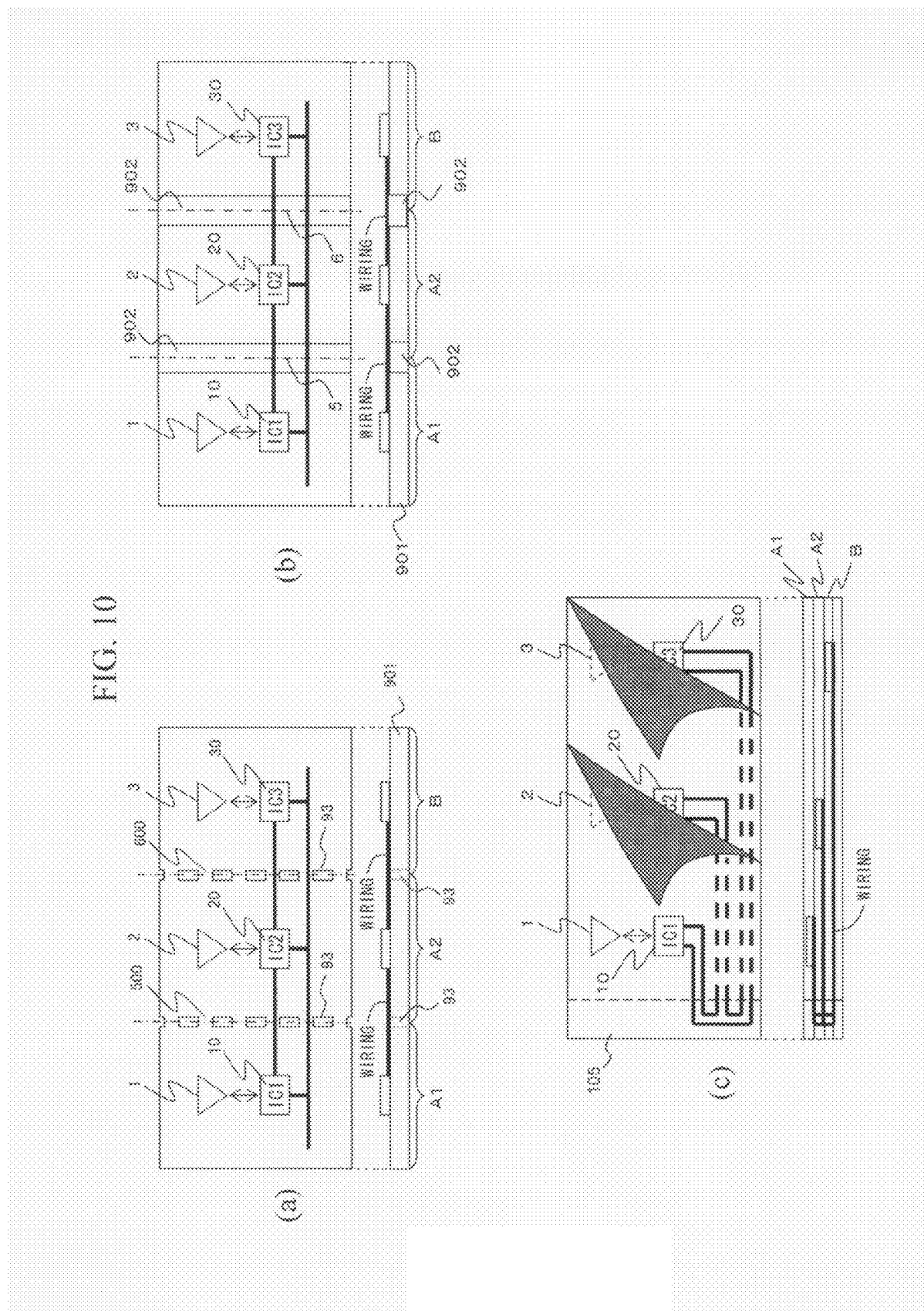
FIG. 10 is a drawing for the description of the mode and shape of a separating line (separating portion) using the IC tag of the invention where n=2, n being the number of portions separable from the tag main body.

FIG. 10(a) shows a structure of the IC tag in which the insulating substrate 90 is provided with cutouts 93 (throughholes and/or cutouts at the edges) along the separating line 1 (5) and separating line 2 (6). In this way, separation of the separable portions A1 and A2 from the tag main body is made easier.

FIG. 10(b) shows an IC tag in which the separation of A1 and A2 from the tag main body is made easier by forming the portions of the insulating substrate near the separating line 1 (5) between A1 and A2 and the separating line 2 (6) between A2 and B with a material 902 that is different from a substrate material 901 of the other portions of the insulating substrate. Possible combinations of the substrate materials 901 and 902 include: 1) 901: coated paper, and 902: non-coated paper; and 2) 901: vinyl material, and 902: paper material. This is, however, merely an example, and any combination may be used as long as the strength of the material 902 (tensile strength) is smaller than that of the material 901.

FIG. 10(c) shows a layered IC tag composed of A1, A2, and B stacked vertically, as opposed to the horizontal connection of A1, A2, and B shown in FIGS. 10(a) and 10(b). The wires connecting A1, A2, and B are connected vertically with respect to the substrate in a connecting portion 105. In such layered IC tag shown in FIG. 10(c), the separation of A1 or A2 takes place in a peeling manner rather than in a separating manner.

In the IC tag of the present embodiment, the separation of the tag is detected upon electric severing of the wires straddling between A1 and A2 and between A2 and B. Consequently, when the IC tag according to the present embodiment is actually affixed to a product, a part of the separating portion (i.e., the separating line portion of the tag) of the tag is subject to a potential separation unintended by the user.

Figure 11:
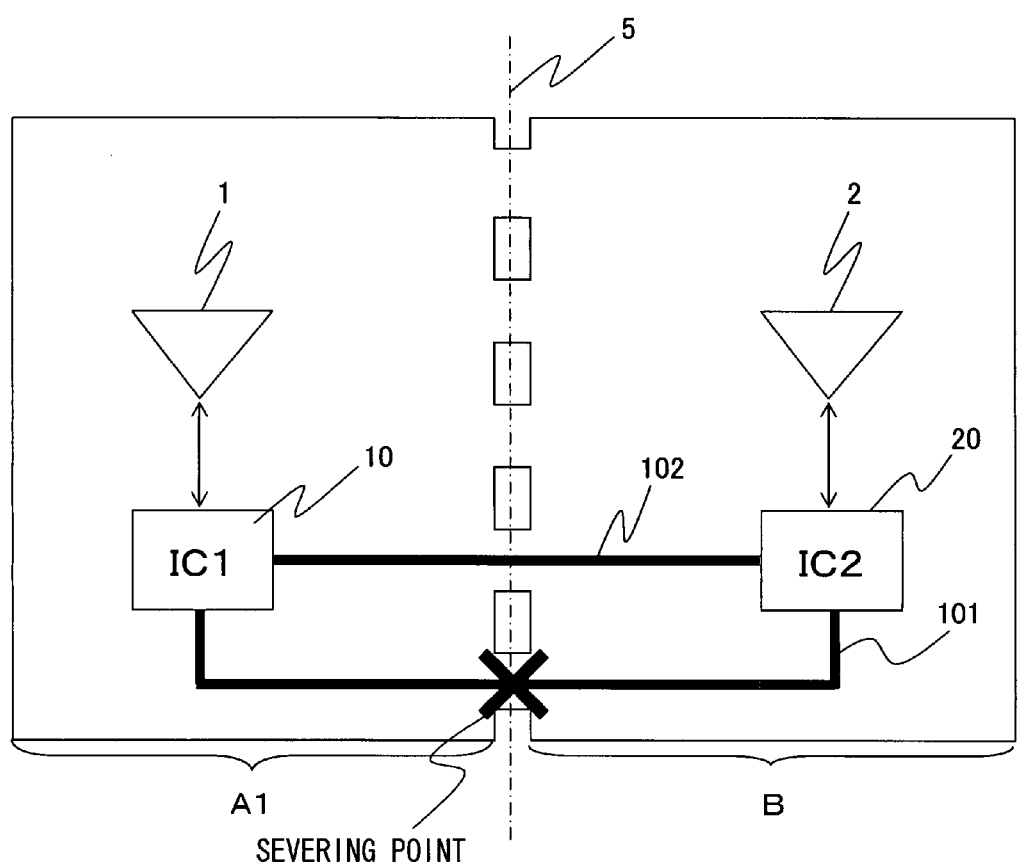
FIG. 11 shows the positional relationship between the severing point of A1 and B and the lines.

Such separation unintended by the user and problems caused thereby are described with reference to an IC tag where n=1, n being the number of separable portions from the tag main body of FIG. 11. In a case where the separation of A1 from the IC tag of FIG. 11 is determined by the presence or absence of severing of line 101 connecting IC1 (10) and IC2 (20), if a separation unintended by the user is caused at a severing point shown in FIG. 11 (where the separating line intersects line 101) for one reason or another, the IC tag judges that line 101 has been severed and A1 has been separated from B, resulting in a switching of the function of the IC tag unintended by the user.

The above problem can be prevented in a case where, as described above with reference to the operation of the separation decision circuit, A1 is judged to become separated from B when not just line 101 but line 101 and line 102 with different line arrangements are severed. However, this has not proved a sufficient countermeasure against a malfunction of the IC tag caused by a separation unintended by the user that occurred at the separating (line) portion of the IC tag.

In the following, an IC tag of the invention provided with features to prevent such malfunction caused by a partial separation at the separating (line) portion of the IC tag is described.

Figure 12:
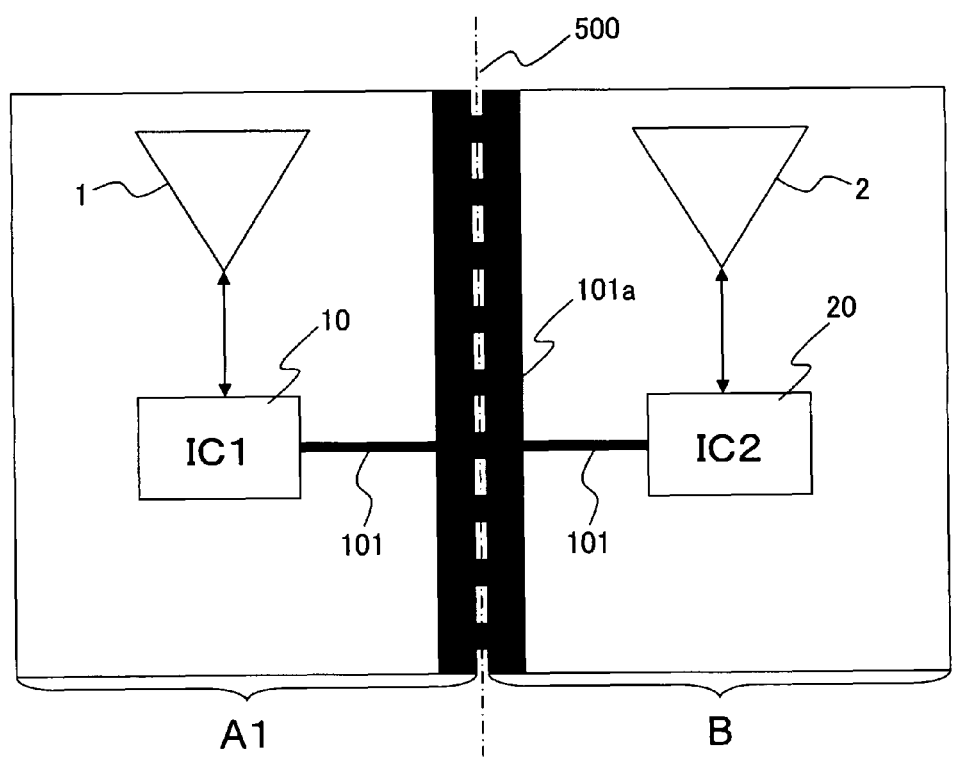
FIG. 12 shows an example of a first wiring pattern for preventing a malfunction of the IC tag caused by an unintended partial separation.

FIG. 12 shows an IC tag in which the width of line 101 connecting IC1 and IC2, which is used for the detection of separation of A1, is made substantially the same as the width of the tag near the perforated line for the separation of the tag along the separating line 1 (5), in view of the fact that an unintended severing tends to occur near the separating line 1 (5).

As shown in FIG. 12, as the width of line 101 is made almost as thick as the width of the tag as shown at 101a, it becomes possible to maintain the electric connection of the line 101 even if the separating line 1 (5) is partly (at a location closer to the edge of the tag, for example) severed unintentionally, because the line 101 is rarely severed along its entire width. This also provides the advantage that no electric severing occurs in the line 101 unless A1 is separated from B completely along the separating line 1 (5).

Figure 13:
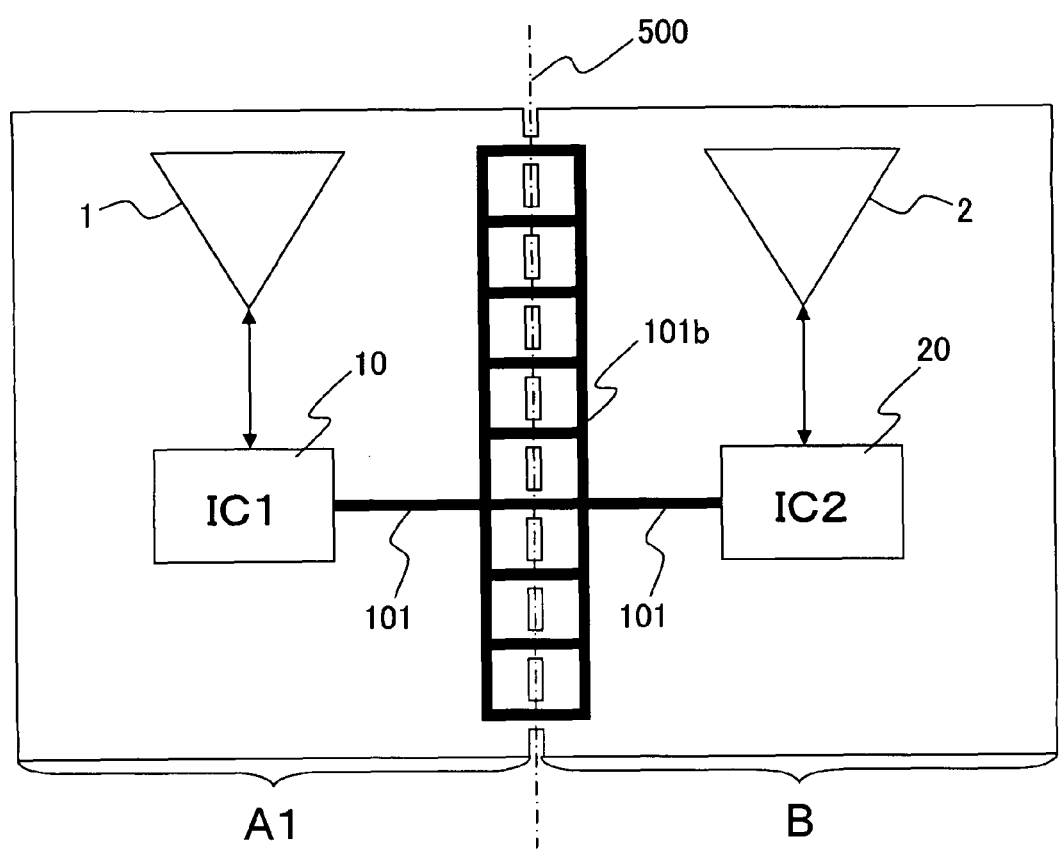
FIG. 13 shows an example of a second wiring pattern for preventing a malfunction of the IC tag caused by an unintended partial separation.

FIG. 13 shows an IC tag in which the line 101 connecting IC1 and IC2 that is used for the detection of separation of A1 near the separating line 1 (5) is divided into a plurality of branches 101b. The branch lines 101b intersect the separating line 1 (5) at a plurality of different locations.

As in the case of FIG. 12, the IC tag of FIG. 13 is capable of maintaining the electrical connection of the line 101 even if the separating line 1 (5) is partly and unintentionally severed (at a location closer to the edge of the tag, for example), because such severing would involve only some of the branch lines 101b. There is also the additional advantage that no electric severing occurs unless A1 is separated from B almost completely and all of the branch lines 101b are severed along the separating line 1 (5).

Figure 14:
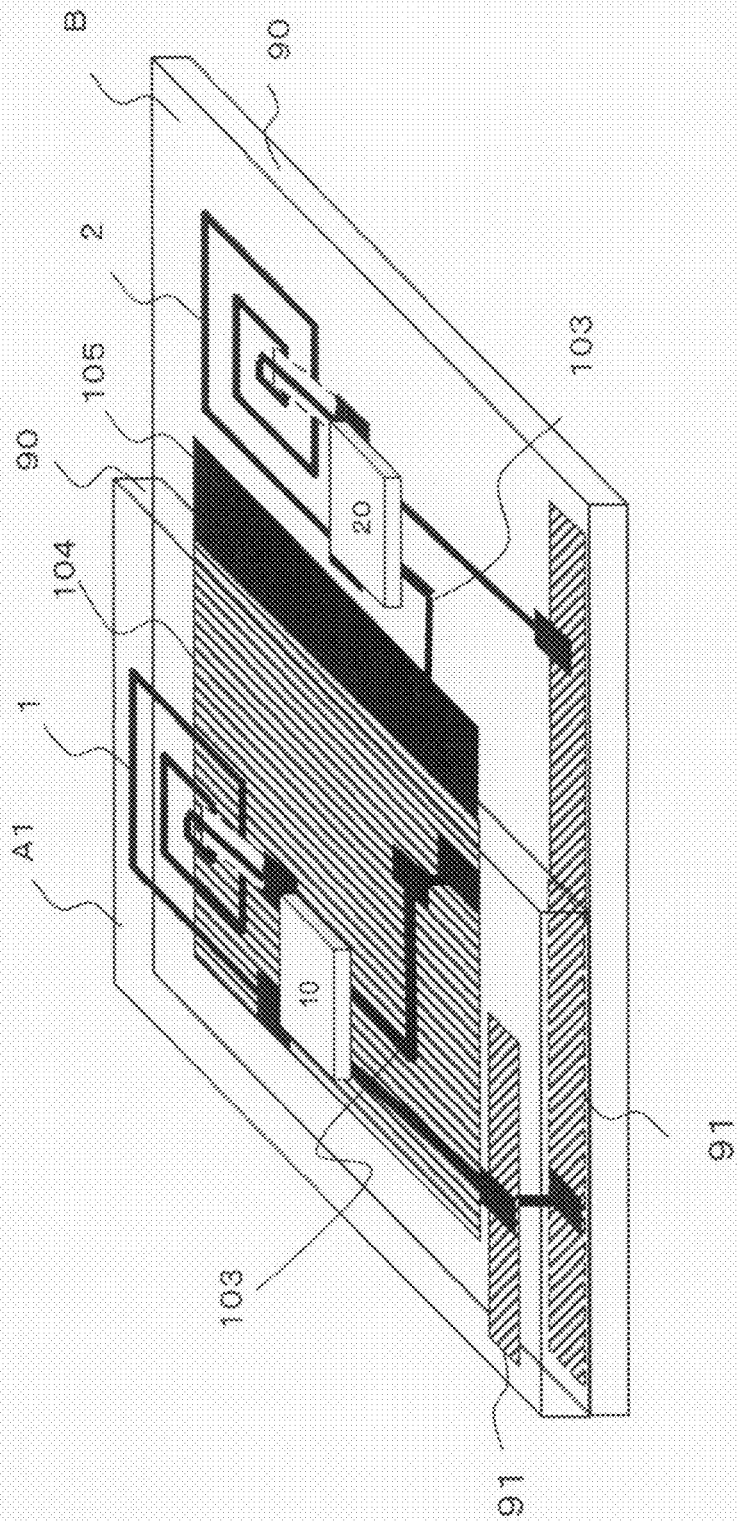
FIG. 14 is a drawing for the description of a tag in which the lines between IC1 and IC2 are connected in a planar manner.

FIG. 14 shows a perspective view of a layered IC tag with n=1, n being the number of portions separable from the tag main body, to which the above technique of FIG. 12 for preventing the malfunction caused by a partial separation at the separating portion of the IC tag unintended by the user, is applied, the technique involving the increase in the width of the line used for the separation determination at and near the separating portion. In FIG. 14, the common power supply line and the like that are inherent are omitted in order to clarify the wiring layout of the line 103 used for the detection of A1 separation, which is one of the key points of the present invention.

The layered IC tag of FIG. 14 with n=1 is composed of two layers shown in FIGS. 15(a) and (b), the former being layered on the latter. IC1 (10) and IC2 (20) of FIG. 14 are connected by lines 103, which are used for the detection of separation of A1. The lines 103 have a connecting surface 104 on the side of A1 facing B and a connecting surface 105 on the side of B facing A1, as shown in FIGS. 15(a) and 15(b), so that the lines 103 can have an increased area of connection.

Figure 16:
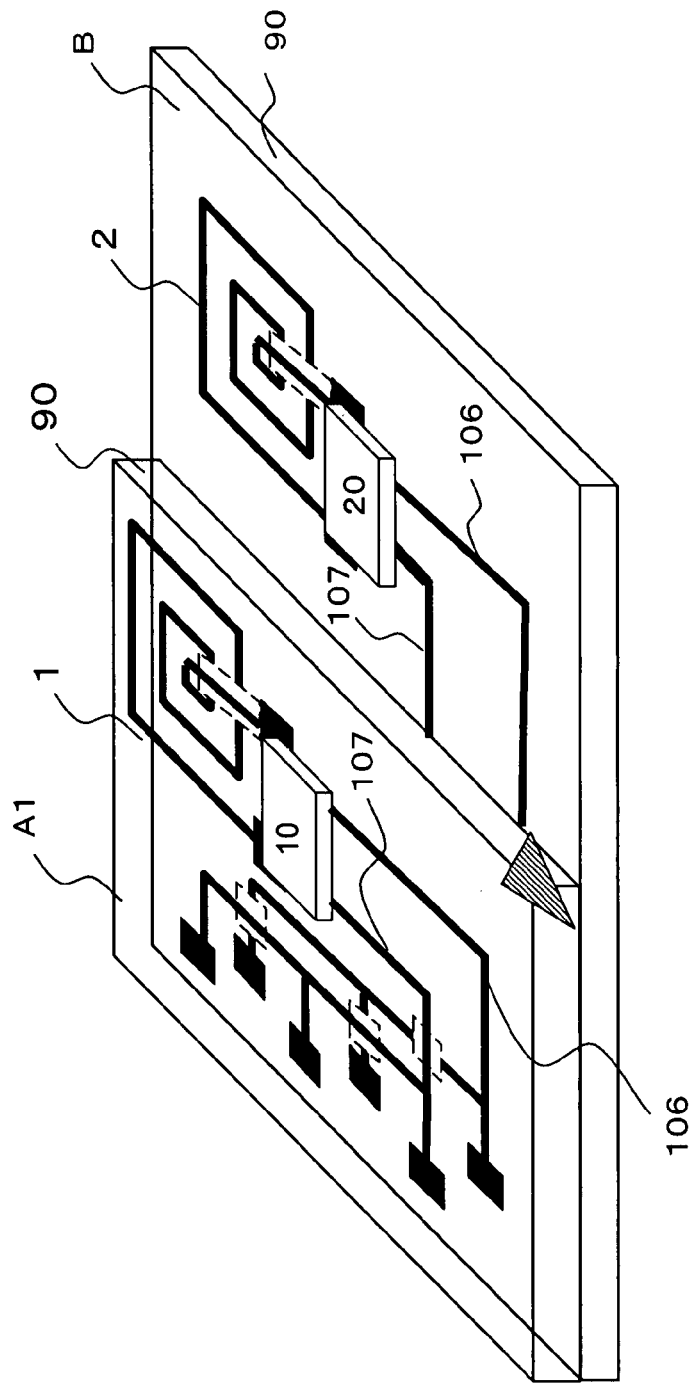
FIG. 16 shows an example of application of the second wiring pattern for preventing a malfunction of the IC tag caused by an unintended partial separation to the layered IC tag of FIG. 15.

FIG. 16 shows a perspective view of a layered IC tag with n=1, n being the number separating portions, to which the technique as described with reference to FIG. 13 for preventing a malfunction of the tag caused by a partial separation at the separating portion of the IC tag unintended by the user, is applied, the technique involving the branching of the line used for separation detection into a plurality of branches at and near the separating portion. In FIG. 16, the common power supply line and the like that are inherent are omitted so as to clarify the wiring layout of line 106 and line 107, which are used for the detection of separation of A1 and constitute one of the key points of the invention.

Figure 17:
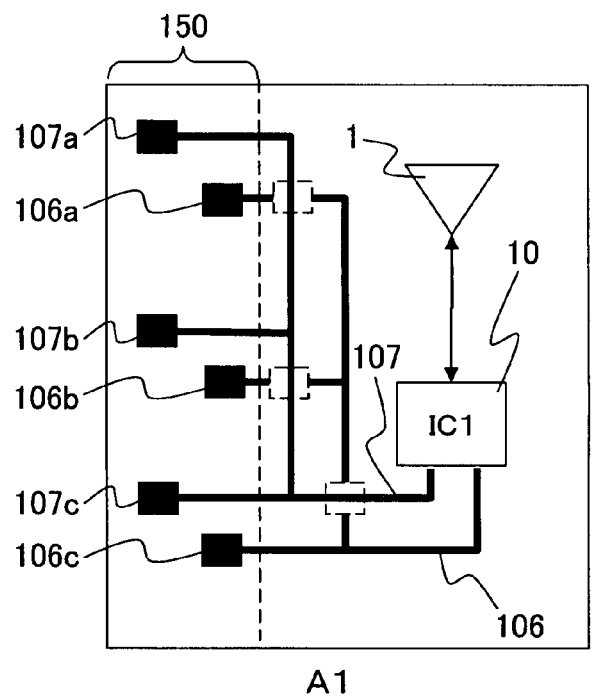
FIG. 17a shows an example of the lines in the IC tag of the invention in which the lines used for separation determination are intentionally adapted to be readily severed.
FIG. 17b shows an example of the lines in the IC tag of the invention in which the lines used for separation determination are intentionally adapted to be readily severed.
Figure 17:
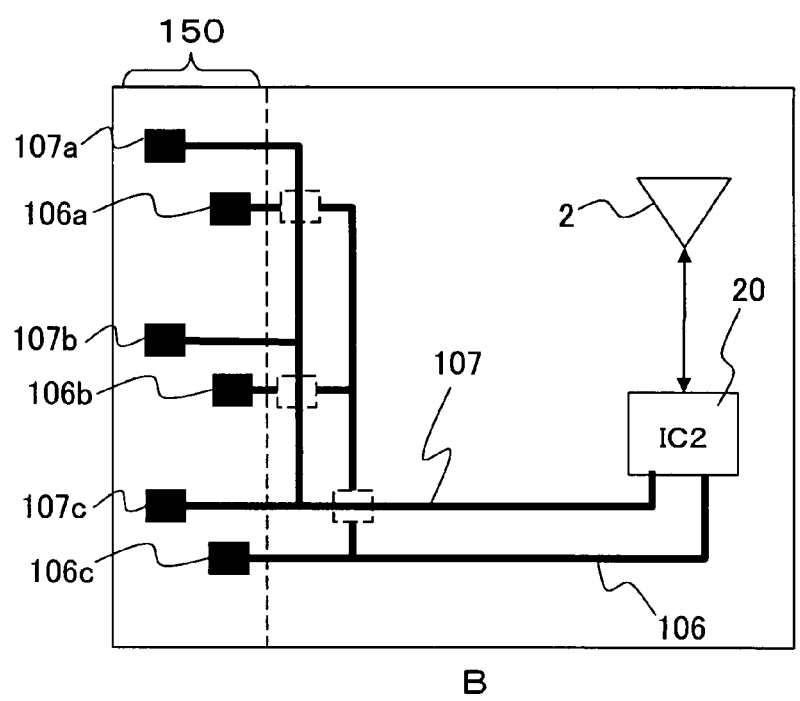

The layered IC tag of FIG. 16 is fabricated by layering the A1 layer shown in FIG. 17a on the B layer shown in FIG. 17b. The lines 106 and the lines 107 are each divided into three branch lines 106a, 106b, and 106c; and 107a, 107b, and 107c, respectively. The thus divided branch lines with the same numbers on the A1 and the B are connected to each other, respectively, by line connecting means, such as throughholes, provided in the insulator substrate of A1 in the connecting portion 150 thereof.

While the example of FIG. 16 has the connecting portion 150 located at the left end, the position of the connecting portion 150 is not particularly limited. For example, the entire overlapping portions of the tag may be used as connecting surfaces. Further, while the wiring patterns according to present embodiment are all regularly and evenly arranged, they may be irregularly and/or unevenly arranged.

Thus, by applying the above techniques to prevent the partial separation at the separating portion of the IC tag unintended by the user to the IC tag according to the present embodiment, it becomes possible to prevent the malfunction of the tag caused by the partial separation not intended by the user at the separating (line) portion of the IC tag due to the handling of the IC tag and the item to which the IC tag is affixed.

Figure 18:
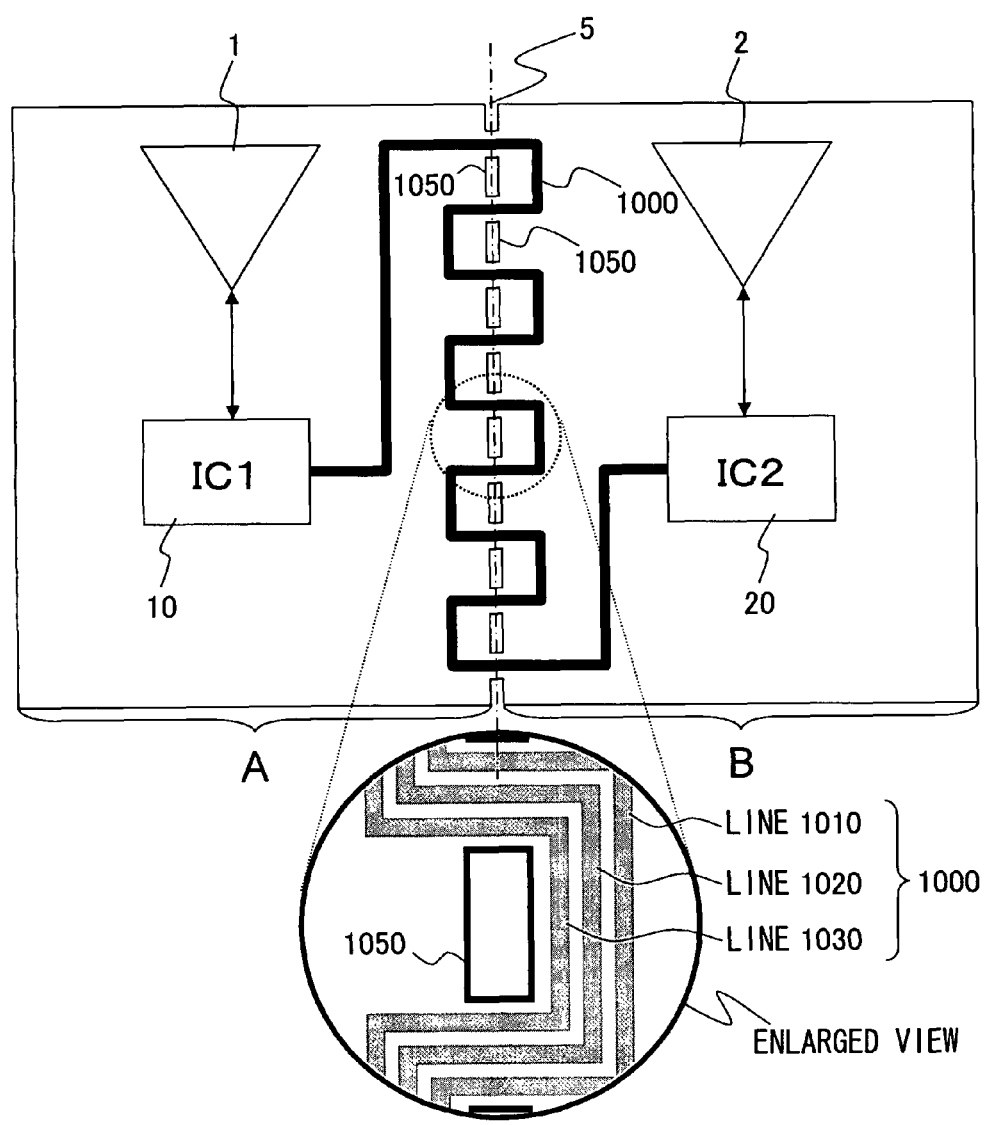
FIG. 18 is a plan view of an example of the lines disposed in a zigzag manner.

FIG. 18 shows an IC tag different from the foregoing IC tag described with reference to FIGS. 12 to 17 in which the technique to prevent malfunction in the tag separation determination caused by the partial separation at the separating portion (separating line portion of the tag) of the IC tag unintended by the user was applied. In the present example, a line used for the separation determination is intentionally adapted to be severable readily.

In the example of FIG. 18, in order to achieve the aforementioned purpose of permitting intentionally the line used for the separation determination to be readily severed, lines 1010, 1020, and 1030, which are used for the determination of separation of A1, are arranged in a zigzag manner with respect to the separating line 1 (5) so as to increase the number and area of intersections between the separating line 1 (5) disposed on a substrate 90 and the lines 1010, 1020, and 1030. In addition, along the separating line 1 (5), openings 1050 are intermittently provided. In this wiring layout of FIG. 18, the openings 1050 make it possible to sever the lines (1010, 1020, and 1030), which are used for the determination of separation of A1, even when a small tear occurs along the separating line 1 (5) between A1 and B in response to the external application of force to the tag, thereby increasing the probability of electric severing between IC1 (10) and IC2 (20).

Figure 19:
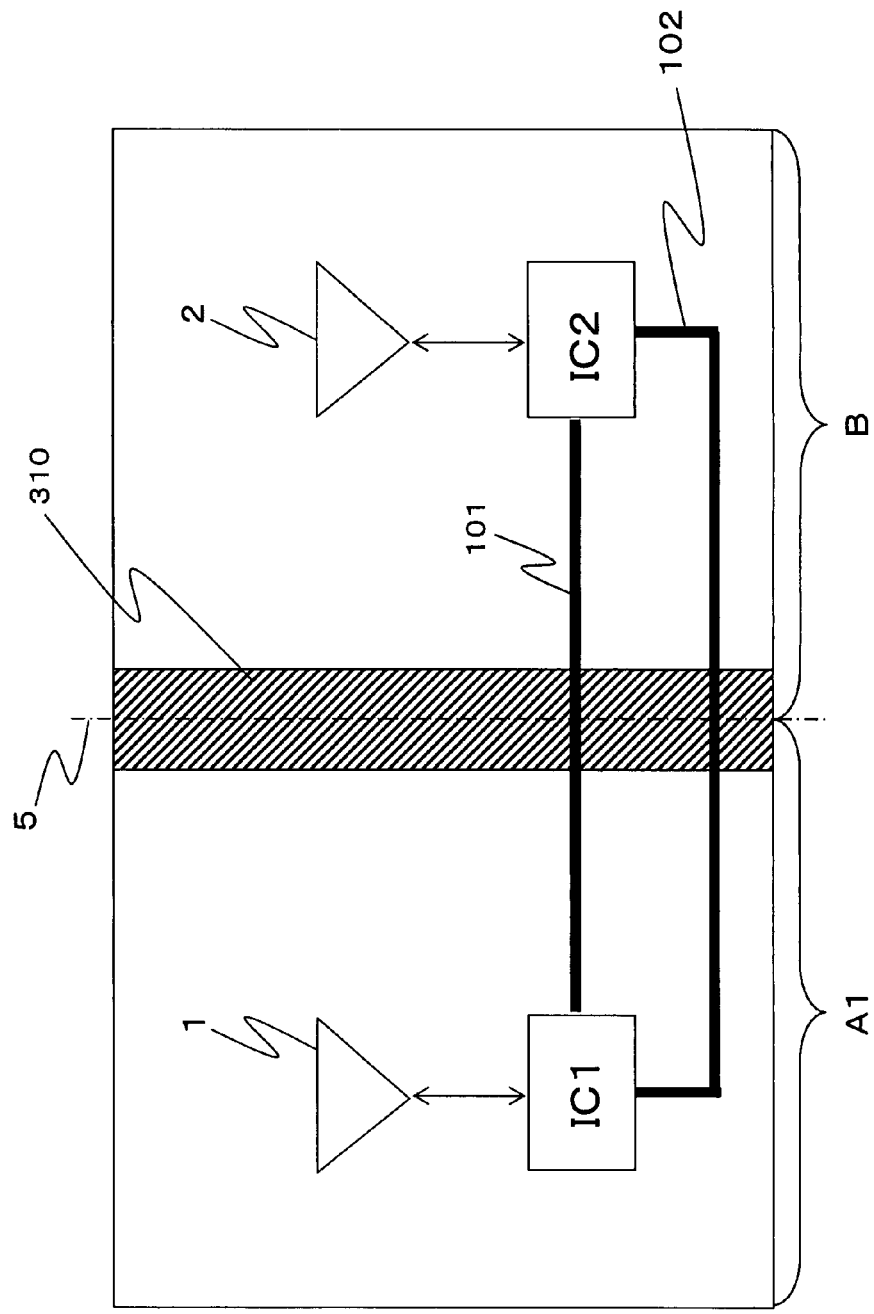
FIG. 19 shows an example where areas near the separating lines and the other regions are made of different materials.

FIG. 19 shows an IC tag adapted such that the line used for separation determination is intentionally adapted to be readily severed, wherein, as shown in FIG. 10(b), the substrate material 902 of the tag near the separating line 1 (5) is different from the material 901 of the substrate at portions thereof other than the vicinity of the separating line 1. As shown in FIG. 19, this IC tag is composed of A1 and B, which are connected via a separating portion 310 whose substrate material is 902. All of the lines connecting the tag A1 and the tag B pass the separating portion 310. For the substrate material 902 of the tag near the separating line, a material is selected whose mechanical strength deteriorates more easily due to chemical reaction or the like than that of the substrate material 901. Thus, under certain environment or conditions, the mechanical strength of the substrate material 902 deteriorates, thereby enabling intentionally the line used for separation determination to be readily severed.

Figure 20:
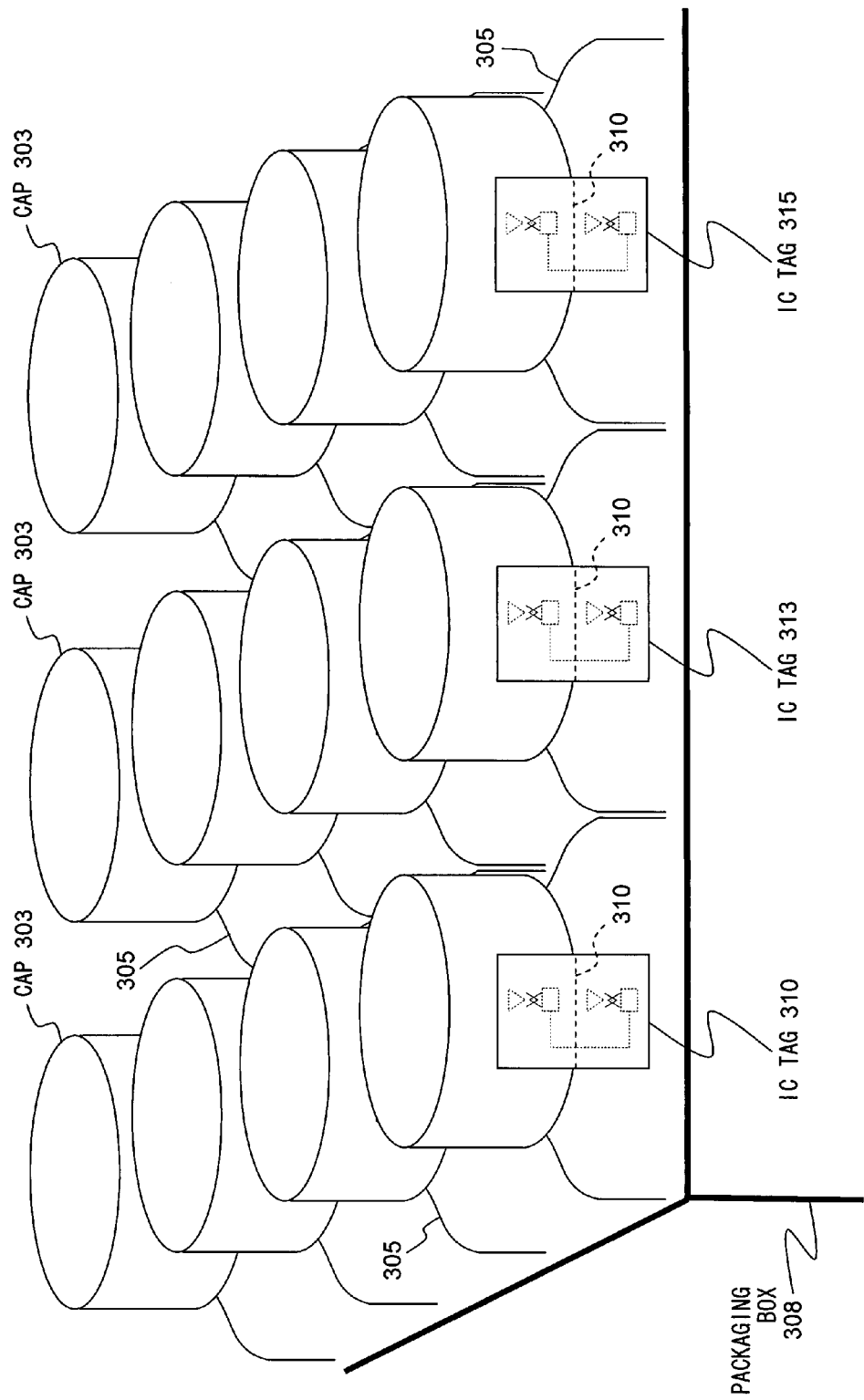
FIG. 20 shows an example where the IC tag of FIG. 17 has been applied to the seals of bottles.

FIG. 20 shows an application of the intended IC tag as a seal on a bottle where, as shown in FIGS. 18 and 19, the line used for separation determination is adapted to be readily severed.

The IC tags 310, 313, and 315 are affixed such that they straddle both a bottle 305 and a cap 303. Preferably, the IC tags are affixed such that, so as to ensure the detection of application of force to the cap 303 or the opening thereof, the separating line (310a, 313a, 315a) of the IC tag is aligned with the boundary between the bottle 305 and the cap 303. When the IC tag of FIG. 19 is thus used as a seal on a container such as a bottle as shown in FIG. 20, the substrate material 902 of the separating portion 310 may advantageously employ a material that dissolves upon reaction with the content of the container to which the IC tag is affixed, for the purpose of detecting the leakage of the content from the container, for example.

Such IC tag, where the line used for separation determination as shown in FIG. 20 is severed when opened, may be affixed to bottles, for example, whereby the data returned to a reader/writer device can be modified (i.e., the function of the IC tag is changed). When such bottles are put in a packaging box 308, it becomes possible to determine the presence or absence of damage or leakage from the bottles by monitoring a change in the function of the IC tag used as a seal on the bottles without opening the packaging box 308.

In the foregoing, the IC in which the line used for separation determination is intentionally adapted to be severed readily has been described with reference to examples in which the wiring layout and the substrate material of the IC tag have been ingeniously designed. However, the IC tag in which the line used for separation determination is intentionally adapted to be severed readily may be realized in other ways. For example, the line used for separation determination may be formed of conductive ink with little mechanical strength, or other material such as zinc or aluminum whose mechanical strength deteriorates or whose electric resistance increases due to chemical reaction such as corrosion.

FIGS. 21(a) to (c) show examples of the IC tag of the invention in which n=2, n being the number of separable portion, in which the information (such as the access code for the confirmation of input/output of data, and a setting code for changing data input/output limitation, for example) necessary for the identification of each IC tag and a change in the function thereof is located at a position that can be only acquired after the separable portion A1 or A2 is separated from the IC tag.

Figure 22:
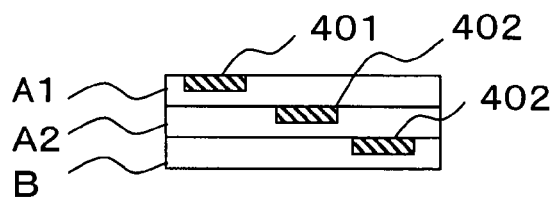
FIG. 22 shows a cross-sectional view of an IC tag.

In the tag of FIG. 21, as shown in FIG. 22, which shows cross-sections of FIG. 21, information 1 (401), which comprises a one-dimensional barcode, is located on the tag A1; information 2 (402), which comprises alphabets and numerals, is located on a portion of A2 that is covered by A1; and information 3 (403), which comprises a two-dimensional barcode, is located on a portion of B that is covered by A2, so that:

1) Information 2 (402) can be acquired only after A1 is separated from A2.
2) Information 3 (403) can be acquired only after A2 is separated from B.

Figure 23:
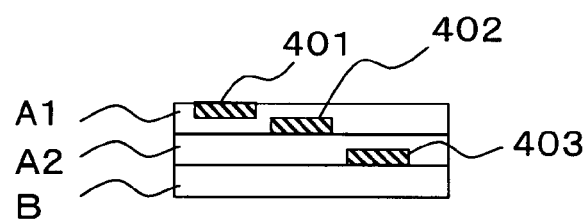
FIG. 23 shows a cross-sectional view of an IC tag.
Figure 24:
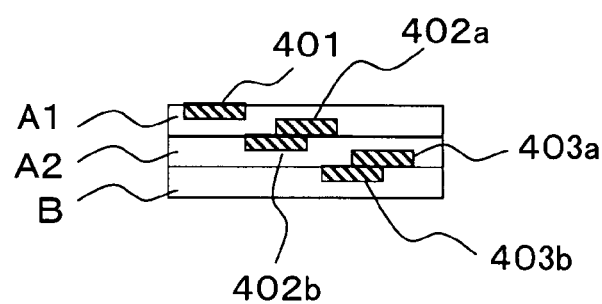
FIG. 24 shows a cross-sectional view of an IC tag.

With regard to the location of the information 1, information 2 (402), and information 3 (403), they may be located differently from as shown in FIG. 22, where information 1 (401) is located on A1, information 2 (402) is located on a top side of A2 (facing A1), and information 3 (403) is located on a top side of B (facing A2). For example, the following arrangements are also possible:

1) Information 1 (401) is located on A1; information 2 (402) is located on a back side of A1 (facing A2); and information 3 (403) is located on a back side of A2 (facing B) (FIG. 23)
2) Information 2 is divided into information 2a (402a) and information 2b (402b), and information 3 (403) is divided into information 3a (403a) and information 3b (403b); information 2a (402a) is located on a back side of A1 (facing A2), information 2b (402b) is located on a top side of A2 (facing A1), information 3a (403a) is located on a back side of A2 (facing B), and information 3b (403b) is located on a top side of B (facing A2), thus locating divided information at different locations in a divided manner (FIG. 24).

The arrangement of information 2 and information 3 is not particularly limited as long as they both can be acquired only after at least the separable portions (A1, A2) of the tag are separated, depending on the configuration of the IC tag (in terms of the shape, size, and location of A1, A2, and B). Thus, the arrangement is not limited to as shown in FIGS. 22, 23, and 24, where information 2 (402) and information 3 (403) are both hidden by the separable portions of the tag.

Figure 25:
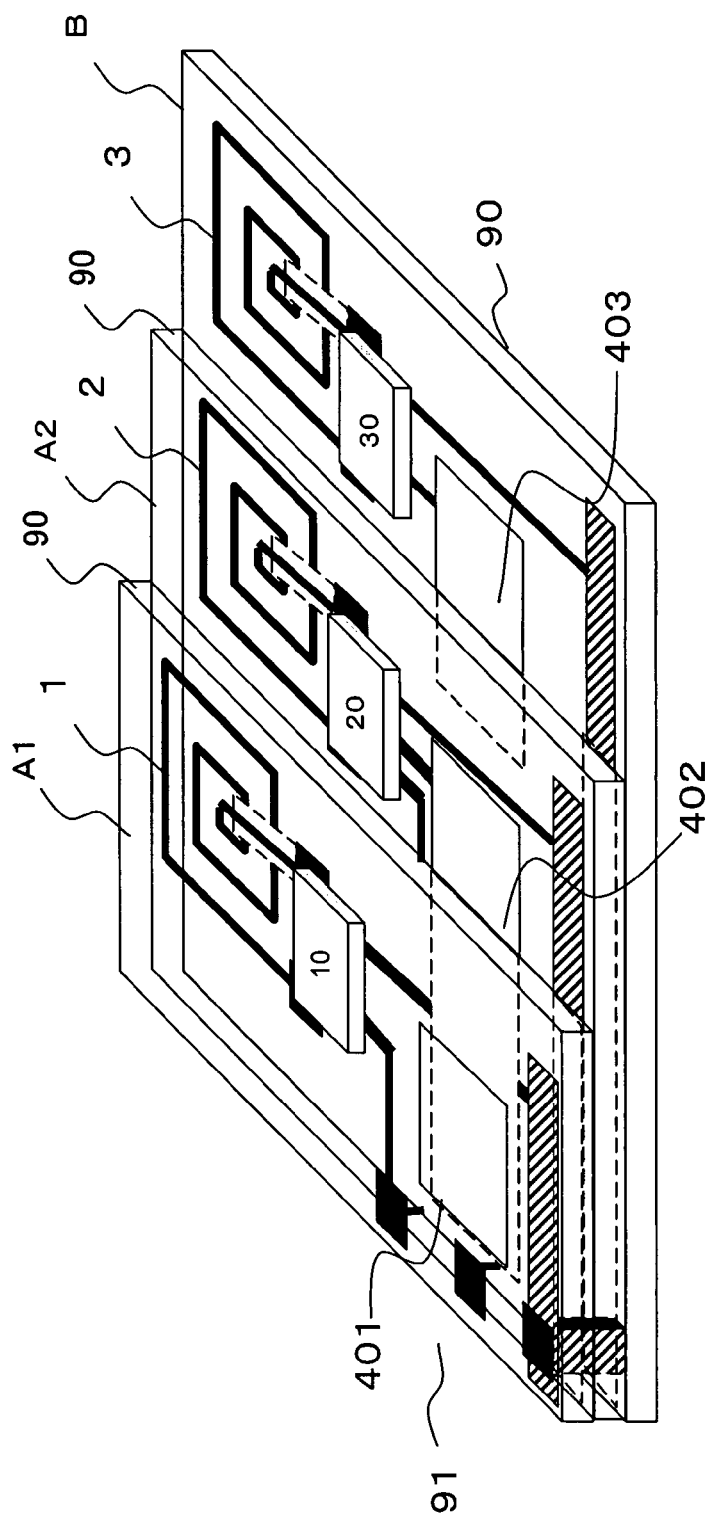
FIG. 25 shows an example of an IC tag consisting of A1, A2, B having different sizes and shapes.

For example, in the case of the layered IC tag shown in FIG. 25, in which the size and shape of A1, A2, and B are different, in contrast to the layered IC tag of FIG. 21 where the size and shape A1, A2, and B are identical, information 2 (402) and information 3 (403) may be located such that they are partly visible even when A1 and A2 are not separated, as shown in FIG. 26(a), (b). Any of the individual items of information may be entirely visible.

Information 1 (401) is represented by a one-dimensional barcode, information 2 (402) by numerals and alphabets, and information 3 (403) by a two-dimensional barcode. However, these are merely examples; information 1, information 2, information 3 may be represented in any way, such as in the form of machine-readable data, or numbers, characters, or symbols that can be read by humans. The information may be partly exposed on an upper layer.

Figure 27:
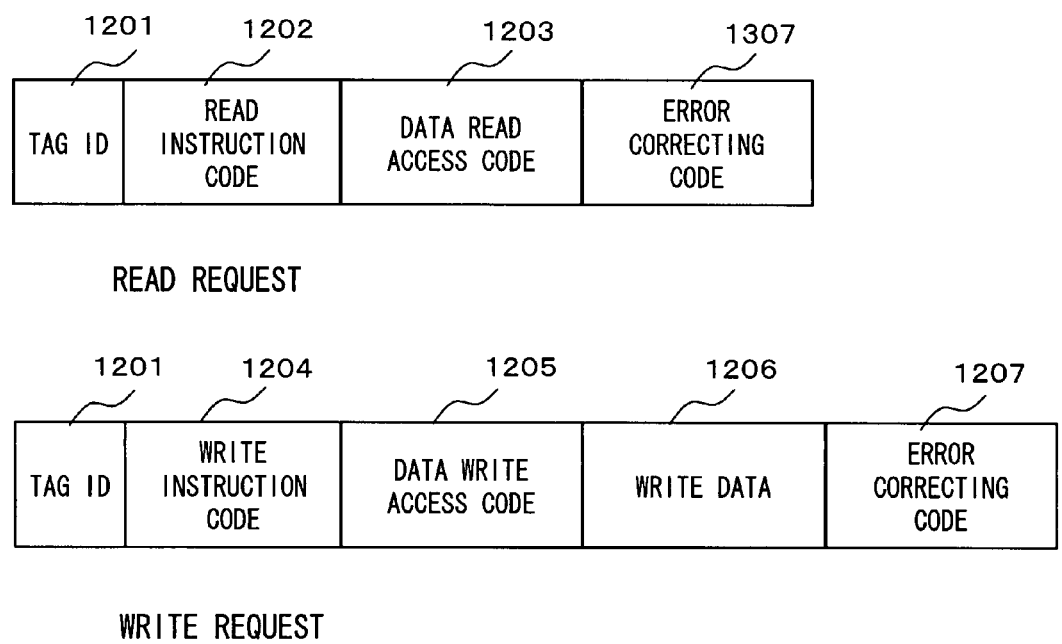
FIG. 27 shows an example of the format of data stored in the storage region of the IC tag of the invention.
Figure 28:
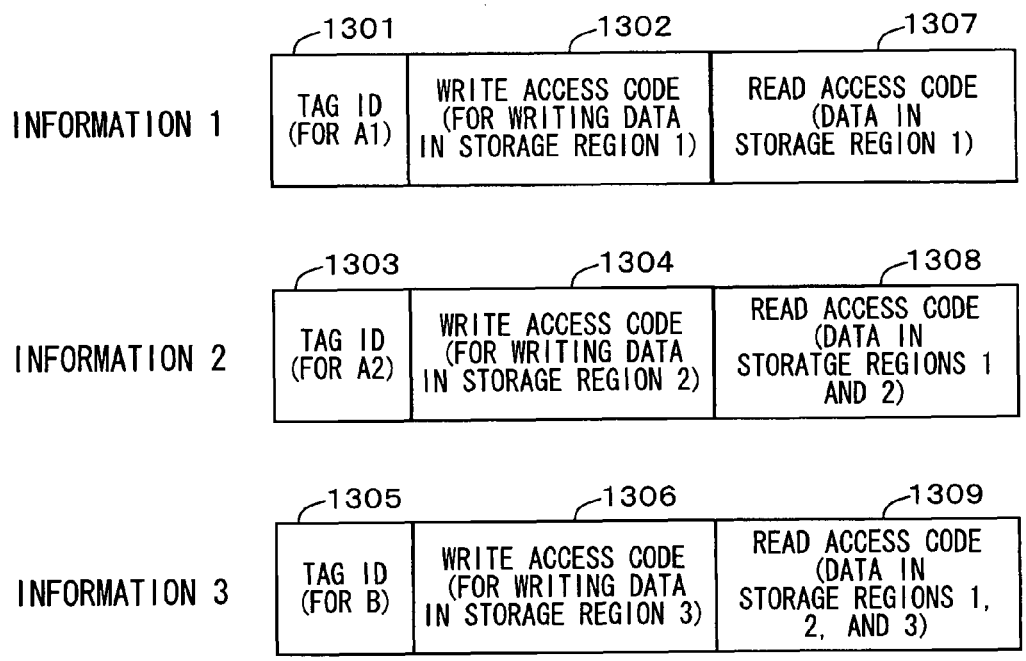
FIG. 28 shows an example of the content of information 1 (401), information 2 (402), and information 3 (403) in a case where the relationships of Table 4 are established between the state of the IC tag and its function.

FIG. 28 shows an example of the content of the information 1 (401), information 2 (402), and information 3 (403) where the relationships of Table 4 are established between the state of the IC tag and its function by employing a reader/writer device that carries out a data read/write operation on the IC tag by means of the data read request signal and data write request signal having the data structure shown in FIG. 27, and the IC tag of the invention of FIG. 21.

FIG. 28 shows the structure of information 1 (401), information 2 (402), and information 3 (403) in a case where data write access code (1305) and data read access code (1303) are all varied depending on the merchandise distribution management step (the separation state of the IC tag).

It is noted that there is no need to vary all of the tag ID (1301), data write access code (1305), and data read access code (1303) depending on the merchandise management step because an acceptable level of anti-data tampering effect can be obtained if the data write access code (1305) is varied depending on the merchandise management step.

Figure 29:
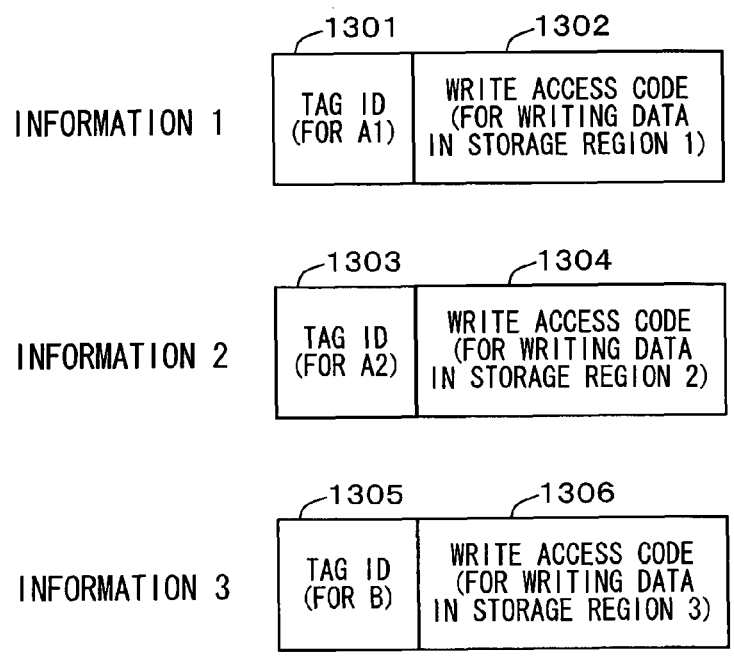
FIG. 29 shows information 1 (401), information 2 (402), and information 3 (403) in a case where the tag ID (1301) and a data read access code (1303) are shared.

Since it is not necessary to set the tag ID (1301) and data read access code (1303) individually, the information 1 (401), information 2 (402), and information 3 (403) may be configured as shown in FIG. 29 when the tag ID (1301) and the data read access code (1303) are shared.

In FIGS. 28 and 29:
1) the tag ID allocated to A1 is used as the tag ID (1301) for information 1;
2) the tag ID allocated to A2 is used as the tag ID (1303) for information 2; and 3) the tag ID allocated to B is used as the tag ID (1305) for information 3.

This is in consideration of the case where the information security of the IC tag is enhanced by varying the tag ID (1301) depending on the merchandise management step (the separation state of the IC tag), and where A1, A2 and B separated from the tag main body are operated as independent tags. Unless the A1 and A2 separated from the tag main body are used as independent IC tags, the tag ID (1301) of information 1, the tag ID (1303) of information 2, and the tag ID (1305) of information 3 may all be the same.

The tag ID (1301), data write access code (1305), and data read access code (1303) in accordance with the merchandise management step (the separation state of the IC tag) are written in the individual ICs in the IC tag upon fabrication of the IC tag as described below.

The following is an example of the process of fabricating the IC tag:
1) In an isolated B, the tag ID3 (1305) allocated to the B for identification purposes and a data input access code 3 (1306) for the storage region 3 of the storage unit of B, are written in the storage unit 3 for IC3 of B.
2) The data about the tag ID3 (1305) and the data input access code 3 (1306) are displayed on the tag B as information 3.
3) In an isolated A2, the tag ID2 (1303) allocated to A2 for identification purposes and a data input access code 2 (1304) for the storage region 2 of the storage units of A2 and B, are written in the storage unit 2 for IC2 of A2.
4) The data about the tag ID2 (1303) and the data input access code 2 (1304) are displayed on the tag A2 as information 2.
5) In an isolated A1, the tag ID1 (1301) allocated to A1 for identification purposes and a data input access code 1 (1302) for the storage region 1 of the storage units of A1, A2 and B, are written in the storage unit 1 for IC1 of A1 (step 1904).
6) A2 is layered on B, and A1 is layered on A2, and then all of the lines are connected, thereby completing an IC tag.

Alternatively, information 1, information 2, and information 3 may be first affixed to A1, A2, and B, and then A1, A2, B may be layered, followed by the connecting of all the lines and the writing of information 1, information 2, and information 3 in the individual ICs of A1, A2, and B.

Figure 30:
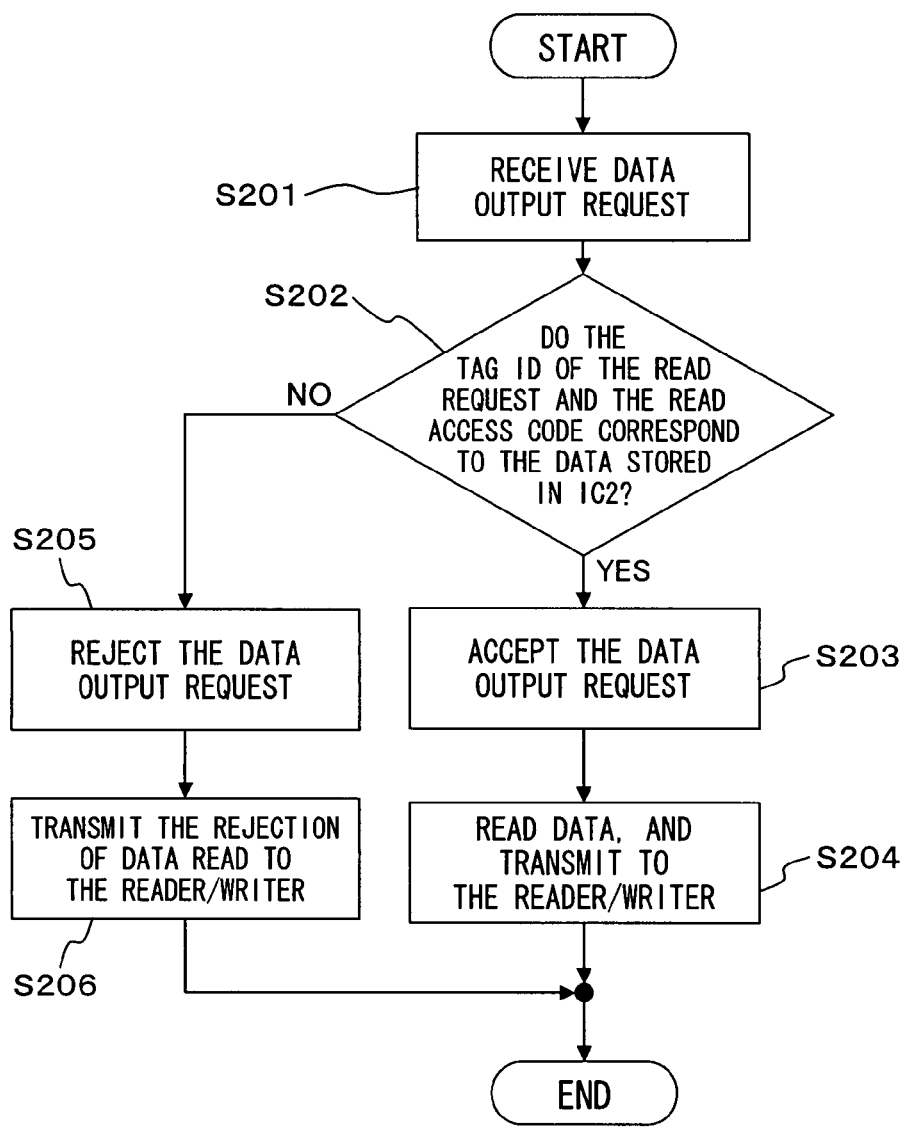
FIG. 30 shows a flowchart of a process in response to an output request in the IC tag according to the present embodiment.

The flow of a process in the IC tag of the present embodiment in response to an input/output request from outside is described below with reference to an example of the operation of the IC tag of the present embodiment from which A1 has been separated, as shown in FIG. 21. The operation of the IC tag of the present embodiment of FIG. 21 upon separation of A1 in response to a data output (read) request is described with reference to a flowchart of FIG. 30.
1) A data read request (output request) from outside is received by the data processing circuit (step 201).
2) It is checked to see if the two kinds of data, namely, the tag ID (1201) and the read access code (1203) included in the read request, and the tag ID (1303) and the read access code (1308) stored in the storage unit 2 of IC2, correspond with each other, respectively (step 202).
3) If the two kinds of data correspond, the data output request is accepted (step 203: S203). The data in the storage regions 1 and 2 of the storage unit for the IC tag is read and transmitted to the reader/writer end (step 204: S204); the process then ends.
4) On the other hand, if the two kinds of data did not correspond in step 202, the data output request is rejected (step 205: S205), and the rejection of the data reading is transmitted to the reader/writer end (step 206: S206); the process then ends.

Figure 31A:
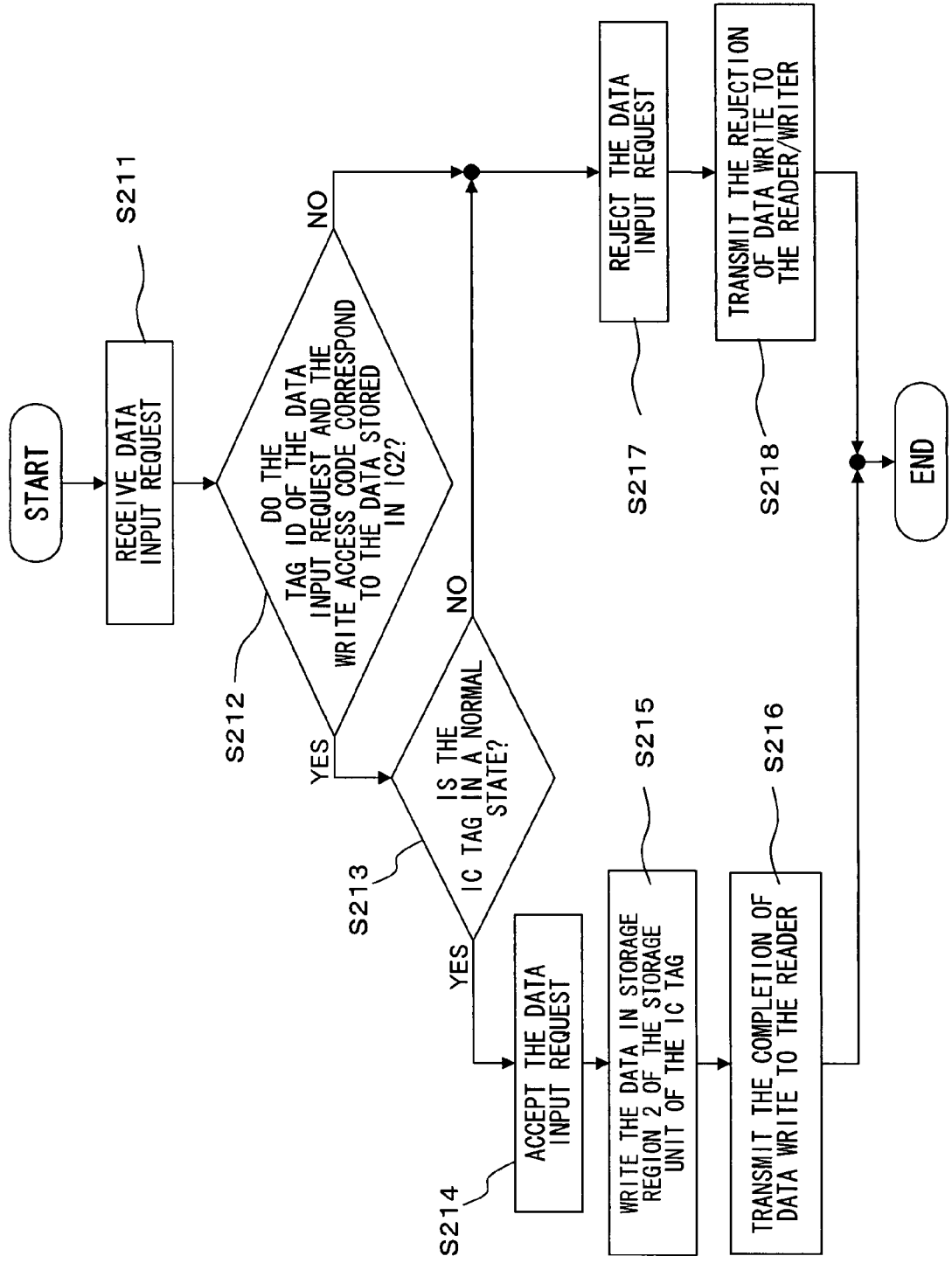
FIG. 31a shows a flowchart of a process in response to an input request in the IC tag according to the present embodiment.

In the following, the flow of a process in the IC tag of the present embodiment in response to an input/output request from outside is described with reference to an example of the operation of the IC tag of FIG. 21 from which A1 has been separated. The operation of the IC tag of the invention in response to a data input (write) request when A1 is separated is described with reference to a flowchart shown in FIG. 31*a*.
1) A data input (write) request is received (step 211: S211).
2) It is checked to see if the two kinds of data, namely, the tag ID (1201) and the read access code (1205) included in the read request, and the tag ID (1303) and the write access code (1304) stored in the storage unit 2 for IC2, correspond with each other, respectively (step 212).
3) If the two kinds of data correspond, it is then determined whether or not the IC tag is in the correct state (where A1 is separated from the tag while A2 is connected with B) (step 213).
4) If it is determined in step 213 that the IC tag is in the correct state, the data input request is accepted (step 214: S214), and then write data (1206) is entered (written) in the storage region 2 of the storage unit for the IC tag (step 215: S215).
5) The fact that the data entry (write) has been carried out is transmitted to the reader/writer end (step 216: S216), and then the process ends.
6) If the two kinds of data did not correspond in step 212, the data input request is rejected (step 217: S217); the rejection of data reading is transmitted to the reader/writer end (step 218: S218) and the process ends.
7) If it is determined in step 213 that the IC tag is not in the correct state, the data input request is rejected (step 217: S217); the rejection of the data reading is transmitted to the reader/writer end (step 218: S218) and the process ends.

The confirmation of the state of the IC tag in step 213 is based on the result of determination made by a B-separation decision circuit 2 in IC2 and the result of determination made by an A1-separation decision circuit 1 in IC2.

Thus, data can be neither written in nor read from the IC tag unless the tag ID corresponding to the state of the IC tag (separation state) and the data write and read access codes corresponding to the state of the IC tag are obtained from the information indicated on the IC tag.

FIG. 31*b* shows a flowchart of a process during the course of merchandise distribution using the IC tag according to the present embodiment.
1) The manufacturer affixes the tag having the above separable portions to a merchandise before it is shipped.
2) After the tag is affixed, the information 1 indicated on the surface of the tag (A1) is read with a reader/writer unit. The reader/writer unit is further used in writing a manufacturer code (1814), type (1815), version (1816), manufacturing number (1817), repair history (1818) and other data in a storage region for the manufacturer in the storage unit of the IC tag. The IC tag may be affixed anywhere as long as it can be read or written with a device such as a card reader/writer (step 1901: S1901).
3) The manufacturer, after necessary data has been written (step 1901: S1901), separates A1 from the tag and then ships the merchandise to a distribution outlet in such a state that information 2 can be acquired (step 1902: S1902).
4) At the distribution outlet, the information 2 is read from the IC tag affixed to the arrived merchandise with a reader/writer unit, which is also used in writing data such as date of arrival, distribution outlet code, and the like in a storage area for the distribution outlet (step 1903: S1903).
5) Before the merchandise is sold and handed to a consumer, the distribution outlet writes the date of purchase, retail price, and the content of warranty, if any, by the distribution outlet, in a storage area for the distribution outlet (step 1904: S1904).

6) After writing such data in the distribution outlet storage area, the distribution outlet cuts A2 away from the IC tag, thus rendering the information 3 accessible, and then hands the merchandise to the consumer. As a result, the tag B becomes the only tag affixed to the merchandise (step 1905: S1905).

7) The consumer who purchased the merchandise reads the data in the IC tag, or the information 3 indicated on the tag B using a reader/writer unit. The consumer can also write data in a user storage area using the reader/writer unit as needed (step 1906: S1906).

Figure 32:
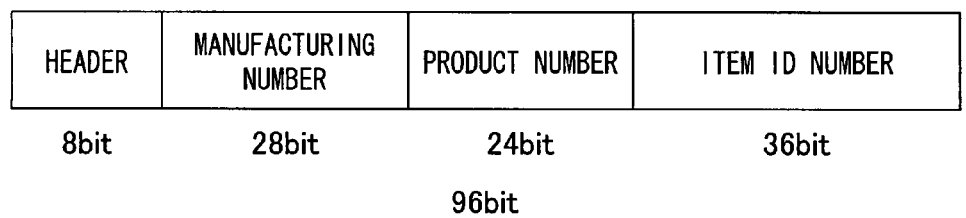
FIG. 32 shows an example of an AutoID data format.
Figure 33:
FIG. 33 shows an example of a ubiquitous ID data format.

The foregoing description of the IC tag according to the present embodiment has been made with reference to examples where the form or structure of data stored or exchanged with the external reader/writer is fixed in one particular kind. However, there are various data formats for IC tags, such as the Auto-ID data format shown in FIG. 32 (96-bit EPC code system) and the ubiquitous ID (128-bit ucode) shown in FIG. 33, for example. Therefore, there has been a need for an IC tag whose data format can be modified in a simple manner depending on purposes or the kind of information.

Figure 34:
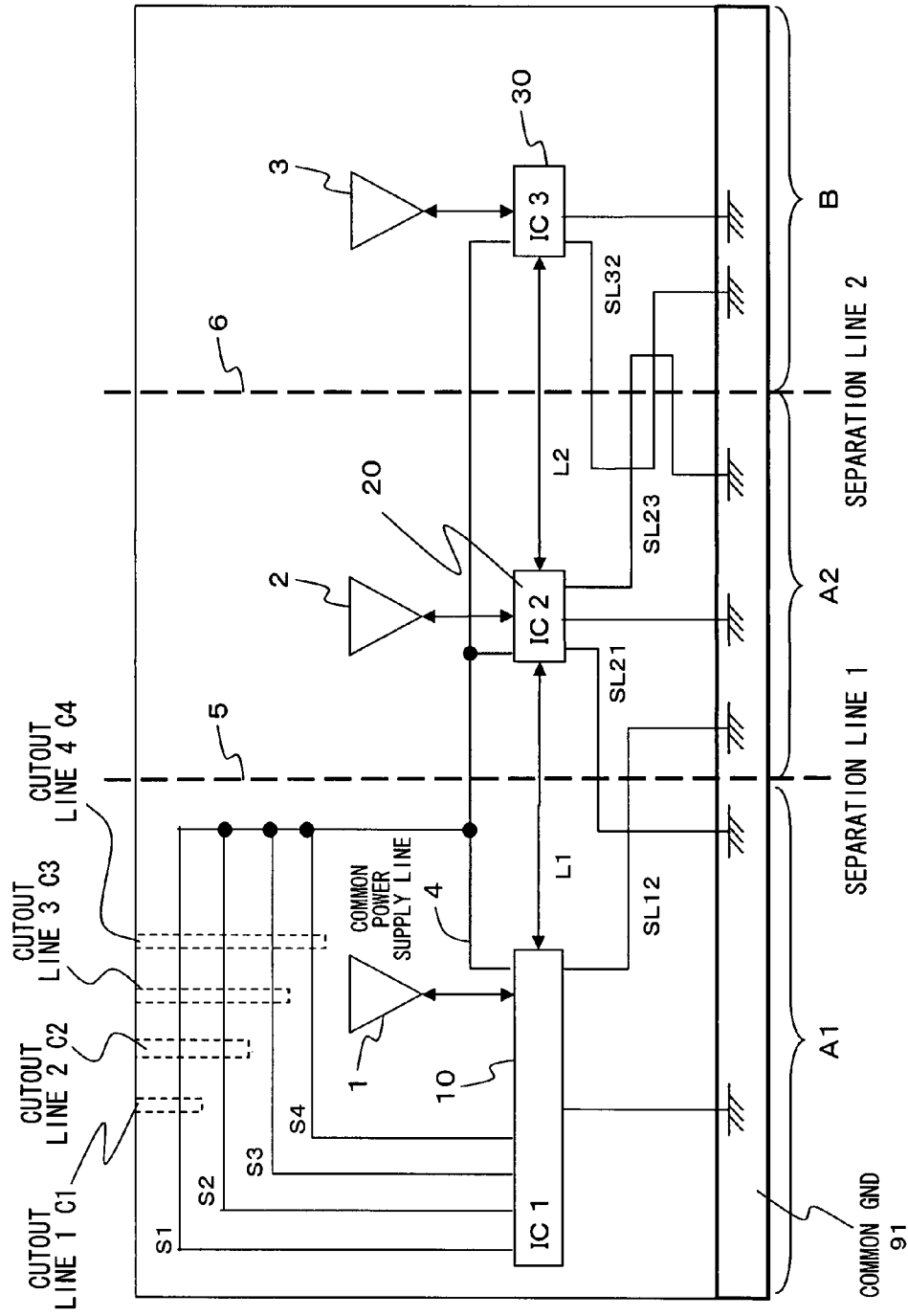
FIG. 34 shows a basic configuration of an IC tag having four cutout lines as an initial condition setting means where n=2, n being the number of portions separable from the tag main body.

FIG. 34 shows an IC tag of the invention where n=2, n being the number of portions separable from the tag main body B, the IC tag being equipped with an initial setting means with which the data format used in the IC tag can be modified in a simple manner.

The configuration of the IC tag of FIG. 34 is the same as that of the IC tag described with reference to FIG. 1 with the exception of the separable portion A1 which is provided with the initial setting means.

The initial setting means provided with in the separable portion A1 shown in FIG. 34 comprises lines S1, S2, S3, and S4 running from the IC1 (10), each connected to a common power supply line 4, and cutout lines C1 to C4 that intersect the lines S1, S2, S3, and S4. These cutout lines C1 to C4 define cutouts that can be easily cut away by humans. The cutout lines C1 to C4 are designed such that:

1) The cutout line C1 severs line S1 alone.
2) The cutout line C2 severs lines S1 and S2.
3) The cutout line C3 severs lines S1 to S3.
4) The cutout line C4 severs all of the lines S1 to S4.

Figure 35:
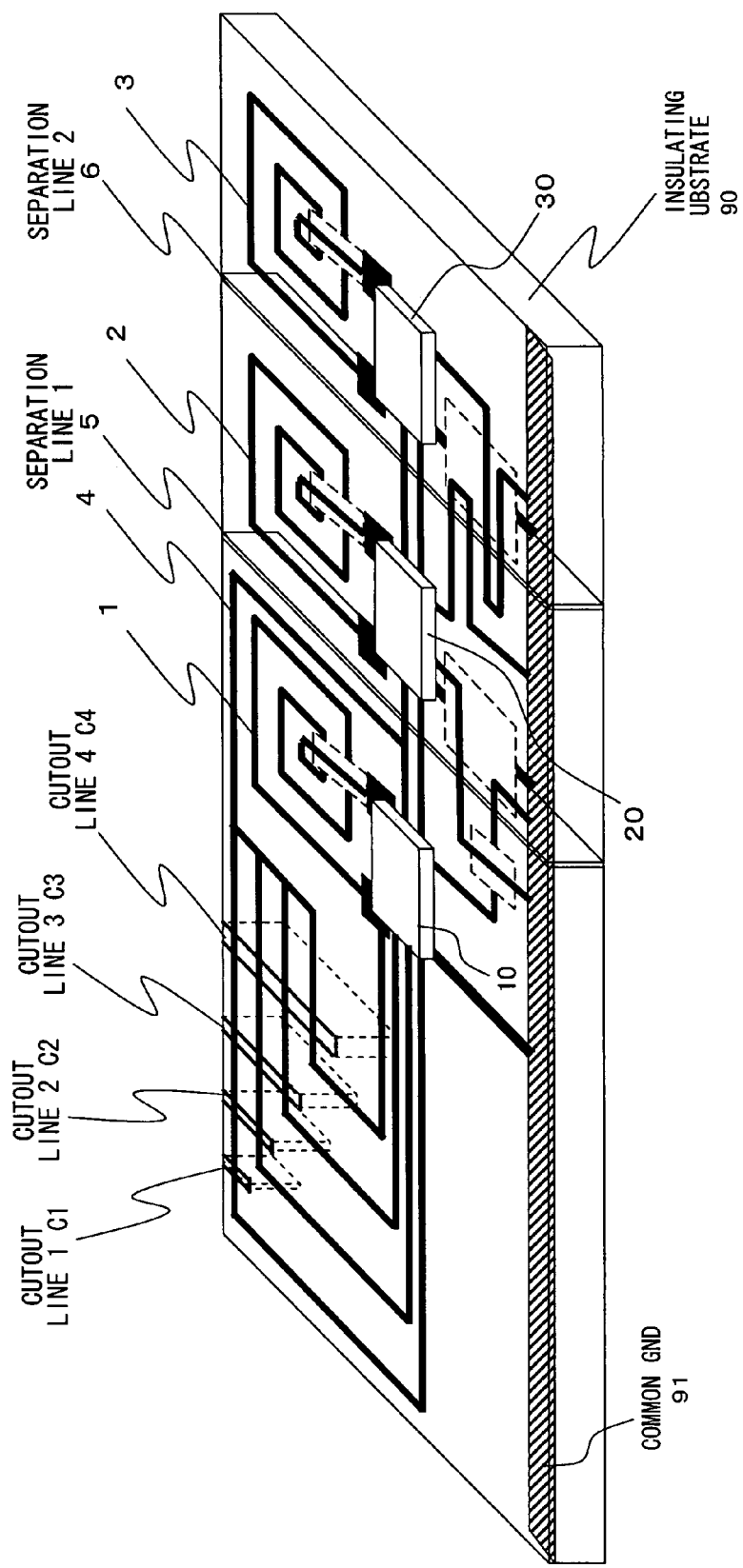
FIG. 35 shows a perspective view showing the three-dimensional structure of the IC tag of FIG. 34.

FIG. 35 shows a perspective view of the structure of the IC tag of FIG. 34 which is formed on an insulator, such as paper or plastic. As shown in FIG. 35, the cutout lines C1 to C4 have through-holes formed intermittently between the top surface and the bottom surface of the insulating substrate 90. Thus, any of the cutout lines C1 to C4 can be severed as desired by the user.

Figure 36:
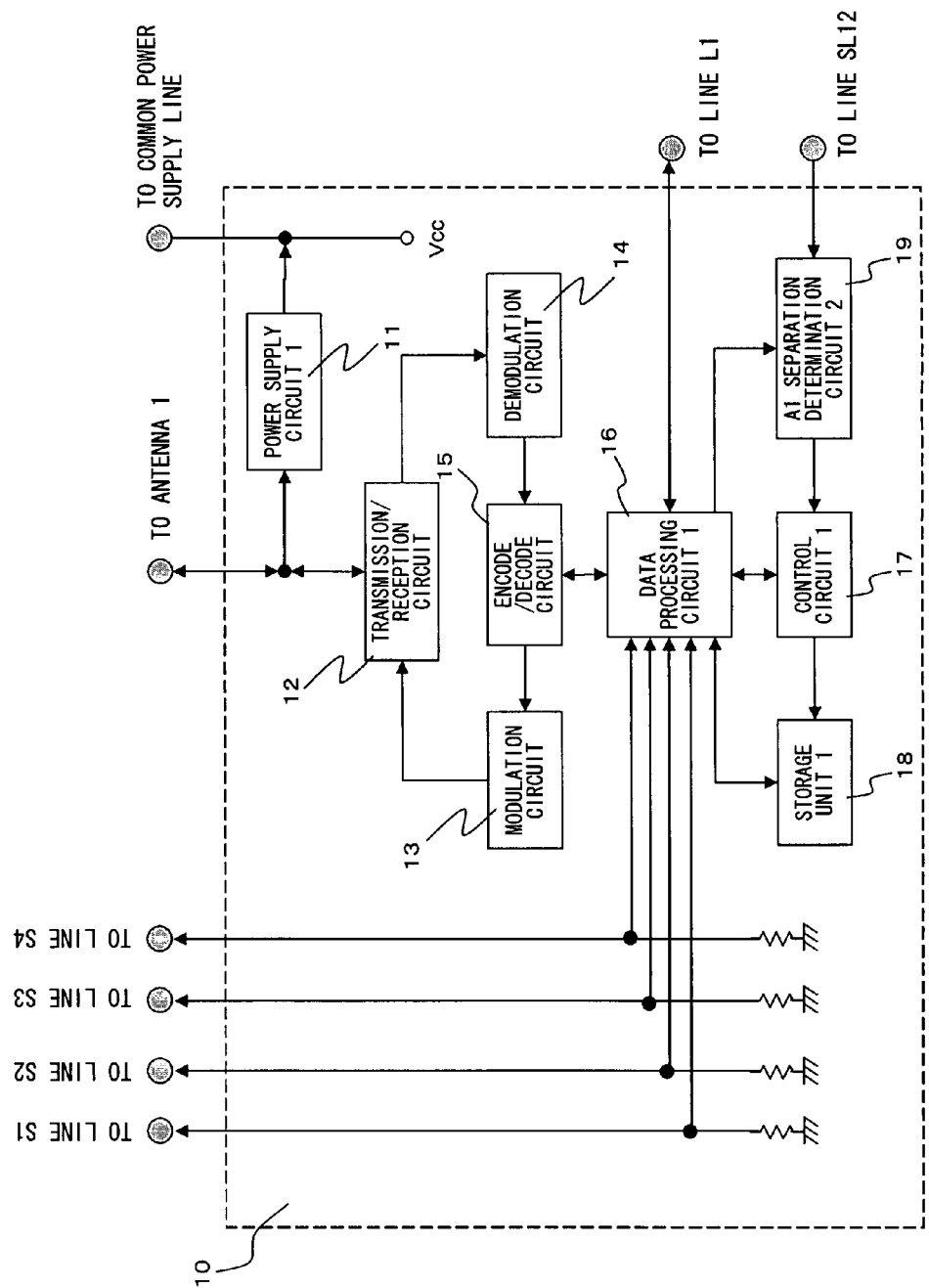
FIG. 36 shows a functional block diagram of IC1 of FIG. 34.

FIG. 36 shows a functional block diagram of an example of the IC1 (10) of FIG. 34. The data processing circuit 1 in IC1 (10) has inputs associated with the individual lines S1 to S4, and is configured such that the input potential to the data processing circuit 1 via S1 to S4 is changed depending on the presence or absence of severing of the lines S1 to S4 by the cutout lines C1 to C4.

Specifically, when any of the lines S1 to S4 is severed by means of any of the cutout lines C1 to C4 of FIG. 34, the input potential of at least one of the inputs S1 to S4 to the data processing circuit 1 of FIG. 36 changes from "H" to "L", thereby entering an IC-tag type setting mode. In the data processing circuit 1 of FIG. 36, the type of data format used by the IC tag is determined by the input potential of the inputs S1 to S2 to the data processing circuit 1. The IC1 then notifies of the data format the other ICs (IC2, IC3) in the tag. With regard to the manner in which the type or the like of the IC tag is set, data formats and processing programs that are stored in the storage circuit 1 (18) in advance may be selected depending on the combination of the input potentials of S1 to S4 to the data processing circuit 1.

The foregoing has been the description of an IC tag in which ICk and ICk+1 are electrically connected, where a desired function change is caused in the IC tag by separating A1, A2 . . . An sequentially.

In the following, an IC tag according to another embodiment of the invention is described with reference to FIG. 37. This IC tag includes a non-separating portion B located at the center, around which separable portions A1 to An are arranged, where ICk of the separable portions and ICn+1 of the non-separable portion B are electrically connected. The number n of the separable portions from the tag main body (B) is 2.

The IC tag of FIG. 37 differs from the IC tag of FIG. 1 in the following respects:

1) The layouts of the separable portion A2 and the non-separable portion B (tag main body) are switched, with the non-separable portion B (tag main body) located at the center, to which the separable portions A1 and A2 are connected.
2) IC1 (10) and IC3 (30) are connected by signal line L1 (signal line L1 is severed when A1 is separated from B).
3) IC2 (20) and IC3 (30) are connected by signal line L2 (signal line L2 is severed when A2 is separated from B).
4) A so-called centrally controlled configuration is adopted where IC3 (30), located at the center, controls IC1 (10) and IC2 (20).

In other respects, except for the designation or the like of the lines, the basic configuration is identical.

The lines SL13, SL31, SL23, and SL32 connecting IC1 (10), IC2 (20), and IC3 (30) to the common GND are wired in such a layout that the lines straddle a separation boundary line between portion A1 and portion B or a separation boundary line between portion A2 and portion B, so that the lines SL13 and SL31 are severed when the A1 portion is separated and the lines SL23 and SL32 are severed when the A2 portion is separated. The lines SL13, SL31, SL23, and SL32 are used for detecting a change in the impedance of the lines caused by the severing of the lines so as to determine whether or not the A1 portion or the A2 portion is separated.

Figure 37:
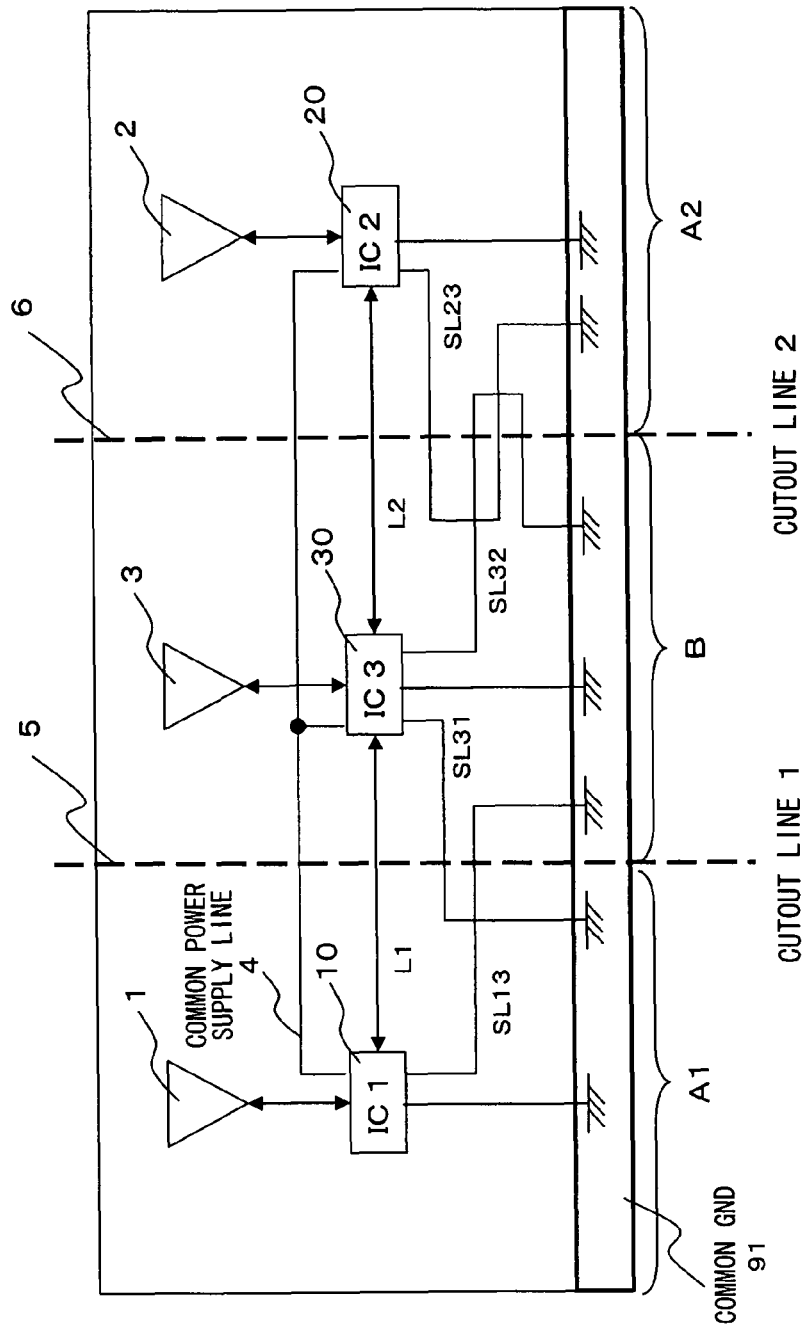
FIG. 37 shows a basic configuration of a centrally controlled type of an IC tag of the invention where n=2, n being the number of portions separable from the tag main body.
Figure 38:
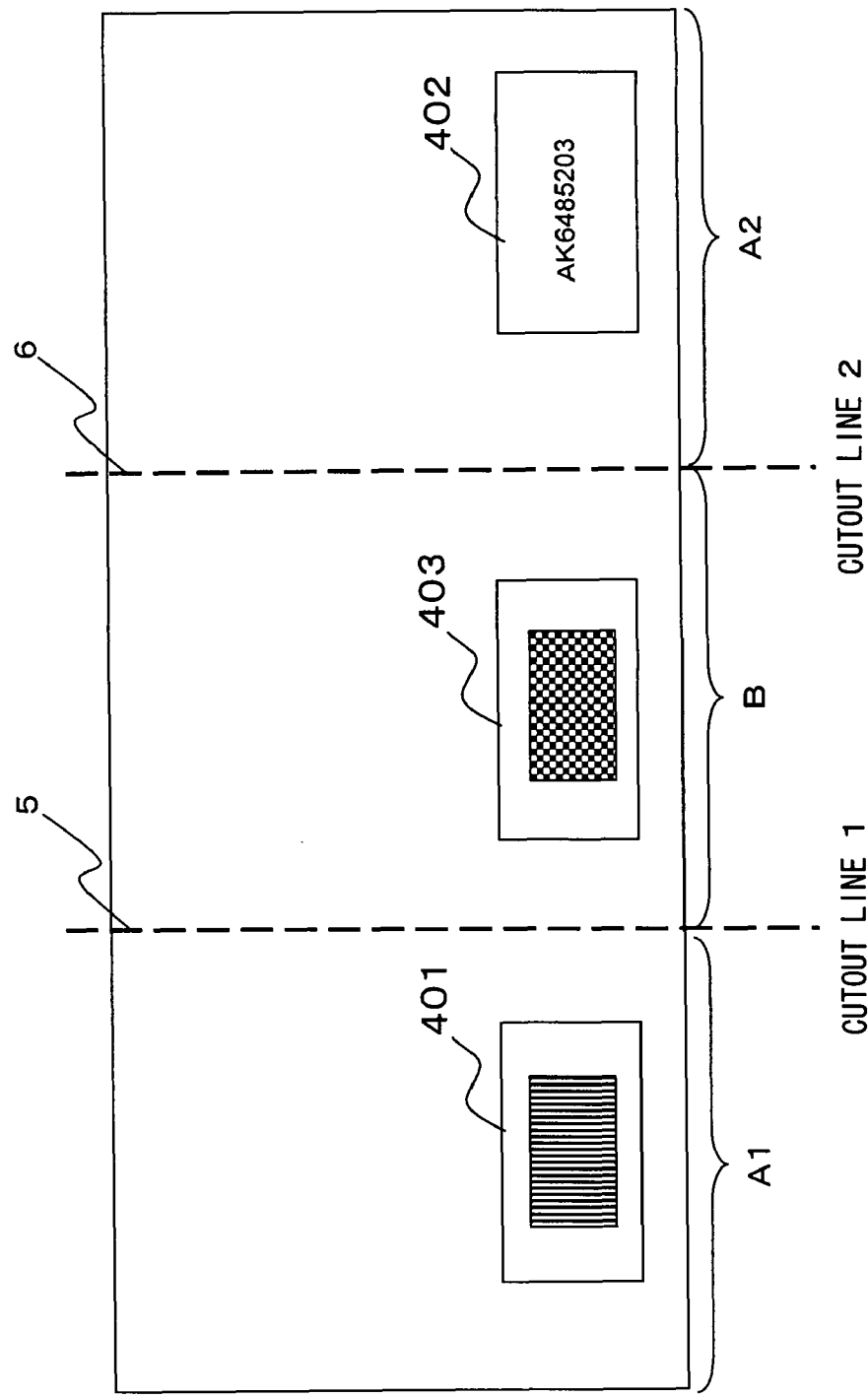
FIG. 38 shows a functional block diagram of IC1 in the IC tag of FIG. 37.
Figure 39:
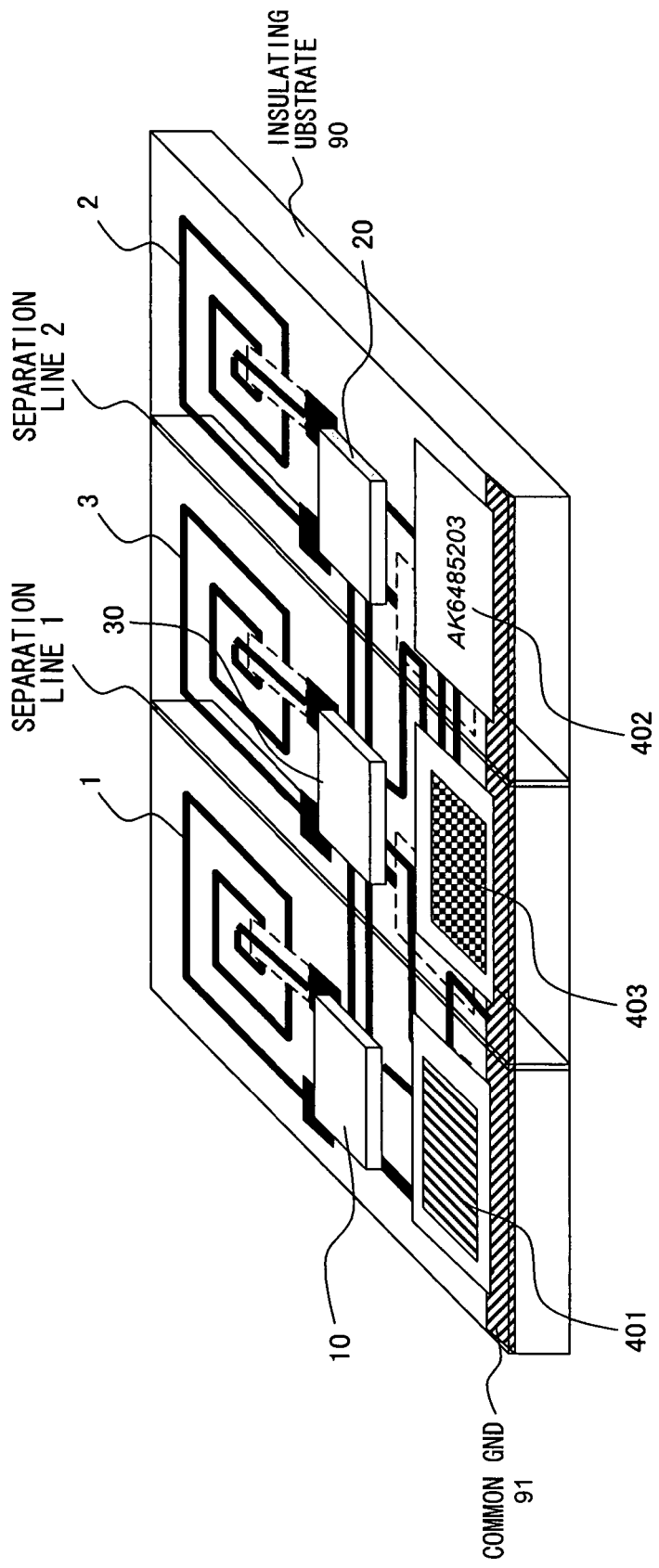
FIG. 39 shows a functional block diagram of IC2 in the IC tag of FIG. 37.

In a case where the function of the IC tag of FIG. 37 is selected by separating an arbitrary separable portion Ak as needed, it is preferable to have the information (information 1 to 3) for the selection/designation of the function of the IC tag indicated thereon, as shown in FIG. 38. FIG. 39 shows a perspective view of an IC tag corresponding to the structure of FIG. 37.

Figure 40:
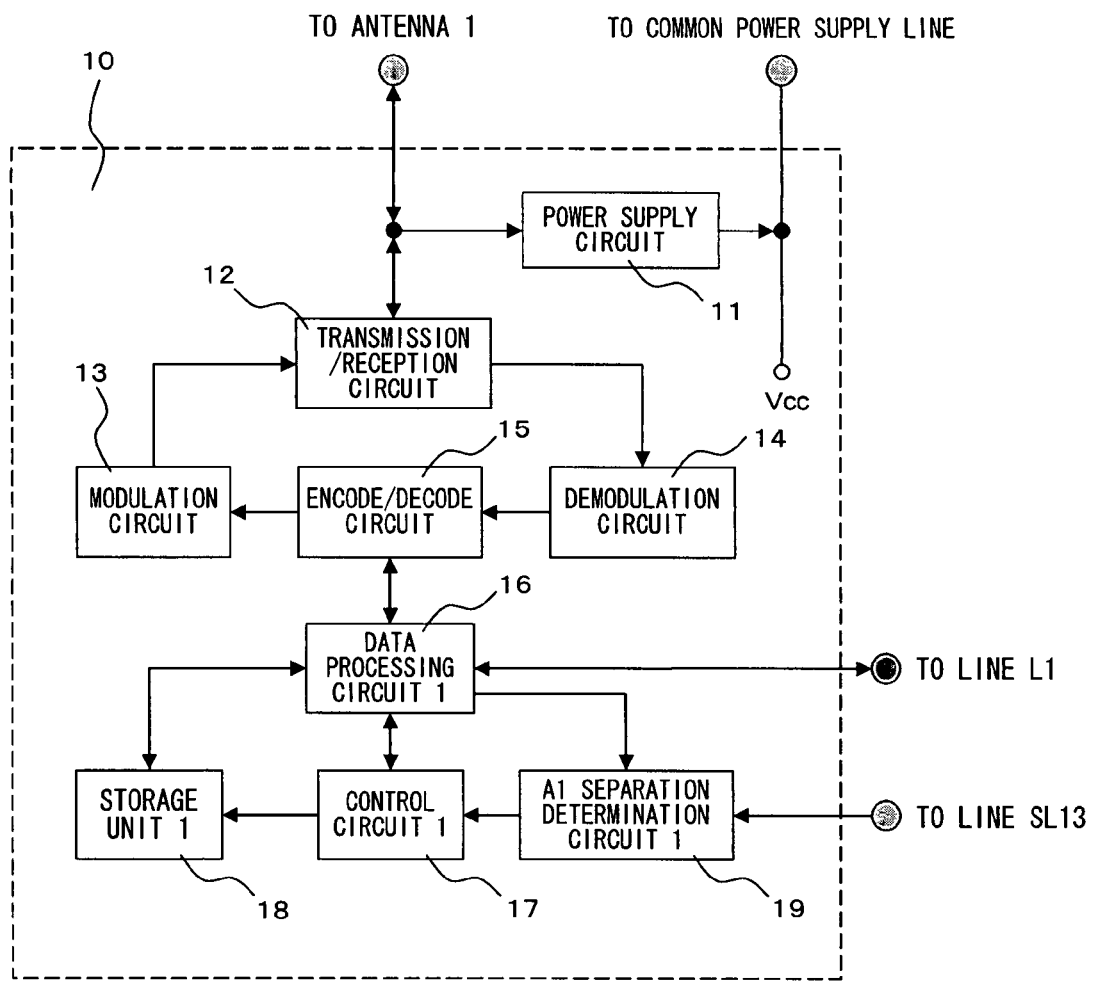
FIG. 40 shows a functional block diagram of IC3 in the IC tag of FIG. 37.

FIG. 40 shows a functional block diagram of IC1. IC1 (10) includes: a power supply circuit 11 for converting part of a received signal into electric power; a receiving circuit 12 for the transmission and reception of a signal to and from an antenna 1, which is an external interface of the tag; a modulating circuit 13 for modulating encoded data; a demodulating circuit 14 for demodulating a received signal; an encoding/decoding circuit 15 for the encoding of transmission data and decoding of received data; a data processing circuit 1 (16) for processing data sent from the encoding/decoding circuit 15 or via the signal line L1; a storage unit 1 (18); a control circuit 1 (17) for controlling the operation of the data processing circuit 1 (16) and the storage unit 1 (18) depending on the state of the tag; and an A1 separation decision circuit 1 (19) for the portion A1 to determine whether or not the portion A1 has been separated from the portion B.

Figure 41:
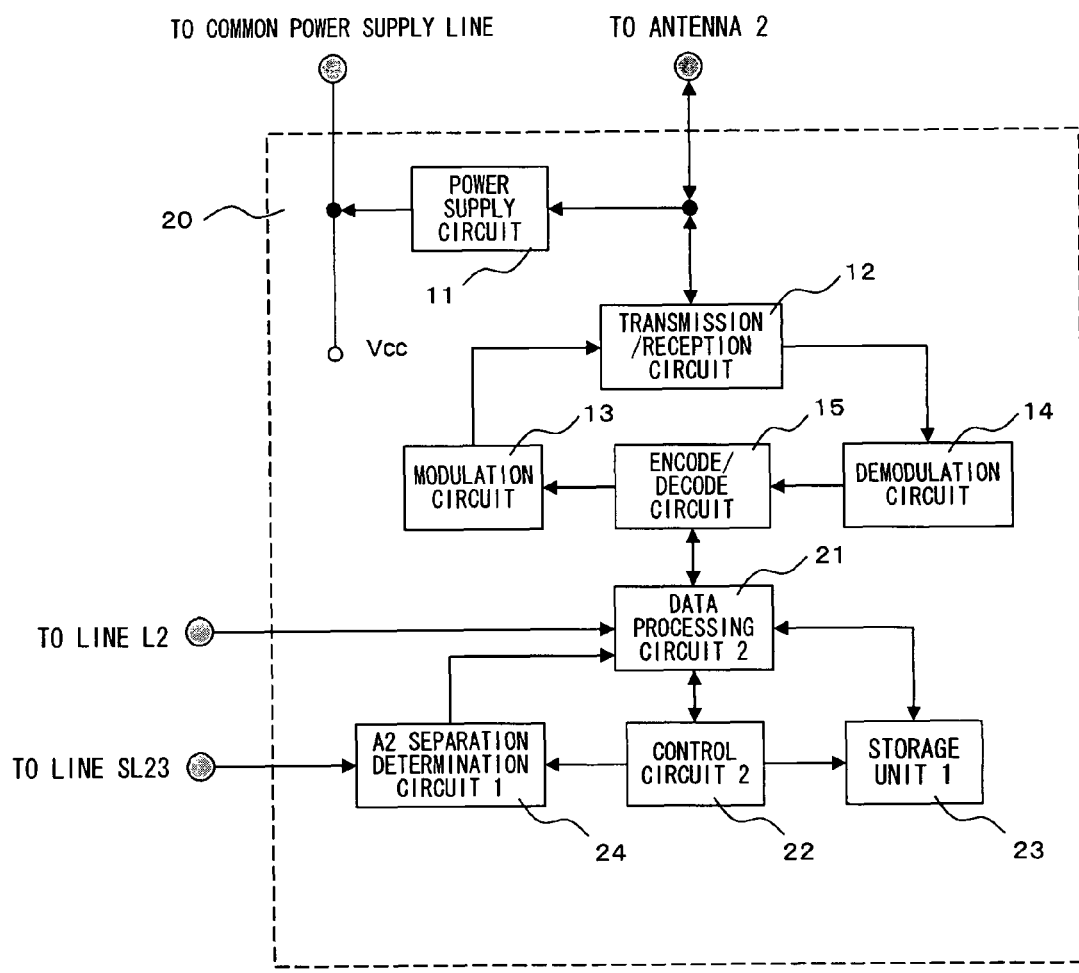
FIG. 41 shows a functional block diagram of an A1 separation decision circuit 1 in IC1 of FIG. 38.

FIG. 41 shows a functional block diagram of an example of the configuration of IC2 (20). As shown in FIG. 41, IC2 (20) includes: a power supply circuit 11 for converting part of a received signal into electric power; a transmission/receiving circuit 12 for the transmission and reception of a signal to and from an antenna 2, which is an external interface of the tag; a modulating circuit 13 for modulating encoded data; a demodulating circuit 14 for demodulating a received signal; an encoding/decoding circuit 15 for encoding and decoding of data; a data processing circuit 2 (21) for processing data; a storage unit 2 (23); a control circuit 2 (22) for controlling the operation of the data processing circuit 2 (21) and the storage unit 2 (23) depending on the state of the tag; and an A2 separation decision circuit 1 (24) for the portion A2 itself to determine whether or not the portion A2 has been separated from the portion B.

Figure 42:
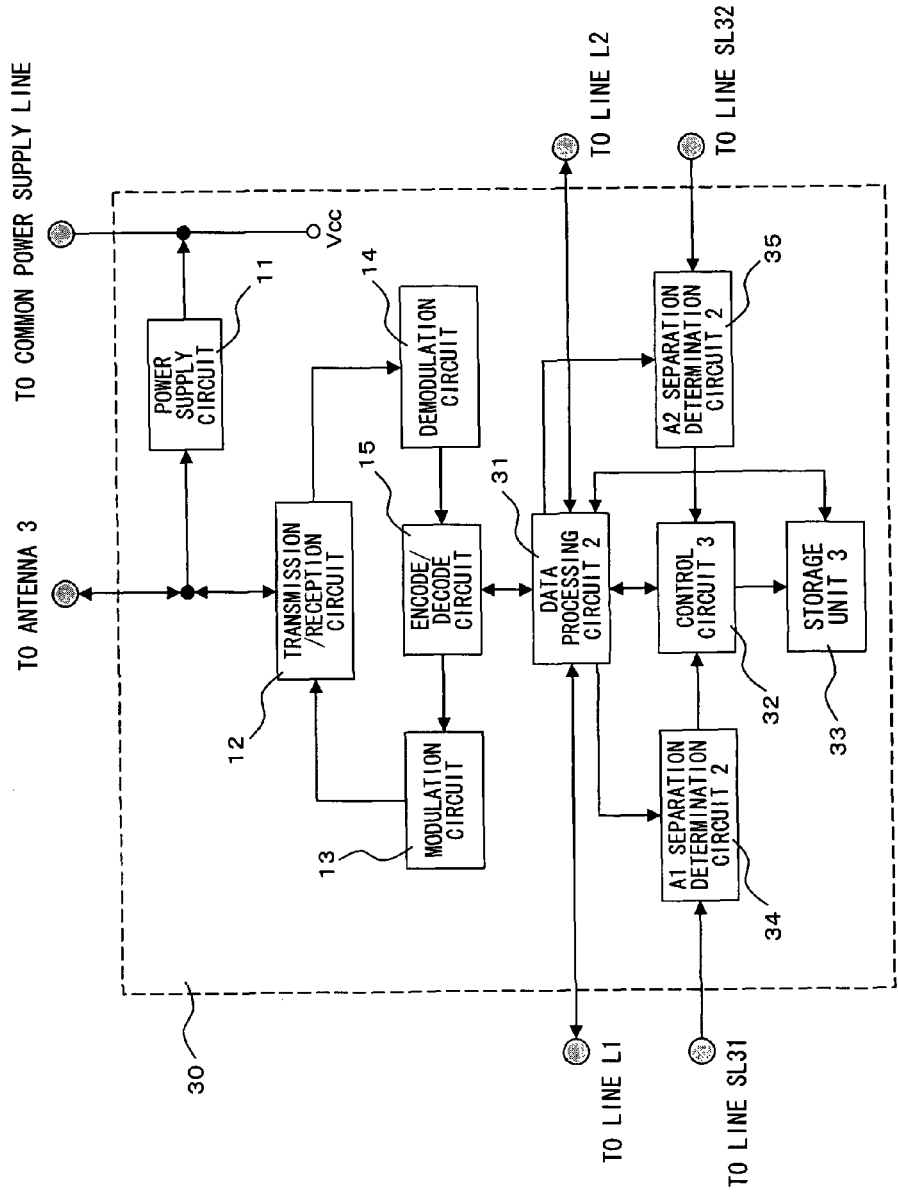
FIG. 42 shows a functional block diagram of an A1 separation decision circuit 2 in IC3 of FIG. 40.

FIG. 42 shows a functional block diagram of an example of the configuration of IC3 (30). As shown in FIG. 42, IC3 (30) constitutes a central core of the IC tag according to the present embodiment, and it centrally controls the IC1 (10) and IC2 (20) in the two separable portions. IC3 (30) includes: a power supply circuit 11 for converting part of a received signal into electric power; a transmission/receiving circuit 12 for the transmission and reception of a signal to and from an antenna 3, which is an external interface of the tag; a modulating circuit 13 for modulating encoded data; a demodulating circuit 14 for demodulating a received signal; an encoding/decoding circuit 15 for encoding and decoding of data; a data processing circuit 3 (31) for processing data; a storage unit 3 (33); a control circuit 3 (32) for controlling the operation of the data processing circuit 3 (31) and the storage unit 3 (33) depending on the state of the tag; an A1 separation decision circuit 2 (34) for the portion B to determine whether or not the portion A1 has been separated from the portion B; and an A2 separation decision circuit 2 (35) for the portion B to determine whether or not the portion A2 has been separated from the portion B. When there are more separable portions provided, the number of the separation decision circuits is increased.

Figure 43:
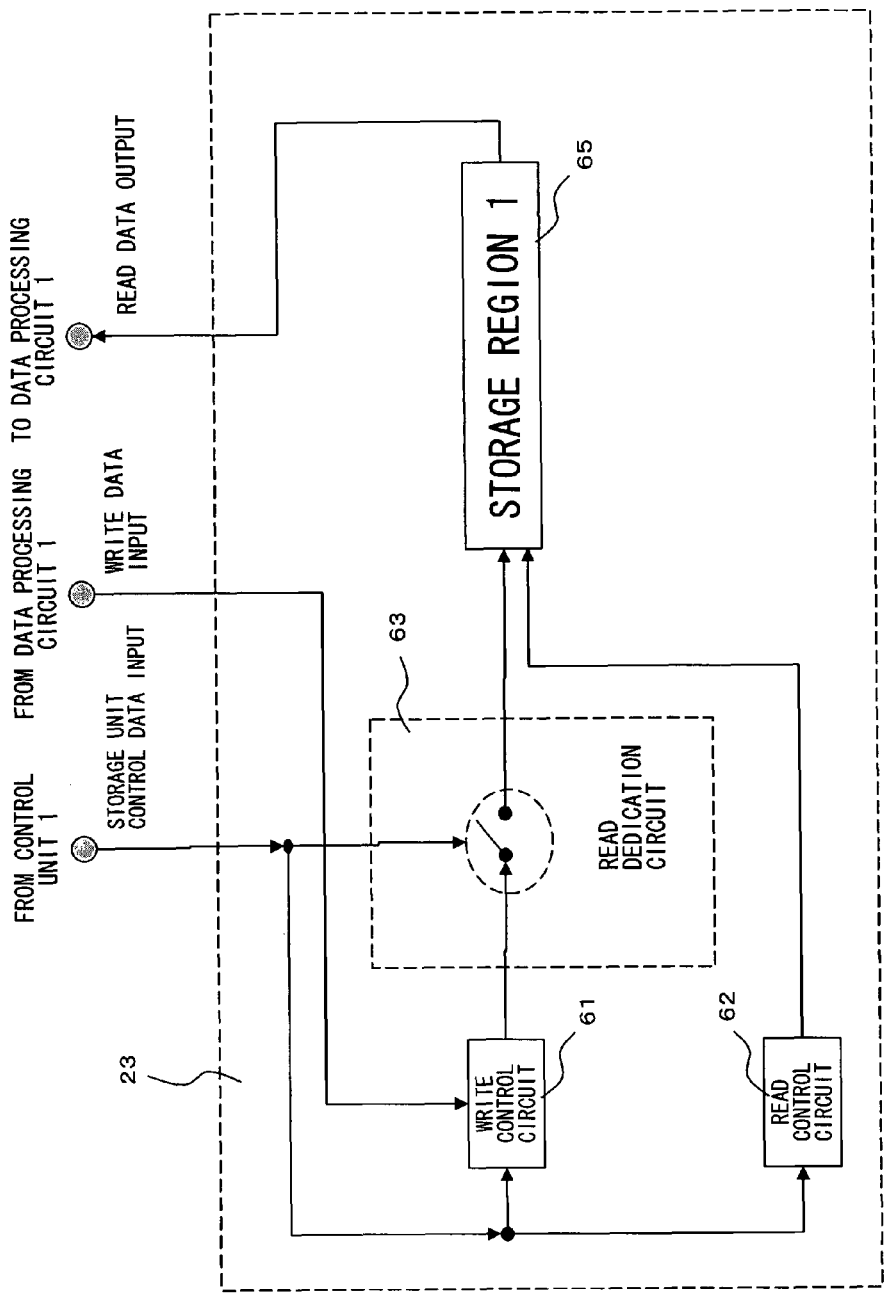
FIG. 43 shows a functional block diagram of an A2 separation decision circuit 1 in IC2 of FIG. 39.

The configuration of the storage unit 1 (18), storage unit 2 (23), and storage unit 3 (23) of IC1 (10), IC2 (20), and IC3 (30) may be the same as shown in FIGS. 7a, 7b, and 7c when the order of separation of the separable portions is predetermined as in A1, A2. However, when the order of separation of the separable portions is not predetermined, the storage unit 2 of IC2 (20) may be configured as shown in FIG. 43.

Figure 44:
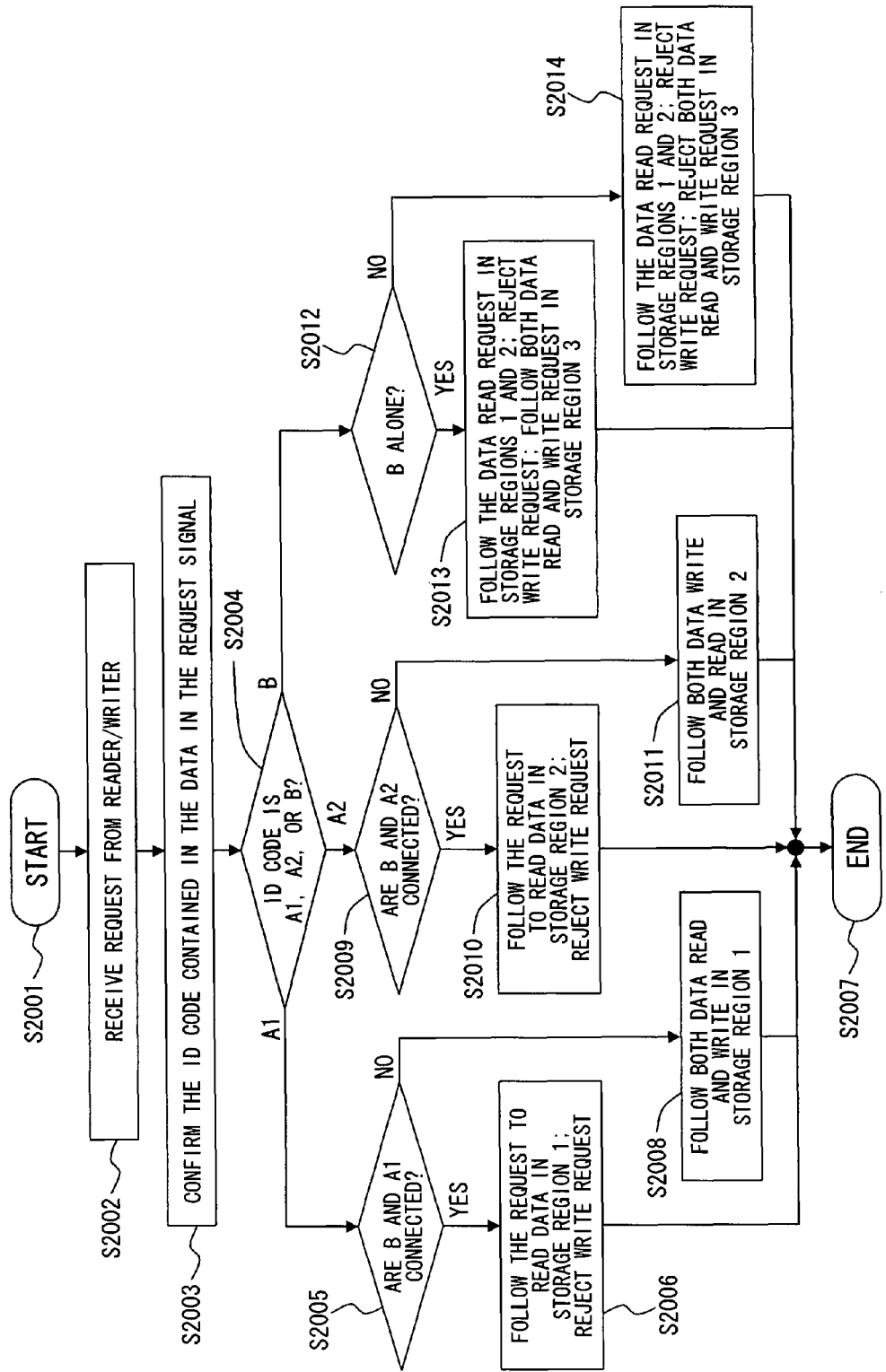
FIG. 44 shows a flowchart of a process in the IC tag during the course of merchandise distribution.

FIG. 44 shows a flowchart of the flow of a process regarding an IC tag of the present embodiment in which the order of separation of the separable portions is not predetermined. After the process is initiated (step S2001), the IC tag receives in step S2002 a request from the reader/writer. In step S2003, the ID code contained in the request signal data is confirmed. In step S2004, a decision is made as to whether the ID code is associated with A1, A2, or B. If the decision points to A1, the process proceeds to step S2005, where it is determined whether or not B and A1 are connected.

If they are connected (YES), the process proceeds to step S2006, where data read and write requests with respect to the storage region 1 are followed, and then the process ends (step S2007). If the result of the determination in step S2005 is NO, the process proceeds to step S2008, where a data read request is followed but a write request is rejected with respect to the storage region 1; the process then proceeds to step S2007.

If A2 is indicated in step S2004, it is determined in step S2009 whether or not B and A2 are connected. If they are (YES), the process proceeds to step S2010, where data read and write requests with respect to the storage region 2 are followed, and then the process proceeds to step S2007. If NO, the process proceeds to step S2011, where a data read request with respect to the storage region 2 is followed but a write request is rejected; and then the process proceeds to step S2007.

If B is indicated in step S2004, the process proceeds to step S2012 where it is determined if there is only B. If there is only B (YES), the process proceeds to step S2013, where a data read request with respect to the storage regions 1 and 2 are followed but a write request is rejected, and where a data read/write request with respect to the storage region 3 is followed, and then the process proceeds to step S2007. If NO, the process proceeds to step S2014, where a data read request is followed but a write request is rejected with respect to the storage regions 1 and 2 and where data read and write requests are rejected with respect to the storage region 3; the process then proceeds to step S2007. As shown in FIG. 44, the IC tag can be used regardless of the order of separation of Ak, by designating the utilized function of the IC tag and its corresponding tag using the ID code (information for selecting/designating the function of the IC tag). Preferably, in order to realize the operation of FIG. 44, the non-separable portion B centrally manages (controls) the ICs (IC1 to ICn) of the separable portions A1 to An.

Figure 45:
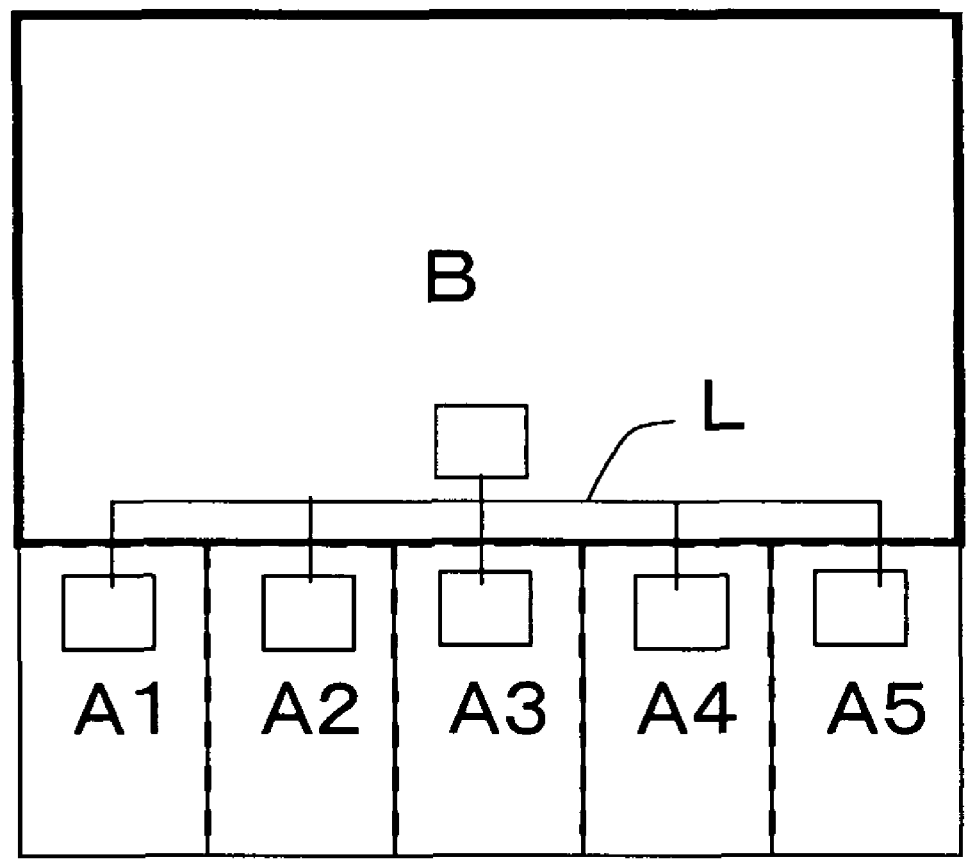
FIG. 45 shows a plan view of an example of the shape of a coupon ticket utilizing the centrally controlled type of IC tag of the invention.

In the following, a more specific application of the tag is described. FIG. 45 shows an example of the configuration of coupon tickets in which the IC tags of the present embodiment are utilized. The figure shows a top view so that the shape can be easily recognized. As shown in FIG. 45, the IC tag main body lies in a portion B, which, using the portion B as a hub, centrally manages the other separable portions A1 to A5.

As shown in FIG. 45, the coupon tickets utilizing the IC tags, which are often used in amusement parks and the like, are arranged in a plane such that they form a separable set of tickets from which one ticket is separated each time an attraction is purchased. The portions A1 to A5 each carry, as coupon IC tags, a coupon code in their storage regions that can be identified by individual coupon tickets.

First, at a store, when the user receives the coupon tickets and starts using them, the user's profile information is set in the storage regions of the portions A1 to A5 and the tag main body B in an initializing process. The user's profile information herein refers to the kind of information that permits the analysis of the coupon user's tendencies, such as sex, age, and occupation. When the user uses the coupon for the first time, upon separation of the A1 coupon ticket at a shop where the portion A1 can be used, for example, the coupon code of the portion A1 separated from the line L is stored in the storage region of the tag main body B. Thereafter, the user can enjoy the merits provided by the coupon ticket of the portion A1 by placing the tag main body B over a reader/writer device, for example. Since the portion A1 remains at the store, it becomes possible for the shop to monitor and analyze the tendencies of the customers based on the user profile information recorded in the recording unit in the portion A1, by putting the collected IC tags through a tag reader. Thus, the shop can utilize such information for marketing strategy planning purposes, for example. Furthermore, the tag main body B can detect and store the order of separation of the partial tags, such as A1, B, A5, A2, and A4. Thus, the order in which the coupon tickets were used can also be known by placing the tag main body B over the reader/writer.

Because of the central control provided by the tag main body B, the configuration is simplified as compared with the case where tags are connected in series and a terminal tag of them functions as the tag main body. Further, since the tag main body B functions as a hub and manages the other coupon tickets A1 to A5, the tags A1 to A5 can be separated in any order.

While the invention has been described with reference to coupon tickets, the invention can be applied to any other purposes as long as they involve similar functions. For example, the invention can be applied to tourist tickets that are used by tourists visiting many locations, or various other tickets for amusement parks and the like.

Figure 9:
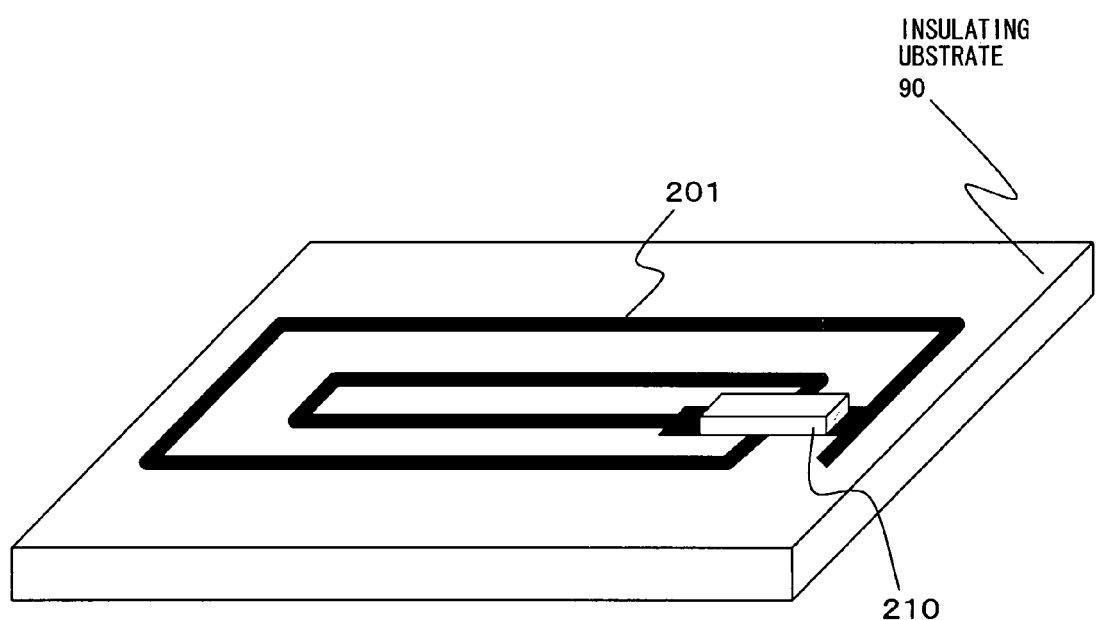
FIG. 9 shows a perspective view showing the structure of a conventional IC tag.

The shape of the IC tag that has been described with reference to FIG. 9 is merely an example and any other shape may be adopted as long as Ak is connected via B.

Thus, by having the non-separable portion B centrally manage (control) the ICs (IC1 to ICn) of the separable portions A1 to An, the IC tag of the invention can be used for various purposes regardless of the order of separation of Ak.

INDUSTRIAL APPLICABILITY

The IC tag of the invention has excellent security against data tampering. When affixed to merchandise, the IC tag makes it possible to easily monitor the distribution history of each item of merchandise. Depending on the type of the item to which the IC tag is affixed (in terms of whether or not it must be handled with care), a change in the function of the IC tag associated with the separation of the separable portions can be used for the confirmation of the presence or absence of damage to the item. Because of these features, the IC tag of the invention can be used for a wide variety of applications, such as a merchandise distribution management system, an inventory management system, a quality control system, an anti-theft system, and electronic tickets.

The invention claimed is:

1. An integrated circuit (IC) tag comprising
a number n of separable portions Ak from A1 to An, wherein n is a natural number such that n≧1 and k is a natural number such that 1≦k≦n, and
a portion An+1 in addition to the separable portions A1 to An,
wherein each separable portion Ak includes an integrated circuit ICk and the portion An+1 includes an integrated circuit ICn+1, the IC tag further comprising
a number n of signal lines Lk from L1 to Ln, wherein each signal line Lk electrically connects the ICk and the ICk+1 such that an electrical signal connection is broken upon separation of the portion Ak from the portion Ak+1,
wherein each time a separable portion Ak is separated from portion Ak+1, the separation of the portion Ak is detected and a function of the tag is changed from a k-th function to a k+1-th function.

2. The IC tag according to claim 1, wherein the ICk has the k-th function individually, and the ICn+1 has a n+1-th function.

3. The IC tag according to claim 1, wherein the ICk and at least one of the ICk+1 to ICn+1 share a function for realizing the k-th function.

4. The IC tag according to claim 1, wherein the ICk has an independent function, and the ICk and at least one of the ICk+1 to ICn+1 share a function for realizing the k-th function.

5. The IC tag according to claim 1, wherein any one of IC1 to ICk that include at least ICk has the function of restricting the expression of the k+1-th function of the tag as a whole.

6. The IC tag according to claim 1, wherein the separable portion Ak includes a storage unit Mk and the portion An+1 includes a storage unit Mn+1, the storage unit Mk having a storage region for storing at least one of items of data obtained by the tag based on the first function to the k-th function,
wherein the storage unit Mn+1 has a storage region for storing at least one of items of data obtained by the tag based on the k-th to a n+1-th function.

7. The IC tag according to claim 6, wherein the ICk to ICn+1 include a read-dedicating circuit for making, upon separation of the Ak, the regions of the storage unit Mk to Mn+1 for storing the data obtained on the basis of the k-th function, dedicated for reading.

8. The IC tag according to claim 1, wherein the IC includes a communication unit for communication with the outside, and a control unit for controlling the communication unit.

9. The IC tag according to claim 8, wherein the Ak portion separated from the tag main body functions as an independent IC tag by maintaining its external communication function.

10. The IC tag according to claim 1, wherein the Ak portion comprises:
an Lk severing detection unit for detecting a severing in the line Lk; and
an Ak severing determination unit that uses the result of detection of the presence or absence of severing in the signal line Lk for a determination of severing of the Ak.

11. The IC tag according to claim 10, wherein the Ak severing determination unit includes a unit for making, upon determining that Ak has been separated from the tag main body, a data storage region of the storage unit Mk allocated to the data obtained by at least the first to the k-th function, dedicated for reading.

12. The IC tag according to claim 11, wherein the Lk severing detection unit of the Ak portion detects severing of the signal line Lk based on the presence or absence of a signal from ICk+1.

13. The IC tag according to claim 12, comprising:
an impedance change detection unit for detecting a change in the impedance of a line that straddles the two regions Ak and Ak+1 and which is severed upon separation of the Ak from the tag; and
an Ak separation detection unit for determining the separation of Ak based on the result of detections made by the Lk severing detection unit and the impedance change detection unit.

14. The IC tag according to claim 1, wherein the separable portion Ak+1 comprises:
an Lk severing detection unit for detecting severing of the signal line Lk; and
an Ak severing determination unit that uses the result of detection of presence or absence of severing of the signal line Lk for the determination of separation of the Ak,
wherein the Lk severing detection unit of the Ak+1 portion determines the separation of the signal line Lk based on the presence or absence of a signal from ICk.

15. The IC tag according to claim 14, wherein the Ak+1 portion comprises:
an impedance change detection unit for detecting a change in the impedance of a line that straddles the two regions Ak and Ak+1 and which is severed when the Ak portion is separated from the tag,
wherein the Ak severing determination unit determines the separation of Ak based on the result of detection conducted by the Lk severing detection unit and the impedance change detection unit.

16. The IC tag according to claim 1, wherein an information Ck+1 becomes obtainable upon separation of the portion Ak.

17. The IC tag according to claim 16, wherein the information Ck+1 is information necessary for activating at least one of the k+1-th function to a n+1-th function of the tag.

18. The IC tag according to claim 16, wherein the information Ck+1 is denoted in an electrically or mechanically readable code format, or in a format that can be read by humans, including numbers, letters, and/or symbols.

19. The IC tag according to claim 18, wherein the information Ck+1 is indicated at a position such that it can be acquired only after the Ak is separated.

20. The IC tag according to claim 19, having a structure such that at least part of Ak is layered on Am, wherein m is a natural number such that k<m≦n, or An+1,
wherein the information Ck+1 is indicated on Am, or at a portion of An+1 that is hidden by Ak.

21. The IC tag according to claim 1, comprising a line that is used for the determination of the separation of Ak which is electrically separated from the tag upon separation from the tag,
wherein the line used for separation determination has a first wiring pattern such that no electric separation occurs in the line used for separation determination just because a part of Ak is severed from the tag along the separating line.

22. The IC tag according to claim 21, comprising the first wiring pattern arranged such that branch lines used for separation determination and the lines used for separation determination intersect the separating line of Ak at a plurality of locations.

23. The IC tag according to claim 21, wherein the width of the line used for the Ak separation determination is substantially equal to the length of the separating line at and near the separating line.

24. The IC tag according to claim 1, comprising:
a separating line for separating Ak from the tag, and a line used for the determination of separation of Ak which is electrically separated from the tag upon separation from the tag,
the IC tag comprising a second wiring pattern in which electric separation develops in the line used for the Ak separation determination simply upon separation of a part of Ak from the tag along the separating line.

25. The IC tag according to claim 24, wherein the second wiring pattern is arranged such that the separating line and the line used for the Ak separation determination repeatedly intersect each other.

26. The IC tag according to claim 1, wherein A1 or An+1 comprises:
an initial setting cutout line for the initial setting of the IC tag; and
means for detecting the presence or absence of severing in the cutout line.

27. The IC tag according to claim 26, comprising a plurality of the initial setting cutout lines, wherein a different initial setting is made depending on which one of the cutout lines is cut into.

28. An integrated circuit (IC) tag comprising
a number n of separable portions Ak from A1 to An, wherein n is a natural number such that n≧1 and k is a natural number such that 1≦k≦n, and
a non-separable portion An+1 in addition to the separable portions A1 to An,
a number n of signal lines Lk from L1 to Ln, wherein each signal line Lk electrically connects the ICk and the ICn+1 such that an electric signal connection is severed upon separation of separable portion Ak from portion An+1, the portion An+1 having an Ak separation detection unit,
and wherein each time a separable portion Ak is separated from portion An+1 sequentially in the order of k=1 to n, the separation of the portion Ak is detected and a function of the tag changes from a k-th function to a k+1-th function such that the function of the IC tag changes sequentially from a first function when none of portions A1 to An are separated from portion An+1 to a n+1-th function when all of portions A1 to An are separated from portion An+1.

29. The IC tag according to claim 28, wherein the ICk oversees the k-th function individually, and the ICn+1 oversees the n+1-th function.

30. The IC tag according to claim 28, wherein at least one of the ICn+1 to ICk+1 and the ICk share the function for realizing the k-th function.

31. The IC tag according to claim 28, wherein at least one of the IC1 to ICk−1 has a function for restraining the expression of the k-th function.

32. The IC tag according to claim 28, wherein the separable portion Ak includes a storage unit Mk, the storage unit Mk having a region for storing data obtained by at least the k-th function.

33. The IC tag according to claim 32, comprising a mechanism for making, upon separation of the Ak, the storage region of the storage unit Mj, wherein j is a natural number such that k≦j≦n+1, for the data obtained by the k-th function, dedicated for reading.

34. The IC tag according to claim 32, wherein the Ak portion comprises function for communicating with the outside, wherein the communication function is maintained even when the Ak is separated from the tag main body so that the IC tag can function.

35. The IC tag according to claim 34, wherein the Ak portion comprises an Lk severing detection unit for detecting severing of the line Lk, and an Ak severing determination unit that uses the result of detection of presence or absence of severing of the signal line Lk for the Ak separation determination.

36. The IC tag according to claim 35, wherein the Ak severing determination unit detects the separation of the signal line Lk based on the presence or absence of a signal from the ICn+1.

37. The IC tag according to claim 35, wherein the separation detection unit comprises an impedance change detection unit for detecting a change in the impedance of a line that straddles the two portions Ak and portion An+1 and that is severed upon separation of the Ak portion from the tag, wherein the determination of separation of portion Ak is made on the basis of the result of detection by the Lk severing detection unit and the impedance change detection unit.

38. The IC tag according to claim 28, wherein the portion An+1 comprises a storage unit Mn+1, the storage unit Mn+1 includes a region for storing at least one of items of data obtained on the basis of the first to the n+1-th functions.

39. An integrated circuit (IC) tag comprising
a number n of separable portions Ak from A1 to An, wherein n is a natural number such that n≧1 and k is a natural number such that 1≦k≦n, and
a non-separable portion An+1 other than the separable portions A1 to An, wherein each separable portion Ak includes an integrated circuit ICk and the non-separable portion An+1 includes an integrated circuit ICn+1, the IC tag further comprising:

a number n of signal lines Lk from L1 to Ln, wherein each signal line Lk electrically connects the ICk and the ICn+1 such that an electric signal connection is severed upon separation of the portion Ak from portion An+1, the portion An+1 comprising an Ak separation detection unit, and wherein the function of the tag is changed depending on which of the portions A1 to An are separated from the tag.

* * * * *